United States Patent
Oka et al.

(10) Patent No.: US 6,828,994 B2
(45) Date of Patent: Dec. 7, 2004

(54) VIDEO CAMERA SYSTEM HAVING REMOTE COMMANDER

(75) Inventors: Hiroki Oka, Kanagawa (JP); Toshiyuki Hisatsune, Kanagawa (JP); Tetsu Sumii, Kanagawa (JP); Osamu Sakurai, Kanagawa (JP); Shigeya Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 09/957,900

(22) Filed: Sep. 21, 2001

(65) Prior Publication Data

US 2002/0012050 A1 Jan. 31, 2002

Related U.S. Application Data

(62) Division of application No. 09/059,670, filed on Apr. 13, 1998, now Pat. No. 6,556,240.

(30) Foreign Application Priority Data

Apr. 24, 1997 (JP) .............................................. 9-106946

(51) Int. Cl.[7] .............................................. G09G 5/00
(52) U.S. Cl. ...................................... 345/858; 345/764
(58) Field of Search ................................. 345/764, 765, 345/769, 784, 786, 788, 856–858, 863

(56) References Cited

U.S. PATENT DOCUMENTS

| | | |
|---|---|---|
| 4,672,436 A | 6/1987 | Hawthorne |
| 5,008,756 A | 4/1991 | Nakamura et al. |
| 5,237,648 A | 8/1993 | Mills et al. |
| 5,327,528 A * | 7/1994 | Hidaka et al. ............... 345/858 |
| 5,339,393 A | 8/1994 | Duffy et al. |
| 5,416,535 A | 5/1995 | Sato et al. |
| 5,521,635 A | 5/1996 | Mitsuhashi |
| 5,550,754 A | 8/1996 | Williams |
| 5,554,980 A | 9/1996 | Hashimoto et al. |
| 5,568,205 A | 10/1996 | Hurwitz |
| 5,990,862 A * | 11/1999 | Lewis .......................... 345/858 |
| 6,097,393 A * | 8/2000 | Prouty et al. ............... 345/419 |
| 6,137,472 A * | 10/2000 | Pekelney et al. ............ 345/858 |
| 6,426,745 B1 * | 7/2002 | Isaacs et al. ................ 345/419 |
| 6,448,964 B1 * | 9/2002 | Isaacs et al. ................ 345/419 |

FOREIGN PATENT DOCUMENTS

| | | |
|---|---|---|
| EP | 0 396 488 A1 | 11/1990 |
| EP | 0 526 064 | 2/1993 |
| EP | 0 746 152 | 12/1996 |
| EP | 0 748 132 | 12/1996 |
| GB | 2 286 312 | 8/1995 |
| WO | WO 96 26600 | 8/1996 |
| WO | WO 97 27527 | 7/1997 |

OTHER PUBLICATIONS

Patent Abstracts of Japan, vol. 16, No. 526, p. 140, JP 04–196877, Jul. 16, 1992.
Patent Abstracts of Japan, vol. 17, No. 105, p. 81, JP 04–294414, Oct. 19, 1992.
Patent Abstracts of Japan, vol. 96, No. 2, JP 08–32859, Feb. 2, 1996.
Patent Abstracts of Japan, vol. 16, No. 230, p. 87, JP 04–43772, Feb. 13, 1992.

(List continued on next page.)

*Primary Examiner*—Cao (Kevin) Nguyen
*Assistant Examiner*—Brian Detwiler
(74) *Attorney, Agent, or Firm*—Frommer Lawrence & Haug LLP; William S. Frommer

(57) ABSTRACT

An image pickup system that is small in scale, handy to maneuver, easy to operate and advanced in editing capabilities is disclosed. A commander device is used both as a remote commander and as a microphone in operating a video camera for image pickup. Wearing a headset on the head, a user looks at images appearing on a headset display to monitor and verify recorded images without recourse to a view finder of the video camera. Functions of the components making up the system are changed by operation of a mode switch attached to the video camera.

6 Claims, 41 Drawing Sheets

OTHER PUBLICATIONS

Patent Abstracts of Japan, vol. 17, No. 9, p. 75, JP 04–240974, Aug. 28, 1992.
Patent Abstracts of Japan, vol. 96, No. 4, JP 08–98191, Apr. 12, 1996.
Patent Abstracts of Japan, vol. 96, No. 4, JP 08–111807, Apr. 30, 1996.
Patent Abstracts of Japan, vol. 9, No. 147, p. 111, JP 60–28383, Feb. 13, 1985.
Patent Abstracts of Japan, vol. 95, No. 3, JP 07–74998, Mar. 17, 1995.
Patent Abstracts of Japan, vol. 14, No. 493, p. 29, JP 02–202782, Aug. 10, 1990.
Patent Abstracts of Japan, vol. 14, No. 483, p. 144, JP 02–200070, Aug. 8, 1990.
Patent Abstracts of Japan, JP 63–311876, Dec. 20, 1988.
Patent Abstracts of Japan, vol. 016, No. 551 (P–1453), Nov. 20, 1992 & JP 04 208995 A (Fujita Corp), Jul. 30, 1992.
Patent Abstracts of Japan, vol. 13, No. 104, p. 98, JP 63–284529, Nov. 21, 1988.

* cited by examiner

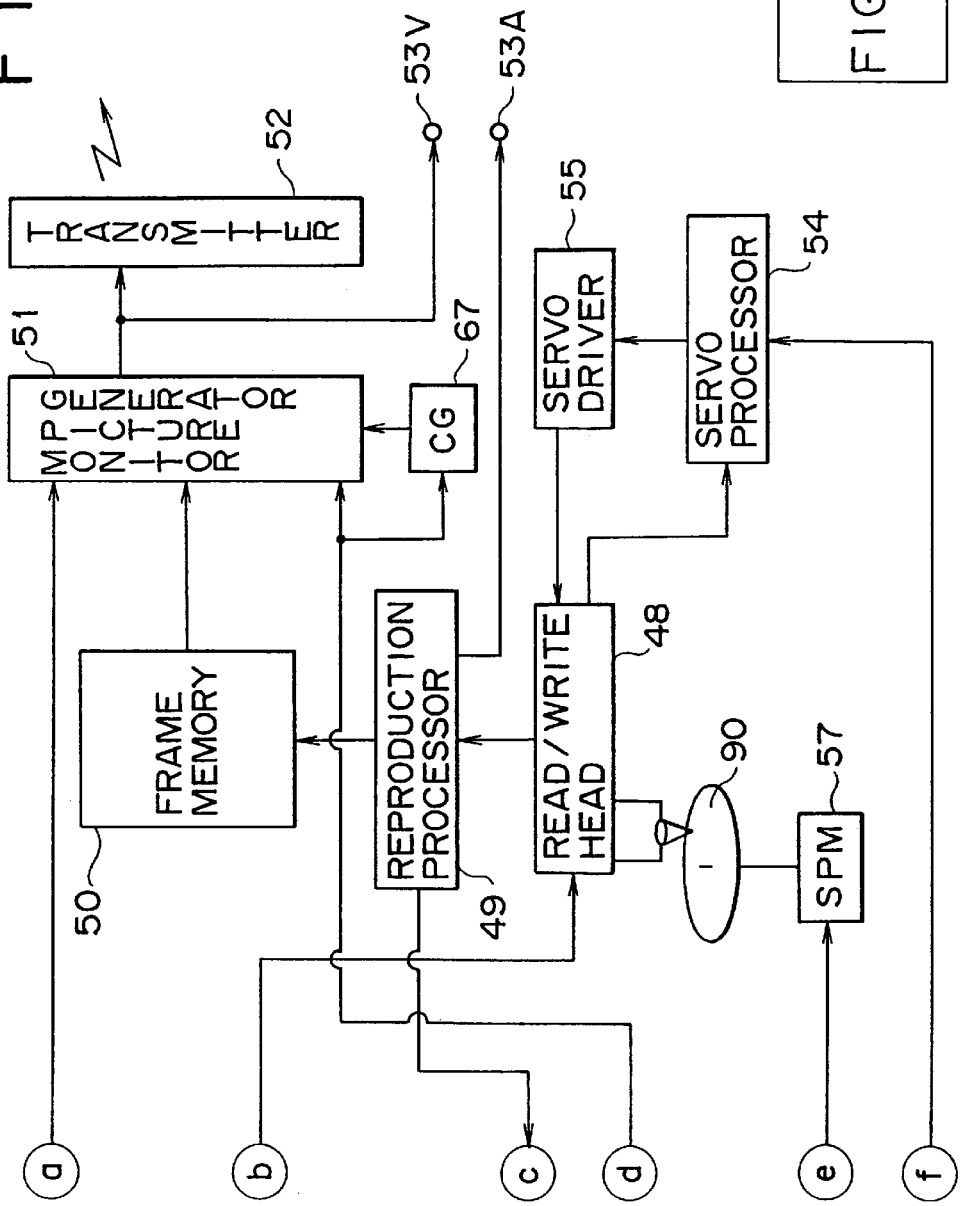

F I G. 14
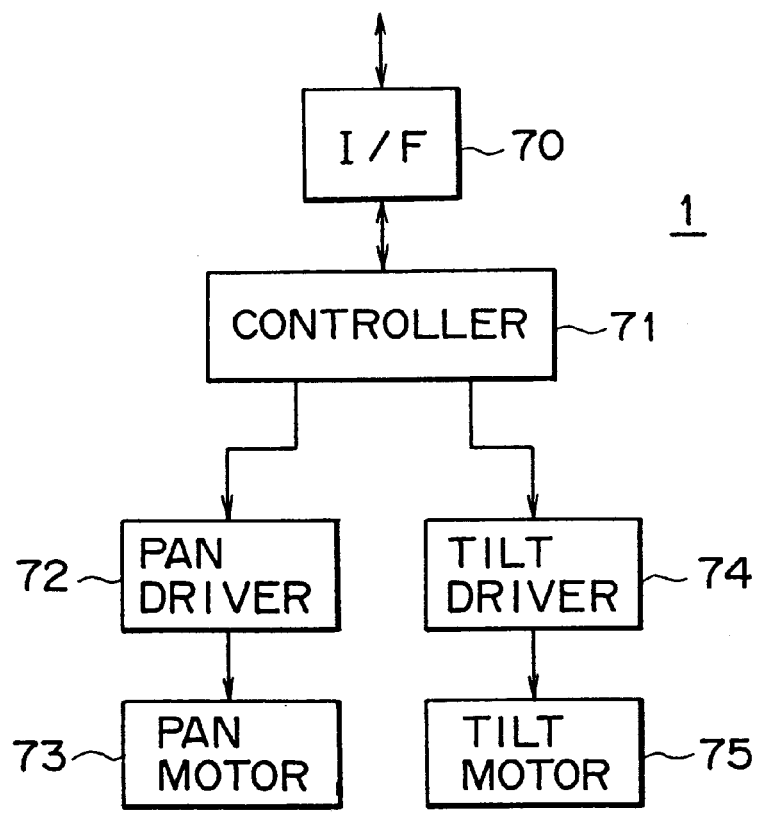

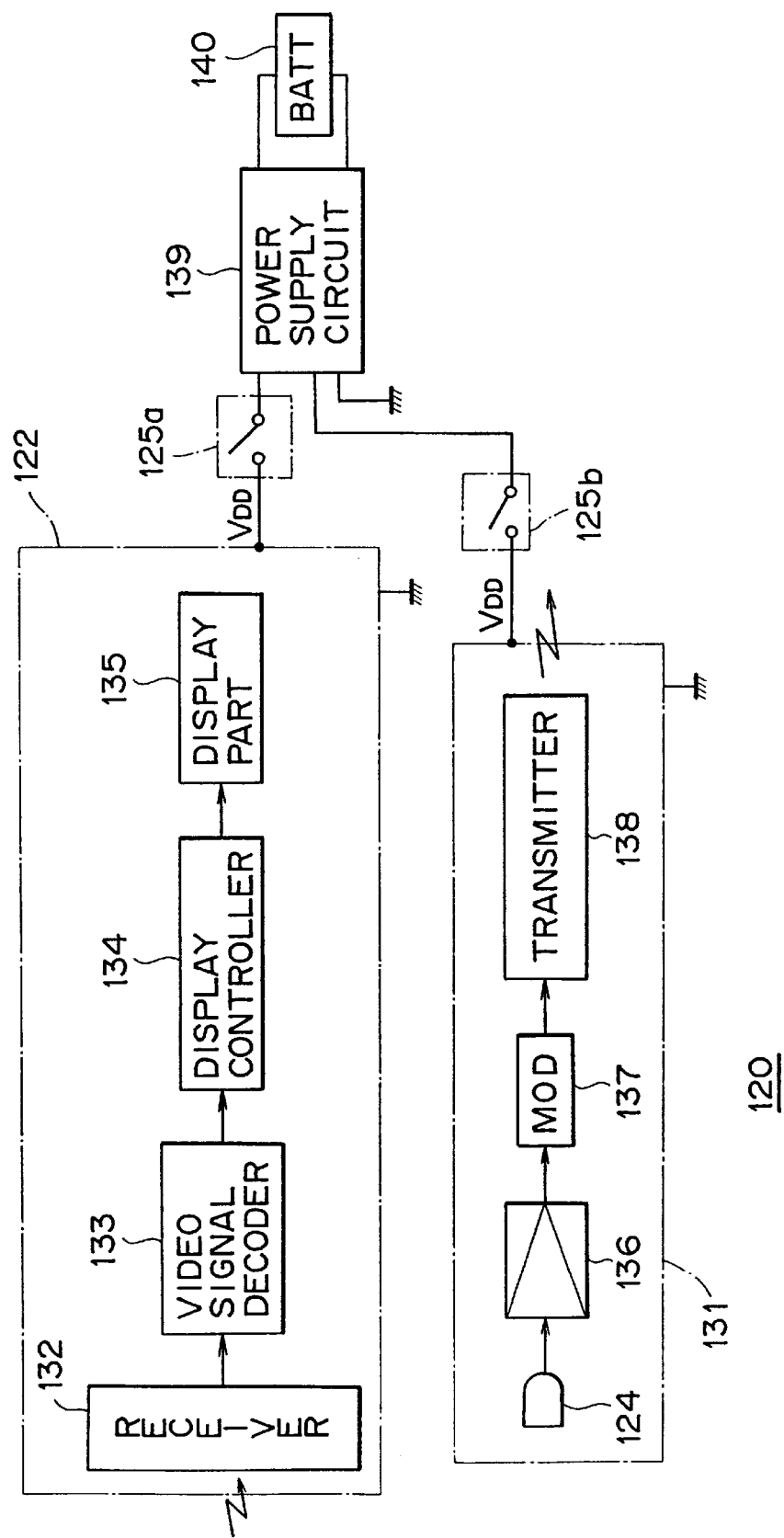

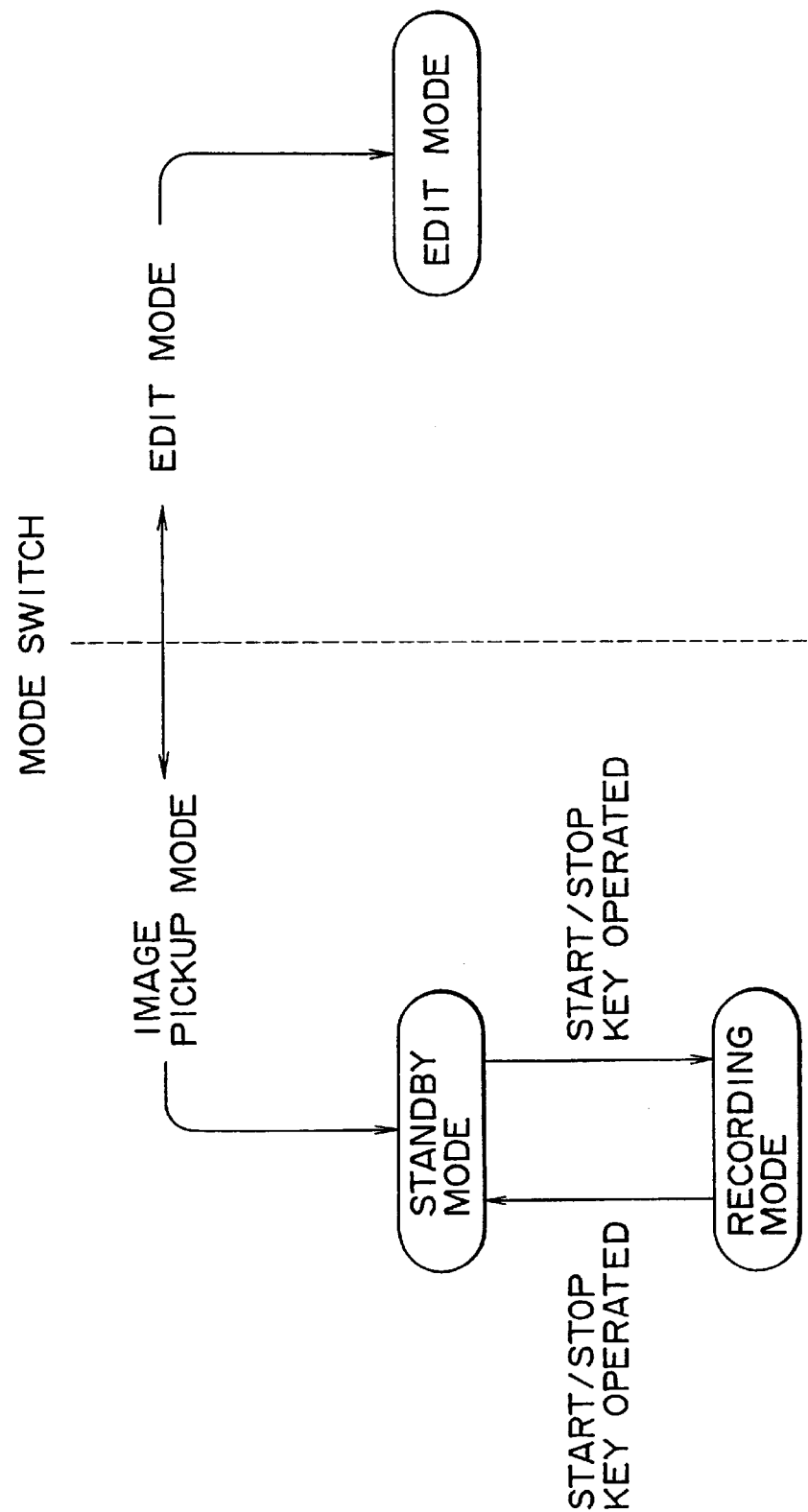

FIG. 17

| | IMAGE PICKUP MODE | | EDIT MODE |
|---|---|---|---|
| | STANDBY MODE | RECORDING MODE | |
| MICROPHONE AUDIO FROM MICROPHONE COMMANDER | × | ○ | × |
| MICROPHONE AUDIO FROM HEADSET | × | ○ | × |
| ST/ST COMMAND INPUT | ○ (START RECORDING) | ○ (STOP RECORDING) | × |
| MARK/CLICK COMMAND INPUT | ○ (GUI CLICK) | ○ (MARKING) | ○ (GUI CLICK) |
| PAN/TILT COMMAND INPUT | ○ | ○ | × |
| ZOOM COMMAND INPUT | ○ | ○ | × |
| AIR-MOUSE COMMAND INPUT | ○ | × | ○ |

○ : INPUT ACCEPTED
× : INPUT IGNORED

F I G. 21
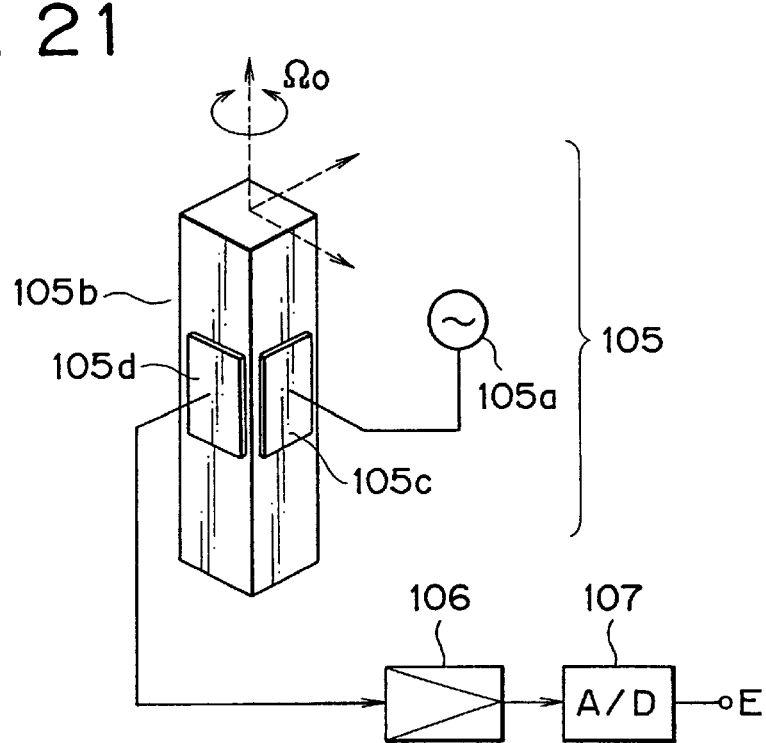
F I G. 22
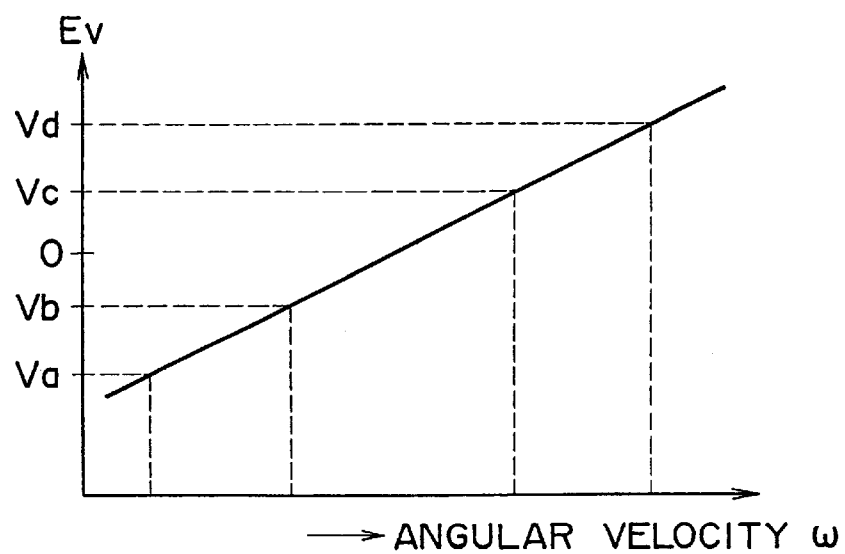

VIDEO CAMERA SYSTEM HAVING REMOTE COMMANDER

This is a divisional of parent application Ser. No. 09/059,670, filed Apr. 13, 1998. Pat. No. 6,556,240.

BACKGROUND OF THE INVENTION

The present invention relates to a video camera, as well as to an image pickup system comprising a video camera, a commander and a headset.

Business-use image pickup systems used by broadcasting stations and like institutions are large-scale systems. Illustratively, a related art image pickup system is large enough to include a video camera fixed to a tripod or shouldered by a camera operator, a microphone for use typically in interviews, a monitor device for monitoring captured images, and an editing device for editing picture recordings.

One disadvantage of such related art image pickup systems is that they require involvement of numerous personnel for operating the video camera for image pickup, monitoring and editing image recordings, and holding interviews with personalities. Another disadvantage is that the large scale of related art image pickup systems deprives them of maneuverability.

SUMMARY OF THE INVENTION

It is therefore an object of the present invention to overcome the above and other deficiencies and disadvantages of the prior art and to provide a small-scale image pickup system that is easy to maneuver and to operate allowing even a single person to use the video camera and microphone for news coverage and other activities, the system further offering useful functions for use in subsequent editing.

In carrying out the invention and according to one aspect thereof, there is provided an image pickup system comprising a commander, a video camera and a display device. The commander includes: a microphone for obtaining an audio signal; a command information storage for storing a plurality of kinds of command information; a command information generator for generating a plurality of kinds of command information which correspond to a plurality of different operations performed by a user, the generation of the command information being carried out on the basis of the plurality of kinds of command information which are stored in the command information storage; and a transmitter for transmitting the audio signal and the command information as transmitted information. The video camera includes: an image pickup device for obtaining an image pickup signal by imaging an object; a receiver for receiving the transmitted information; a recording and reproducing device for recording and reproducing the image pickup signal to and from a recording medium; an image information storage for storing a plurality of kinds of image information; a display-ready video signal generator for generating a display-ready video signal based on the image pickup signal reproduced from the recording medium by the recording and reproducing device as well as on the image information; a transmitter for transmitting the display-ready video signal; a controller for controlling the image pickup device, the recording and reproducing device and the display-ready video signal generator in accordance with any one of a plurality of operation modes; and an operation mode setting switch for setting one of the plurality of operation modes. The display device includes: a receiver for receiving the display-ready video signal transmitted from the transmitter of the video camera; and a display device for displaying an image represented by the received display-ready video signal.

According to another aspect of the invention, there is provided an image pickup apparatus comprising: an image pickup device for obtaining an image pickup signal by imaging an object; a receiver for receiving a signal which is supplied from an external device and which includes command information; a recording and reproducing device for recording and reproducing the image pickup signal to and from a recording medium; an image information storage for storing a plurality of kinds of image information; a display-ready video signal generator for generating a display-ready video signal based on the image pickup signal reproduced from the recording medium by the recording and reproducing device as well as on the image information; a transmitter-for transmitting the display-ready video signal; a controller for controlling the image pickup device, the recording and reproducing device and the display-ready video signal generator in accordance with any one of a plurality of operation modes; and an operation mode setting switch for setting one of the plurality of operation modes.

According to a further aspect of the invention, there is provided a controller using a graphic user interface, comprising: a pointer displaying device for displaying a pointer on a screen; a movement command receiver for receiving a movement command for moving the pointer, the movement command including first and second movement designating information, the first movement designating information designating a movement in a first direction, the second movement designating information designating a movement in a second direction perpendicular to the first direction; an operation area displaying device for displaying a first and a second operation area, the first operation area being positioned close to one edge of the screen, the second operation area being located elsewhere on the screen and arranged to transfer control between a first and a second state regarding the first operation area; an enter command receiver for receiving an enter command; an enter controller for providing controls corresponding to the position in which the pointer is displayed when the enter command is received by the enter command receiver; and a pointer movement controller for moving the pointer in the first state on the basis of the first and the second movement designating information, the pointer movement controller further moving the pointer in the second state on the basis of either the first or the second movement designating information.

These and other objects, features and advantages of the invention will become more apparent upon a reading of the following description and appended drawings.

BRIEF DESCRIPTION OF THE DRAWINGS

FIG. 14 is a block diagram of the camera platform of the embodiment;

FIG. 15 is a block diagram of the headset of the embodiment;

FIG. 16 is an explanatory view showing mode transitions of the image pickup system embodying the invention;

FIG. 17 is an explanatory table listing command functions effective in various modes of the embodiment;

FIG. 21 is an explanatory view depicting an angular velocity sensor used in the embodiment;

FIG. 22 is a graphic representation illustrating outputs of the angular velocity sensor of the embodiment;

DESCRIPTION OF THE PREFERRED EMBODIMENTS

Preferred embodiments of this invention will now be described in the order outlined below. An image pickup system embodying the invention comprises illustratively an image pickup apparatus having disk recording and reproducing functions, a remote commander having a microphone capability, a headset with display and microphone features, and a tripod stand on which to mount the image pickup apparatus.

For purpose of simplification and illustration, the image pickup apparatus having disk recording and reproducing functions will be referred to hereunder as the video camera; the microphone-equipped commander, as the microphone commander; the headset with display and microphone features, as the headset; and the tripod stand to fix the video camera, as a camera platform.

Figure 1:
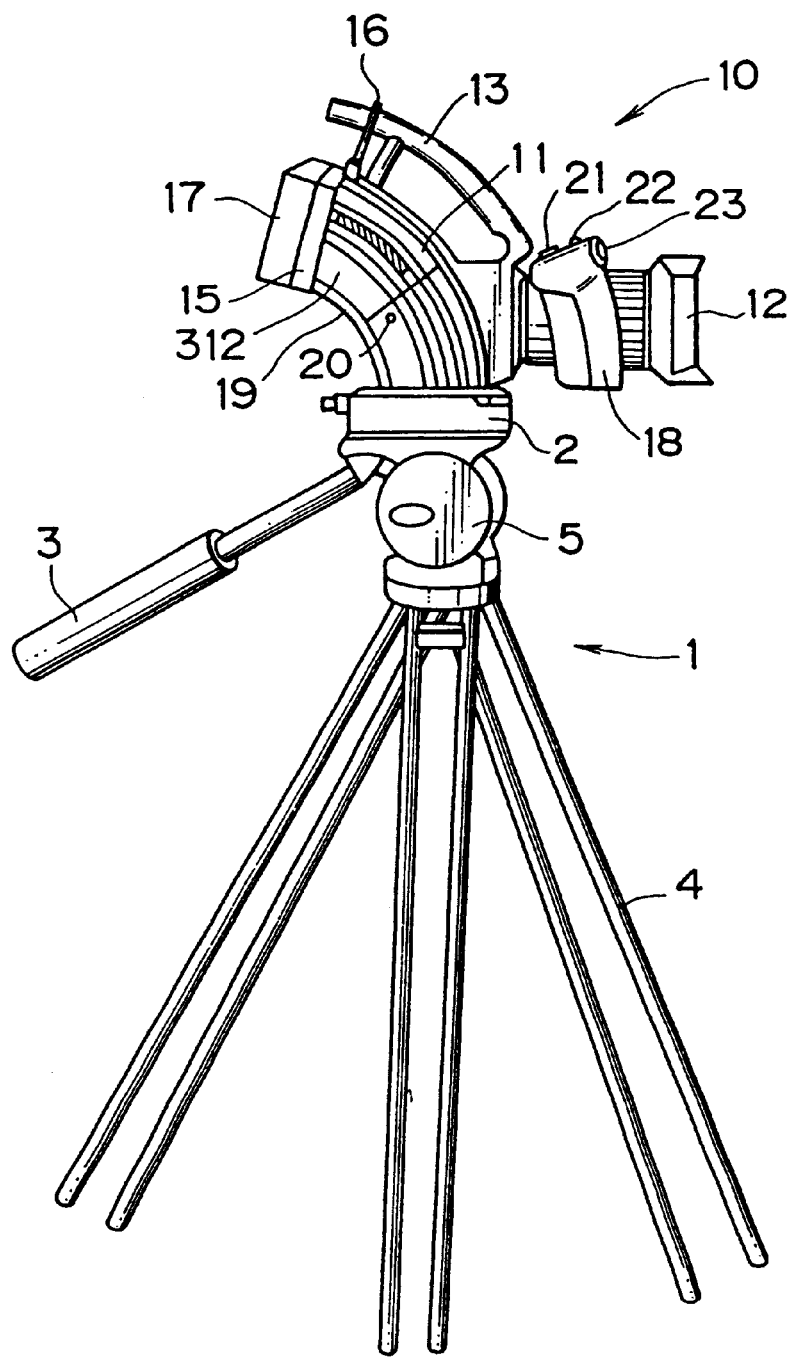
FIG. 1 is a perspective view of a video camera and a camera platform constituting an embodiment of the invention.
Figure 2:
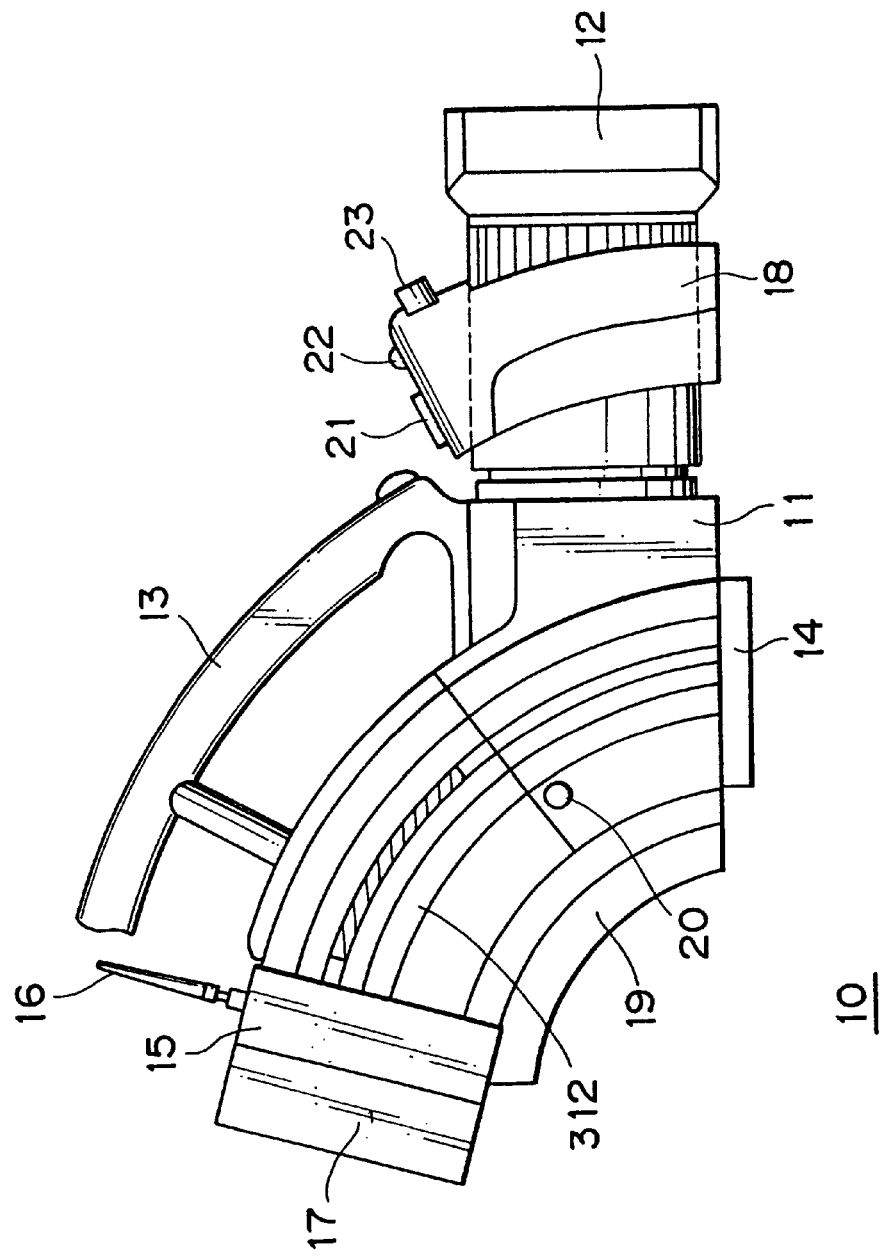
FIG. 2 is a left-hand side view of the video camera of this embodiment.
Figure 3:
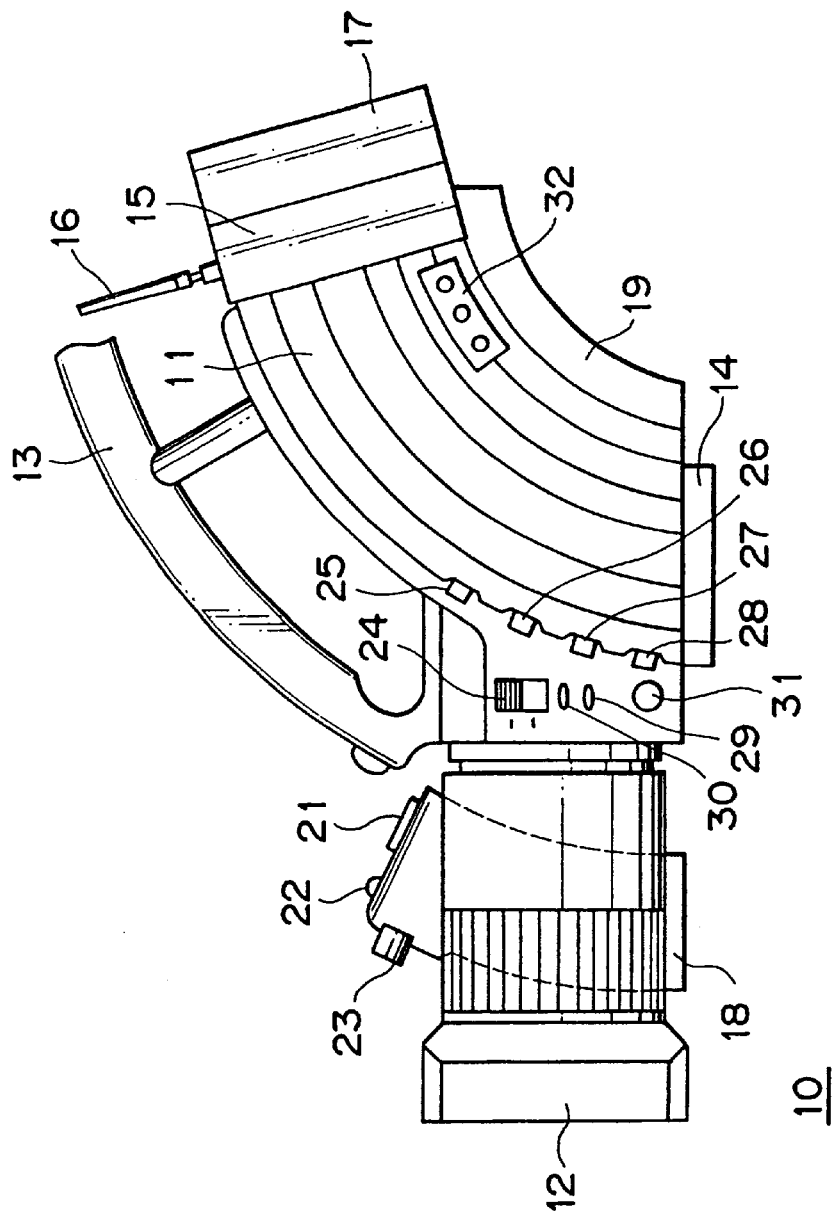
FIG. 3 is a right-hand side view of the video camera of the embodiment.
Figure 4:
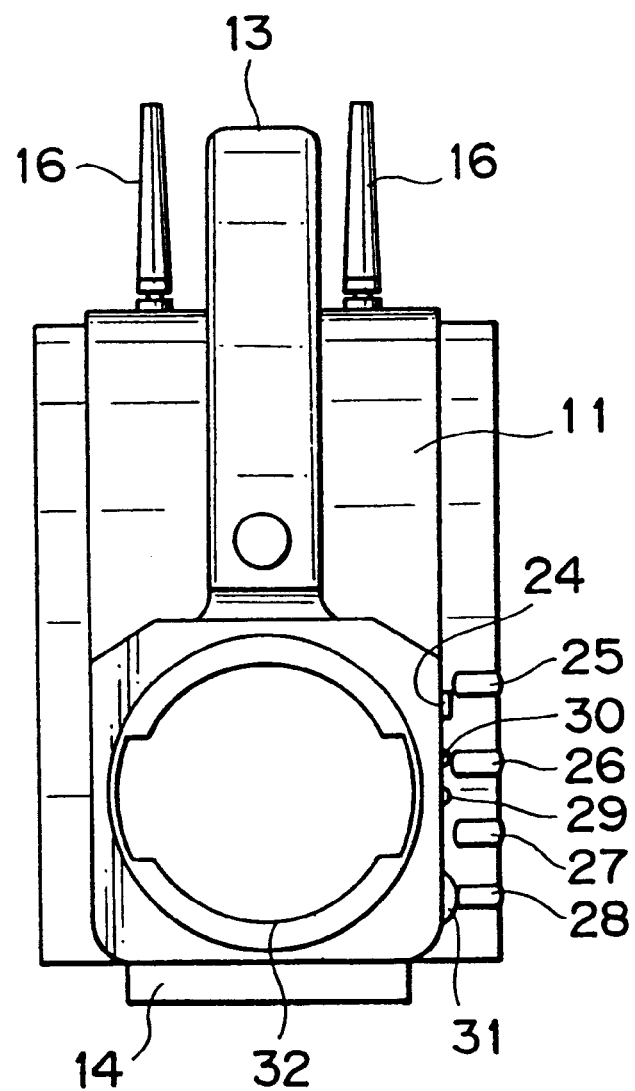
FIG. 4 is a front view of the video camera with its lens removed.

The headings involved are as follows:
1. Appearances of the Components
   1-1 Video Camera and Camera Platform
   1-2 Microphone Commander
   1-3 Headset
2. Typical Use States
3. Internal Structures of the Components
   3-1 Microphone Commander
   3-2 Video Camera
   3-3 Camera Platform
   3-4 Headset
4. Operation Modes
   4-1 Mode Transition
   4-2 Standby Mode
   4-3 Recording Mode
   4-4 Edit Mode
5. Air-Mouse Function
6. GUI Functions
   6-1 Screen Modes
   6-2 Standby Screen
   6-3 Monitor Screen
   6-4 Preview Screen
   6-5 Trim/Edit Screen
   6-6 Clip/Arrange Screen 1. Appearances of the Components 1-1 Video Camera and Camera Platform FIGS. 1 through 4 show appearances of a video camera 10 and a camera platform 1. FIG. 1 is a perspective view of the video camera 10 mounted on the camera platform 1; FIG. 2 is a left-hand side view of the video camera 10; FIG. 3 is a right-hand side view of the video camera 10; and FIG. 4 is a front view of the video camera 10 with its lens removed.

As illustrated in FIGS. 2 through 4, a mount mechanism 14 is provided under the video camera 10. Attaching the mount mechanism 14 to a pedestal 2 of the camera platform 1 fastens the video camera 10 to the platform 1, as shown in FIG. 1.

The camera platform 1 on a tripod 4 is topped with a pan/tilt mechanism 5 that allows the pedestal 2 to rotate vertically and horizontally with respect to the tripod 4.

With the video camera 10 mounted on the pedestal 2, the pan/tilt mechanism 5 is rotated by manually moving a direction changing lever 3 vertically or crosswise. Such manipulations, so-called panning and tilting operations, change the direction in which the video camera 10 picks up images. As will be described later in more detail, the pan/tilt mechanism 5 comprises a pan motor and a tilt motor, not shown, which cause the platform to pan and tilt in response to panning and tiling operations effected by a microphone commander 80 and the video camera 10.

The video camera 10 has a body 11 whose side geometry is a substantially donut-shaped, quarterly circular arc. A lens mechanism 12 is attached to the front of the body 11. A handle 13 is mounted on top of the body 11. A camera user makes use of the handle 13 to hold the video camera 10.

The left-hand side of the body 11 is equipped with a disk loader 312 and an open/close key 20. Pushing the open/close key 20 opens and closes the disk loader 312. When thus operated, the disk loader 312 allows a disk serving as a video/audio signal recording medium (magneto-optical disk, optical disk, magnetic disk or other writable disk) to be loaded or ejected to or from the body 11. Needless to say, the disk loader 312 incorporates a drive mechanism to drive the disk for write and read operations to and from the disk surface.

A pad 19 is formed at the bottom of the body 11. The pad 19 is made of an elastic material that lines the circular arc shape. The bottom of the body 11 with its circular arc geometry lined with the elastic pad 19 allows the camera user snugly to shoulder the video camera 10.

The lens mechanism 12 is attached removably to the front of the body 11. As shown in FIG. 4, a lens mount mechanism 32 is formed at the front of the body 11. The lens mechanism 12 is mounted on the lens mount mechanism 32.

The left-hand side of the lens mechanism 12 is furnished with a grip 18 that is so shaped as to give the user a snug gripping feel. The grip 18 comprises a start/stop key 21 (called the ST/ST key hereunder), a mark key 22 and a zoom key 23. Any of these keys may be readily operated while the grip 18 is being held.

The ST/ST key 21 is a push-button key operated to start and stop the recording of picture images. The mark key 22, when operated, designates a marking point in the currently recorded image. That is, operating the mark key 22 during recording writes to the recording medium (i.e., disk) index data representing a marking at that point in time. In subsequent reproduction, that point of the image is searched for and located easily.

The zoom key 23 is an operating member for zoom control. Manipulating either side of this seesaw-type operating member provides zoom control between a wide-angle view and a telephoto view.

As shown in the left-hand side illustration of FIG. 3, the body 11 comprises other operating members such as a mode switch 24, a white balance key 25, an output key 26, a gain key 27, a menu key 28, a focus mode key 29, a blurring compensation mode key 30 and a power key 31.

The mode switch 24 may be a slide switch serving as an operating member to select recording mode or edit mode, to be described later. Any other switch type such as a rotary lever type or a push-button type may also be adopted alternatively for the mode switch 24. Shapes and types of the other operating members (20 to 31) may also vary widely.

Various terminals may be furnished illustratively on the side of the body 11 as input/output terminals 32. The terminals include an output terminal for outputting a monitor-use video signal/audio signal to an external device, an input terminal for inputting a video signal/audio signal from the external device, and a microphone input terminal. The number of terminals is not limited to three as illustrated. More or fewer terminals may be provided as needed to accommodate diverse functions associated with input/output signals.

A transmitter block 15 together with antennas 11 is attached to the back of the body 11. Inside the block 15 are transmitting and receiving circuit mechanisms. The transmitter block 15 is used to receive information from the microphone commander 80 and a headset 120 and to transmit information to the headset 120, as will be described later.

A battery pack 17 is attached to the back of the transmitter block 15 illustratively in a removable manner. Inside the pack 17 are dry cells or rechargeable batteries. Mounting the battery pack 17 feeds the video camera with an operating voltage.

1-2 Microphone Commander

Figure 5C:
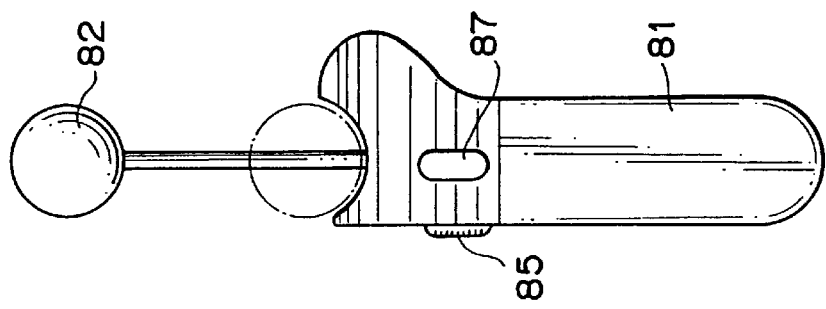
FIGS. 5A, 5B and 5C are a front view, a right-hand side view and a back view of a microphone commander of the embodiment respectively.
Figure 5B:
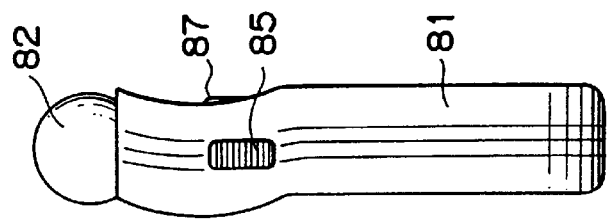
Figure 5A:
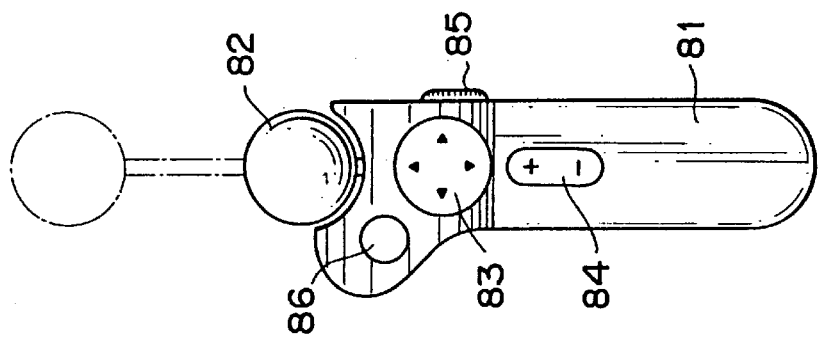

FIGS. 5A, 5B and 5C are a front view, a right-hand side view and a back view of the microphone commander 80 respectively. The microphone commander 80 serves to offer two major functions: as a remote controller that controls the video camera 10, and as a microphone to collect audio data to be recorded on the disk in the video camera 10.

A body 81 of the microphone commander 80 is so shaped as to be held by the user with one hand. At the tip of the body 81 is a sound-gathering part of a microphone 82. The microphone 82 is extended or retracted as indicated by solid and dashed lines. Illustratively, the microphone 82 is extended at the time of use.

The periphery of the body 81 of the microphone commander 80 is equipped with various operating members: a pan/tilt key 83, a zoom key 84, a power switch 85, a start/stop key 86 (called the ST/ST key hereunder), and mark/click key 87.

The pan/tilt key 83 is an operating member constituting a cross-shaped push-button key that may be pushed at four points for vertical or crosswise movements. Pushing the top or bottom point of the key 83 tilts the camera and pushing the left- or right-hand side point pans the camera.

Like the zoom key 23 of the video camera 10, the zoom key 84 is a seesaw type push-button key. The key 84 is operated to control the zoom state of the lens mechanism 12 between the wide-angle phase and the telephoto phase.

The ST/ST key 86 is a push-button operation key. As with the ST/ST key 21 of the video camera 10, operating the ST/ST key 86 starts and stops the recording of picture images.

The mark/click key 87 is an operation key that provides a marking and a click function when operated, the click function being carried out when an air-mouse function, to be described later, is in effect. While image recording is in progress, the mark/click key 87, like the mark key 22 of the video camera 10, acts as a marking key to designate a marking point in the image being recorded. operating the mark/click key 87 generates index data representing a marking that becomes effective at the time of the key operation. When image recording is not performed, the mark/click key 87 is used to click on a GUI screen, to be described later.

An internal transmitter transmits to the video camera 10 command information derived from operating member manipulations, displacement information generated by an internal movement sensor to be described later, and an audio signal representing sounds gathered by the microphone 82.

The power switch 85 is used to switch on and off the microphone commander 80. Alternatively, the microphone 82 may incorporate a power switch function eliminating the need for a separately furnished operating member power switch. For example, the microphone 82 may be structured so that extending it will turn on the microphone commander 80 and retracting the microphone 82 will turn off the commander 80, the latter case being shown in FIG. 5B.

1-3 Headset

Figure 6:
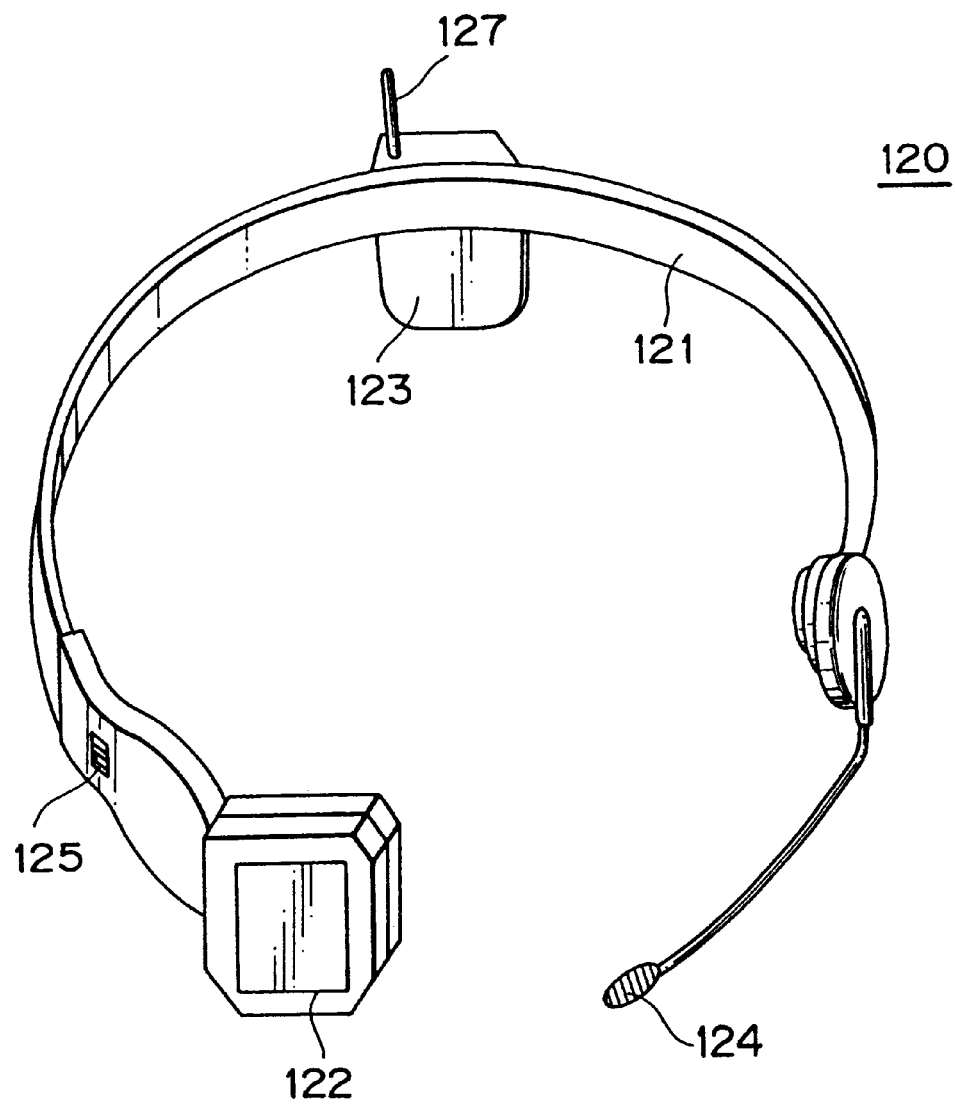
FIG. 6 is a perspective view of a headset of the embodiment.

FIG. 6 is a perspective view of the headset 120. The headset 120 has a headband 121 allowing the user to wear the headset 120 on his or her head. The ends of the headband 121 are equipped with a view finder 122 and a microphone 124.

With the headband 121 worn on the head, the view finder 122 comes immediately before the user's right eye and the microphone 124 close to his mouth.

Facing the user, the view finder 122 presents a small display such as a liquid-crystal display. The display shows images being picked up by the video camera 10, reproduced images, and GUI-related pictures.

A transmitter/battery pack 123 is attached to that position of the headband 121 which is in contact with the back part of the user's head. The transmitter/battery pack 123 houses dry cells or rechargeable batteries inside. Also contained in the transmitter/battery pack 123 are transmitting and receiving circuit arrangements permitting transmission and reception of information between an antenna 127 and the video camera 10. Specifically, images being sent from the video camera 10 are received by the receiving circuit in the pack 123 for display on the view finder 122, and signals representing the sound gathered by the microphone 124 are transmitted by the transmitting circuit in the pack 123 to the video camera 10. The power switch 125 is used to switch on and off the headset 120.

The video camera 10, camera platform 1, microphone commander 80 and headset 120 outlined above make up the image pickup system of the invention. The configured components exchange control information as well as video and audio signals as needed therebetween for coordinated operations. The communication of the relevant information and signals between the components allows the user to record and edit images easily.

It is assumed for this embodiment that information exchanges between the video camera 10, microphone commander 80 and headset 120 are effected by use of radio waves. Alternatively, other communication methods may be used including one involving the use of infrared rays. As another alternative, one communication scheme may be used between the video camera 10 and the microphone commander 80, and a different scheme between the video camera 10 and the headset 120.

2. Typical Use States

Figure 7:
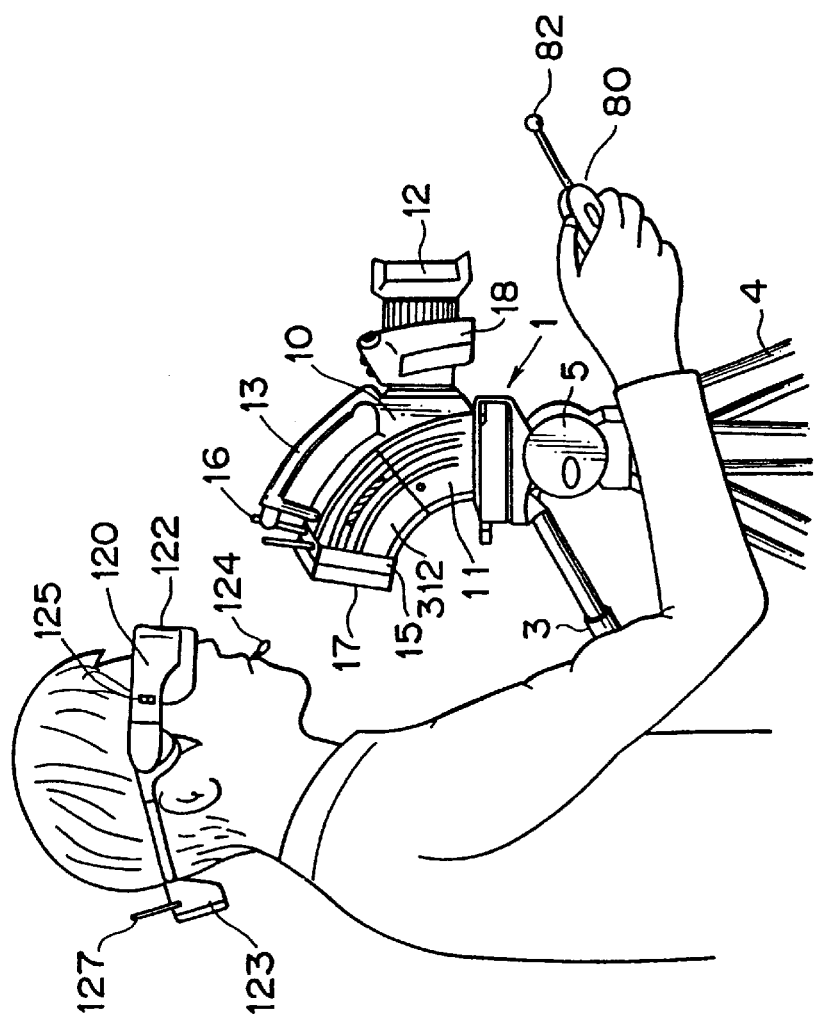
FIG. 7 is an explanatory view of an image pickup system embodying the invention and shown in one mode of use.

FIGS. 7 through 11 show typical states in which the image pickup system embodying the invention is used. FIG. 7 is an explanatory view showing a state in which the video camera 10 is mounted on the camera platform 1 for use.

Wearing the headset 120 on his head, the user may look at images displayed in the view finder 120 and have the microphone 124 pick up his own voice.

Illustratively, the user may operate with one hand the direction changing lever 3 of the camera platform 1 to control the direction of image pickup and with the other hand grip the microphone commander 80 to collect the voice of his interlocutor and/or sounds of the surroundings. The starting and ending of recording by the video camera 10 as well as marking operations may be carried out by use of the ST/ST key 86 and mark/click key 87 on the microphone commander 80.

FIG. 7 illustrates a case in which the video camera 10 is established at a fixed point for image pickup. The camera user may stay away from the camera platform 1 and video camera 10, since camera operations and monitoring of the images being picked up are controlled by the microphone commander 80 and headset 120. Even when remote from the camera platform 1 and video camera 10, the user can still operate the microphone commander 80 for panning, tilting and zooming operations to control the camera in any direction desired for image pickup.

Figure 8:
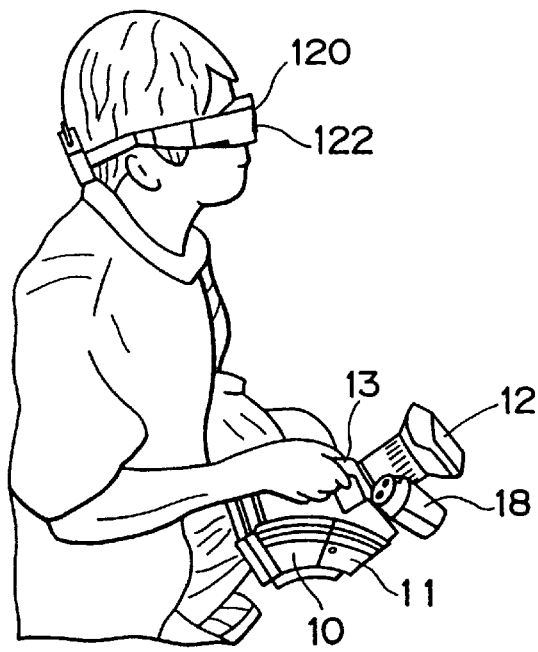
FIG. 8 is an explanatory view of the image pickup system in another mode of use.

FIG. 8 shows a state in which the user holds the video camera 10 at a low position to take pictures from low angles. In this case, the user does not have the microphone commander 80 but may utilize operating members of the video camera 10 for necessary operations. Because images captured from low angles are monitored on the view finder 122 of the headset 120, there is no need for the camera user to crouch down or stretch himself out on the ground to lower his line of sight.

Figure 9A:
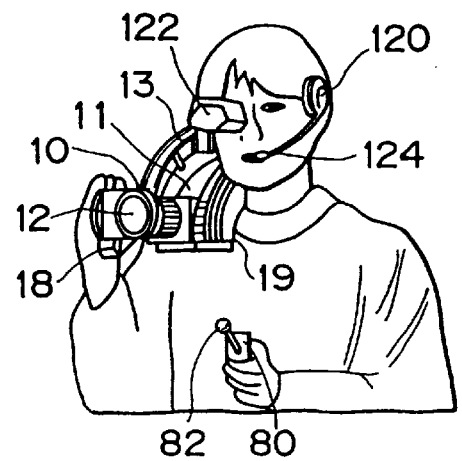
FIGS. 9A and 9B are more explanatory views of the image pickup system in use.
Figure 9B:
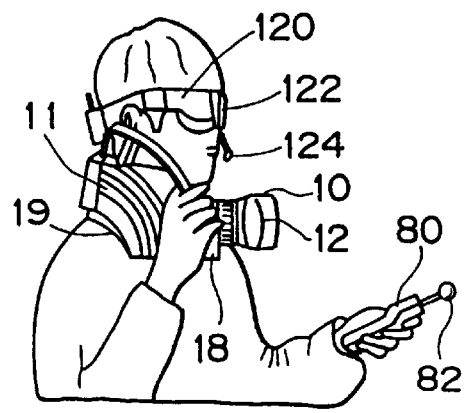

FIGS. 9A and 9B show a state in which the user shoulders the video camera 10 for image pickup without employing the camera platform 1. In this case, the circular arc-shaped pad 19 under the body 11 is placed on the camera user's shoulder. The user grips the video camera 10 with one hand (e.g., at the grip 18 or handle 13) and operates the microphone commander 80 with the other hand.

The use state above is suitable for the camera user to walk about picking up images. As in other use states, picture images are picked up at the height of the user's shoulders but the user need not lower his line of sight because of the availability of monitored images in the view finder 122 of the headset 120.

Figure 10:
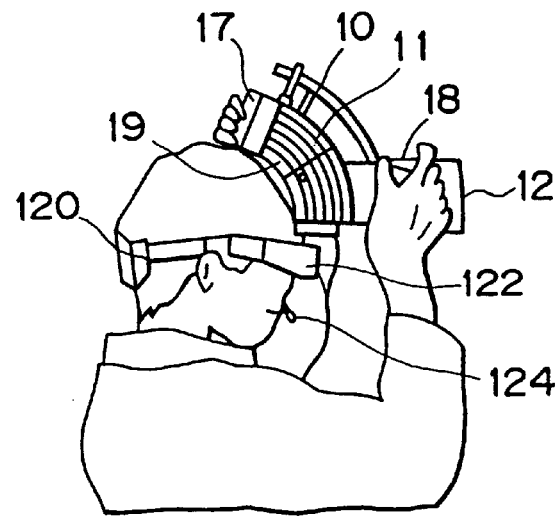
FIG. 10 is another explanatory view of the image pickup system in use.
Figure 11:
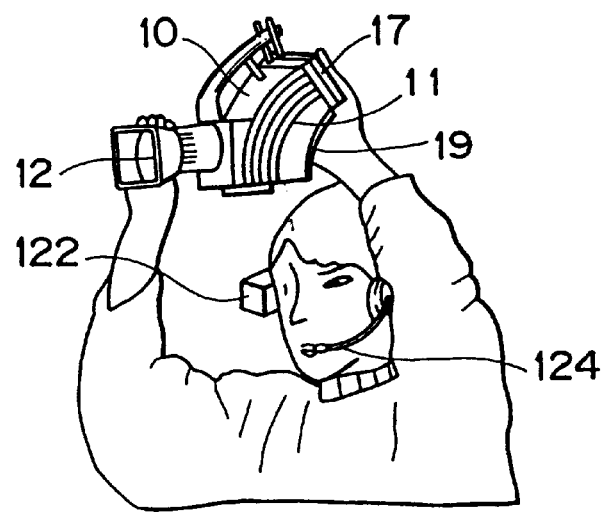
FIG. 11 is another explanatory view of the image pickup system in use.

FIG. 10 illustrates a state in which the video camera 10 is positioned on the user's head. FIG. 11 indicates a state in which the video camera is raised above the user's head. In the case of FIG. 10 where the video camera 10 is positioned on the camera user's head, the circular arc-shaped pad 19 is placed snugly on the head to alleviate the burdens on the camera-holding hands and to stabilize the camera. With the view finder 122 allowing the user to monitor images being captured, it is easy to take picture images from high angles as in the case of FIGS. 10 and 11.

As described, the above image pickup system allows image pickup operations to be performed at any angles using at least the video camera 10 and headset 120. If it is possible to fasten the video camera 10 to the camera platform 1 or to hold the video camera with one hand, the microphone commander 80 may be used. In that case, the user acting as shown in FIGS. 7, 9A and 9B may double as a camera operator and an interviewer.

The embodiment above allows image recordings to be edited subsequently as desired. Editing work is made possible at least within a physical range in which the user may communicate with the video camera 10 while operating the microphone commander 80 and headset 120.

3. Internal Structures of the Components 3-1 Microphone Commander

Figure 12:
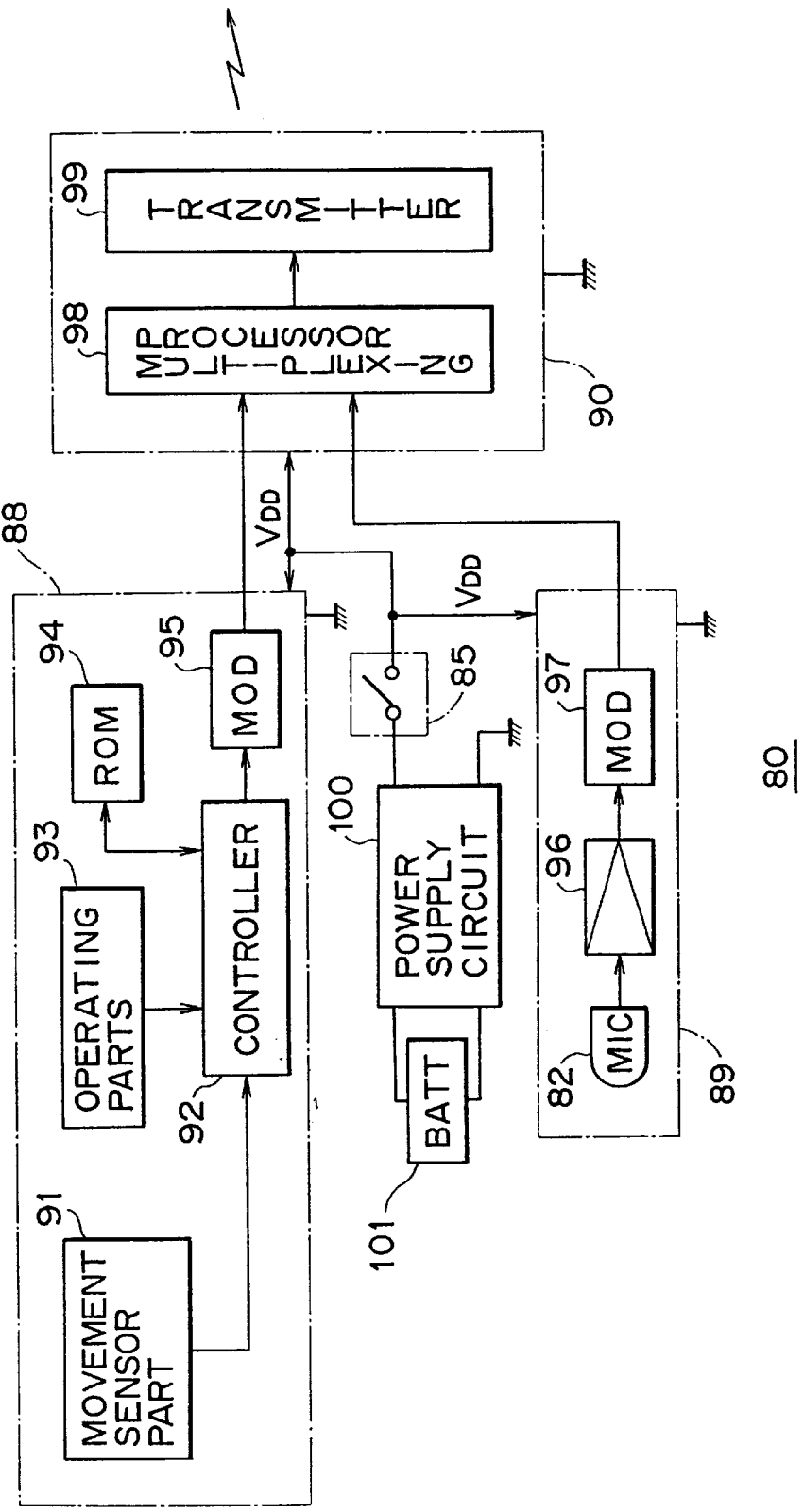
FIG. 12 is a block diagram of the microphone commander of the embodiment.

FIG. 12 is a block diagram of the microphone commander 80 shown as the first of a series of internal structures that make up the system constitution. The microphone commander 80 primarily comprises a command generator 88, a microphone part 89, a transmission processor 90 and a power supply circuit 100.

When the power switch 85 is turned on, the power supply circuit 100 supplies an operating voltage VDD to the appropriate components using batteries (dry cells or rechargeable batteries) 101 held inside the microphone commander 80.

The command generator 88 is a portion that generates two kinds of information: command information representing the manipulation of an operating member by the user, and displacement information allowing the user to utilize the microphone commander 80 as a so-called air-mouse. The command generator 88 comprises a movement sensor part 91, a controller 92, operating parts 93, a ROM 94 and a modulator 95.

The movement sensor part 91 is an angular velocity sensor, an acceleration sensor or the like that detects movements of the microphone commander 80. Specifically, the camera user moves (i.e., swings) the microphone commander 80 vertically and horizontally in the air, and the sensor detects its own spatial displacements. An example of utilizing an angular velocity sensor will be described later in detail.

Displacement information regarding the microphone commander 80 is outputted by the movement sensor part 91 and supplied to the controller 92.

The operating parts 93 refer to the operating members formed on the microphone commander 80. They comprise the ST/ST key 86, pan/tilt key 83, zoom key 84 and mark/click key 87. When any one of these operating parts is operated, the operation is detected by the controller 92.

The controller 92 is constituted by a microcomputer that monitors the output of the movement sensor part 91 and operations of the operating parts 93. In addition, the controller 92 reads command information from the ROM 94 in response to the detected displacement information or operation information, and outputs the command information retrieved from the memory to the modulator 95.

The ROM 94 stores command information composed of various codes: a code corresponding to the ST/ST key 86, a code corresponding to the pan/tilt key 83, a code corresponding to the zoom key 84, and a code corresponding to the mark/click key 87.

For example, when the ST/ST key 86 is pushed, the controller 92 reads from the ROM 94 that command information which corresponds to the ST/ST key 86. The retrieved command information is supplied to the modulator 95.

As will be described later in more detail, the controller 92 generates X-Y displacement information corresponding to the displacements detected by the movement sensor part 91. The code representing the X-Y displacement information is fed to the modulator 95.

The modulator 95 modulates any code (command information or X-Y displacement information) from the controller 92. The modulated code is outputted to the transmission processor 90.

The microphone part 89 comprises the microphone 82, a microphone amplifier 96 and a modulator 97. The microphone 82, a sound-gathering part, converts the gathered sound to an electrical signal. The signal output by the microphone 82 is amplified by the microphone amplifier 96. The amplified signal is modulated suitably by the modulator 97 before being fed to the transmission processor 90.

The transmission processor 90 comprises illustratively a multiplexing processor 98 and a transmitter 99. In operation, the transmission processor 90 transmits to the video camera 10 both the command information or X-Y displacement information from the command generator 88 and the audio signal from the microphone part 89.

The multiplexing processor 98 multiplexes the command information, X-Y displacement information and audio signal according to their respective transmission methods. After being multiplexed, these transmission-ready signals are modulated by the transmitter 99 at their appropriate carrier frequencies. The modulated signals are output and transmitted as radio wave signals.

Although the microphone commander 80 in the above structure outputs and transmits the command information, X-Y displacement information and audio signal to the video camera 10 in the manner described, this is not limitative of the invention. Other circuit constitutions and transmission schemes may be adopted alternatively.

Illustratively, the audio signal, command information and X-Y displacement information may be modulated in any of digital and analog signal formats.

The audio signal may be fed to the transmission processor 90 either following A/D conversion and digital modulation by the modulator 97, or after modulation at an appropriate frequency in analog signal format by the modulator 97.

The command information and X-Y displacement information may be supplied to the transmission processor 90 either in digital data format, or in analog signal format following D/A conversion and modulation at a suitable frequency by the modulator 97.

The multiplexing processor 98 may subject the audio signal, command information and X-Y displacement information to time division multiplexing, error corrective encoding and data compression if the information and signal are input in digital signal format. If the input information or signal is in analog signal format, the multiplexing processor 98 may perform frequency multiplexing using different carrier frequencies.

Obviously, other modulation methods such as QPSK (quadrature phase shift keying) modulation and PSK modulation may be adopted as desired for transmission and modulation purposes.

In the example of FIG. 12, the audio signal, command information and X-Y displacement information are multiplexed for transmission. Alternatively, they may be handled by two independently established transmitting circuits. In the alternative case, the two separate transmitting circuits may utilize different wireless communication media. Illustratively, one transmitting circuit may adopt a radio wave data transmission scheme and the other an infrared ray data transmission method.

The power switch 85 may be different from the type shown in FIG. 12, i.e., one that switches on and off the power supply line directly. As an alternative, the controller 92 may detect an operation of the power switch 85 and turns on or off the power supply circuit 100 accordingly.

Because the microphone 89 is of a type that may be extended and retracted as shown in FIG. 5, the microphone 89 itself may be utilized as a power switch. For example, power may be turned on and off by extending and retracting the microphone 89 respectively.

3-2 Video Camera

Figure 13A:
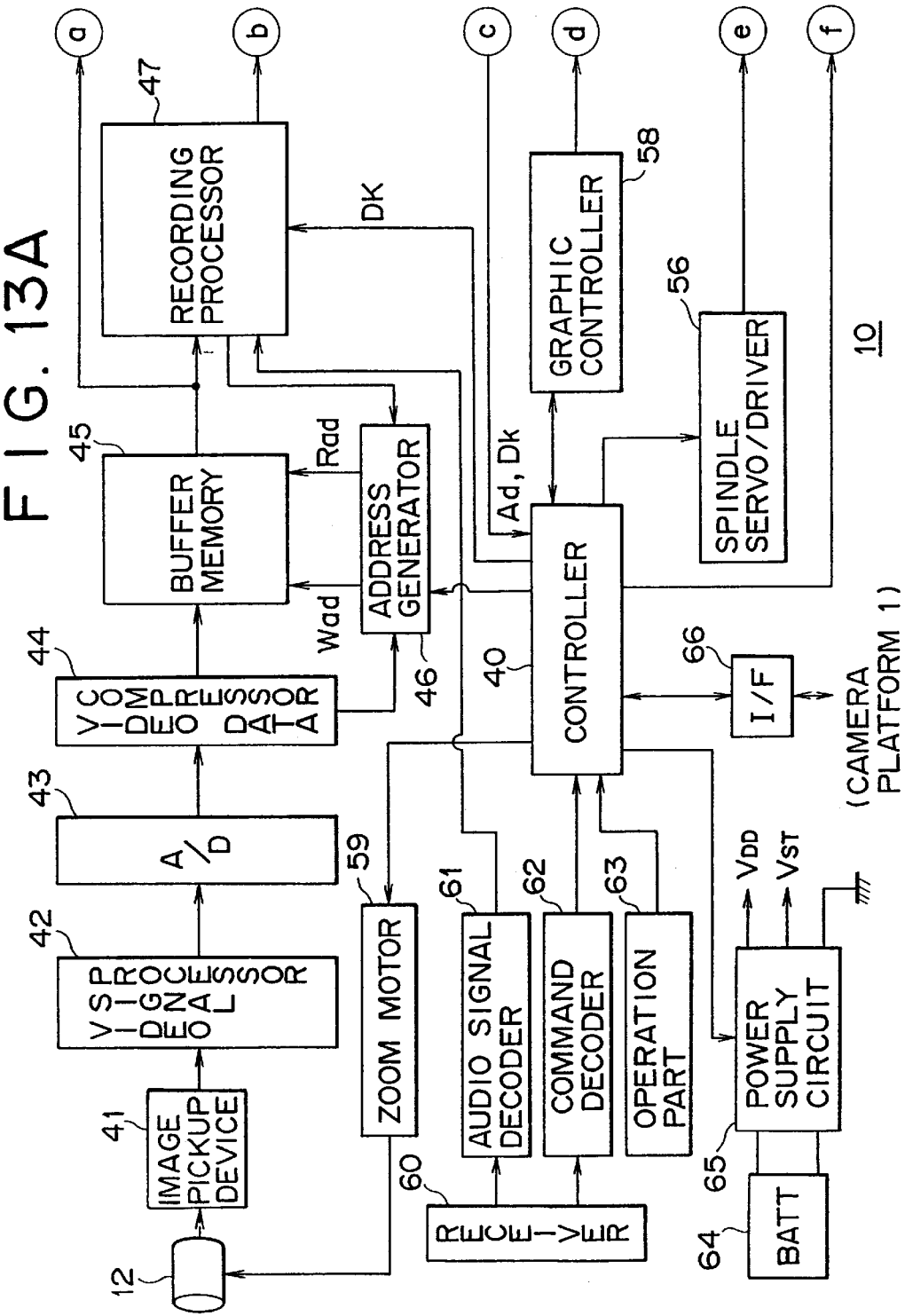
FIG. 13 is a block diagram of the video camera of the embodiment.

The video camera is structured as shown in a block diagram of FIG. 13. An image pickup device 41 is constituted illustratively by a CCD (charge coupled device) that forms a two-dimensional image area composed of a matrix of pixels representing either red (R), green (G) and blue (B); or yellow (Ye), cyan (Cy) and magenta (Mg).

Light from an object arrives through the lens mechanism 12 and an image of the object is formed by the CCD.

Electrical charges commensurate with the quantity of the received light are output as electrical signals. Specifically, an R signal, a G signal and a B signal are output as video signals.

The video signals from the image pickup device 41 are fed to a video signal processor 42 whereby CDS (correlated double sampling) data extraction and AGC amplification are carried out. The output of the video signal processor 42 is converted to R, G and B data in digital format by an A/D converter 43.

The R, G and B signals (video data) digitized by the A/D converter 43 are sent to a video data compressor 44 for suitable data compression.

Data compression is performed in accordance with the recording format of a disk 90 that serves as the recording medium. That is, data are compressed in that format of recordings on the disk 90 which has been established with the recording capacity, frequency band and other parameters of the recordings taken into account. It follows that if the disk 90 has a recording format not requiring data compression, the processing by the video data compressor 44 is unnecessary.

The video data processed by the video data compressor 44 are placed into a buffer memory 45. An address generator 46 supplies a write address Wad for use in a write operation to the buffer memory 45. Given video data from the video data compressor, the buffer memory 45 stores the received data in accordance with write addresses Wad thus supplied.

The address generator 46 includes a write address counter, a read address counter and a clock generator. Count values on the write and read address counters are used to generate a write address Wad and a read address Rad respectively. Control over the buffer memory 45 for write and read operations thereto and therefrom is implemented by generating write and read addresses Wad and Rad. Such addresses are generated either in response to write requests from the controller 40 or video data compressor 44, or according to read requests from the controller 40 or a recording processor 47.

Illustratively, the video data compressor 44 outputs write requests periodically in response to the output of video data. In turn, the write address counter in the address generator 46 counts up and outputs write addresses Wad successively. This allows video data from image pickup operations to be placed consecutively into the buffer memory 45.

The write address counter performs its counting on the basis of a reference clock signal generated by the clock generator. This clock signal remains in synchronism with a clock signal for CCD transfer operations by the image pickup device 41.

The video data placed in the buffer memory 45 are retrieved in accordance with read addresses Rad. The video data thus retrieved are supplied to the recording processor 47 as well as to a monitor picture generator 51.

The recording processor 47 generates signals to be recorded to the disk 90 retained as a video/audio data recording medium in the video camera 10. Specifically, the recording processor 47 modulates the video data from the buffer memory 45 and supplements with error correcting codes to the data, whereby the data are converted to an appropriate format in compliance with the disk 90. The video data are then fed to a read/write head 48.

The read/write head 48 writes to the disk 90 the data in the form of write-ready signals from the recording processor 47.

The recording processor 47 or controller 40 outputs read requests to the address generator 46 so that reading of video data from the buffer memory 45 will be suitably timed to the recording status of the read/write head 48.

Signal information sent by radio from the transmitter 99 of the microphone commander 80 is received by a receiver 60. The received information is supplied to an audio signal decoder 61 and a command decoder 62.

The audio signal decoder 61 decodes the received data in accordance with the audio signal transmission method specific to the microphone commander 80. In so doing, the audio signal decoder 61 demodulates the audio signal collected by the microphone 82 (and performs A/D conversion if necessary) and feeds digitized audio data to the recording processor 47.

The recording processor 47 encodes the audio data from the audio signal decoder 61 together with the video data from the buffer memory 45 in accordance with the recording format in effect. The encoded data are sent as write-ready data to the read/write head 48.

As will be described later, the audio signal picked up by the microphone 124 of the headset 120 is transmitted by the transmitting circuit in the transmitter/battery pack 123, and received by the receiver 60. The received audio signal is also decoded by the audio signal decoder 61 and sent to the recording processor 47.

Audio data gathered by the microphone 82 of the microphone commander 80 and those collected by the microphone 124 of the headset 120 are all written to the disk 90. Optionally, two streams of audio data from the two microphones 82 and 124 may recorded separately by use of a two-channel stereo recording scheme. For example, different carrier frequencies may be used by the microphone commander 80 and by the headset 120 in transmitting their respective audio data. The receiver 60 may then be arranged to receive the two different frequencies separately.

Alternatively, the camera user may utilize the microphone 124 of the headset 120 as an internal communicator (intercom or INCOM) for communication with other operators of the system. If the microphone 124 is used exclusively for internal communication, the receiver 60 need only be arranged not to receive or demodulate any audio signal transmitted by radio from the microphone 124.

If the microphone 124 is switched between two uses, i.e., between picking up audio data to be recorded and serving for internal communication, the switching action may be carried out using an operating key of the video camera 10. The receiver 60 may then be set to receive or reject data transmissions from the microphone 124 depending on the switched state of that particular operating key.

As another alternative, switchover between the pickup of write-ready audio data and the use for internal communication may be effected on the side of the headset 120. In response to the switchover operation thus carried out, the headset 120 may change transmission carrier frequencies suitable for the audio signal in effect. In such a case, the receiver 60 need only be arranged to reject the carrier frequency for internal communication; there is no need for making any switching operation on the video camera 10.

The disk 90 is a portable, writable disk such as a phase-change type optical disk, a magneto-optical disk, a write-once type optical disk or a magnetic disk. The read/write head 48 may comprise an optical head or magnetic head in keeping with the adopted disk type. The head 48 thus prepared writes and reads data to and from the disk 90.

Although the embodiment above has been shown using the disk type recording medium, this is not limitative of the invention. Alternatively, a tape type recording medium such as a magnetic tape, a card type recording medium or a solid state memory device may be employed instead.

The-disk 90 is rotated by a spindle motor 57 operating on the CLV (constant linear velocity) method or CAV (constant angular-velocity) method. A spindle servo/driver 56 provides drive and servo control over the spindle motor 57 on the basis of directions from the controller 40.

It is while the disk 90 is being rotated that a write head part in the read/write head 48 writes data to the disk surface. During a write operation by the read/write head 48, a servo processor 54 generates servo error signals such as a tracking servo error signal, a focus servo error signal and a thread servo error signal to a servo driver 55. Given such error signals, the servo driver 55 outputs drive signals to effect focusing and tracking control on head scan by the read/write head 48 and to execute thread movements.

When the read/write head 48 reproduces data from the disk 90, the information retrieved from the disk surface is fed to a reproduction processor 49 for decoding.

The reproduction processor 49 carries out demodulation and error correction of the received data in accordance with the recording format of the disk 90, whereby video and audio data are extracted. Furthermore, the reproduction processor 49 extracts both management information for managing video/audio data recorded on the disk 90 and addresses on the disk. The management information and address information thus retrieved are sent to the controller 40.

Illustratively, the audio data reproduced from decoding are subjected to D/A conversion. The data following the conversion are output as an analog audio signal to an audio output terminal 53A.

The audio output terminal 53A is illustratively one of the input/output terminals 32 shown in FIG. 3. The terminal 53A supplies an external device with audio signals reproduced from the disk 90. Alternatively, the audio output terminal 53A may output digital-format audio signals after reproduction from the disk.

The video data decoded by the reproduction processor 49 are placed into a frame memory 50. From the memory 50, the video data are sent to a monitor picture generator 51 using appropriate timings.

The monitor picture generator 51 functions as a processor to generate video signals representing pictures that are displayed in the view finder 122 or on an external display device for monitoring purposes.

The monitor picture generator 51 is controlled in operation by a graphic controller 58 on the basis of an operation mode designated by the controller 40. In addition, the graphic controller 58 causes a character generator 67 to generate character picture signals needed in each operation mode selected, thereby creating a GUI operation screen, to be described later.

The monitor picture generator 51 may also supply video data retrieved from the buffer memory 45, as described above. That is, the monitor picture generator 51 can generate both the display-ready video signal to be monitored using video data from ongoing image pickup, and the display-ready video signal using reproduced video data. Under control of the graphic controller 58, the monitor picture generator 51 composes a necessary character picture in a picked-up monitor image or a reproduced image, thereby generating a display-ready video signal that is sent to the transmitter 52 and a video output terminal 53V.

The transmitter 52 subjects display-ready video signals from the monitor picture generator 51 to modulation and frequency conversion in an appropriate transmission format. The signals thus processed are transmitted by radio to the headset 120. In other words, pictures to be monitored or those reproduced are transmitted to the headset 120 in accordance with the operation mode in effect. These transmitted pictures will be described later in more detail.

The video output terminal 53V is one of the input/output terminals 32 shown in FIG. 3. The video output terminal 53V serves to supply an external device with reproduced video signals from the disk 90 so that the external device may display pictures for monitoring or playback purposes. The video output terminal 53V may output either digitized or analog video signals.

With this embodiment, the video camera 10 is arranged not to transmit any audio signal to the headset 120. Alternatively, the transmitter 52 may be supplied with the reproduced and decoded audio data from the reproduction processor 49 as well as with the audio signal coming from the microphone commander 80 and decoded by the audio signal decoder 61. The transmitter 52 may then transmit the received data to the headset 120.

In that case, the headset 120 may include an audio signal demodulator circuit and an earphone assembly allowing the user wearing the headset to hear monitored or reproduced sounds.

As described, to use the headset 120 additionally for internal communication with other operators requires supplementing the headset 120 with audio signal demodulator circuit and earphone arrangements for that purpose. The requirement can be met advantageously if the audio signal demodulator-circuit and earphone facilities attached initially to the headset 120 are switched as needed between the use for internal communication and that for audio signal monitoring, and if the transmitter 52 transmits audio signals that are received by the headset 120 for monitoring purposes. Such arrangements will make effective use of the available components of the system ensuring better system performance.

The controller 40 is constituted by a microcomputer that controls the video camera 10 as a whole.

An operation part 63 corresponds to the operating members (20–31) shown in FIGS. 2 and 3. The operation part 63 is monitored for its working status by the controller 40. When a specific operation of the operation part 63 is detected, the controller 40 executes necessary actions commensurate with the detected operation.

Of the information received by the receiver 60, the command information and X-Y displacement information from the microphone commander 80 are decoded by the command decoder 62 before being fed to the controller 40. Given such command information from the command decoder 62, the controller 40 performs control actions reflecting the received information.

X-Y displacement information serves as a basis for implementing the air-mouse function, to be described later. The controller 40 manages the X-Y displacement information using a suitable coordinate system, and supplies the graphic controller 58 with that information so that the latter will control a pointer position displayed on a picture of the display-ready video signal generated by the monitor picture generator 51.

A zoom monitor 59 moves a zoom lens in the lens mechanism 12 to vary the zoom state between the wide-angle phase and the telephoto phase. Drive control of the zoom motor 59 is executed by the controller 40 in line with zoom manipulations that may be carried out.

An interface 66 is provided to ensure communication between the controller 40 and circuitry in the camera platform 1 (i.e., controller 71) when the video camera 10 is mounted on the platform 1. In response to panning and tilting directions, the controller 40 supplies panning and tilting information to the camera platform 1 through the interface 66.

A power supply circuit 65 outputs an operating voltage VDD to the relevant components by tapping batteries 64 housed in the battery pack 17. The supply voltage VDD is switched on and off by the controller 40 controlling the power supply circuit 65 in response to a detected operation of the power key 31. This feature rests on the constant supply of a feeble standby voltage VST to the controller 40. With power turned off, the standby voltage VST still allows the controller 40 to detect an operation of the power key 31 and to perform necessary actions, i.e., switching on or off power.

Alternatively, an AC adapter may be utilized or an AC/DC converter may be incorporated so as to draw on a commercial AC power source.

3-3 Camera Platform

FIG. 14 is a block diagram outlining an internal constitution of the camera platform 1. An interface 70 corresponds to the interface 66 of the video camera 10. With the video camera 10 mounted on the camera platform 1, connectors of the interfaces 66 and 70 are coupled to permit communication between the controller 40 of the video camera 10 and the controller 71 of the camera platform 1.

The camera platform 1 includes a pan driver 72 and a pan motor 73. Upon receipt of panning information from the controller 40, the controller 71 instructs the pan driver 72 to drive the pan motor 73 accordingly. This causes the pan/tilt mechanism 5 shown in FIG. 1 to rotate horizontally, i.e., to pan to put the video camera 10 in the desired direction for image pickup.

The camera platform 1 also includes a tilt driver 74 and a tilt motor 75. Given tilting information from the controller 40, the controller 71 instructs the tilt driver 74 to drive the tilt motor correspondingly. This causes the pan/tilt mechanism 5 to swing vertically, i.e., to tilt to position the video camera 10 in the desired direction for image pickup.

Alternatively, the camera platform 1 may comprise a receiver and a command decoder equivalent to the receiver 60 and command decoder 62 of the video camera 10. With this structure, panning and tilting instructions from the pan/tilt key 83 of the microphone commander 80 may be detected directly by the added components of the video camera 10 for the execution of panning and tilting.

As another alternative, the camera platform 1 may exclude the controller 71. In this setup, the controller 40 of the video camera 10 may directly control the pan driver 72 and tilt driver 74.

3-4 Headset

FIG. 15 is a block diagram of the headset 120. The headset 120 has its circuits composed primarily of a view finder part 130, a microphone part 131 and a power supply circuit 139.

When the power switch 125 shown in FIG. 6 is turned on, the power supply circuit 139 supplies the operating voltage VDD to the relevant components by tapping batteries (dry cells or rechargeable batteries) in the transmitter/battery pack 123.

Specifically, turning on the power switch 125 closes switches 125a and 125b in FIG. 15. This allows the power supply circuit 139 to feed the supply voltage VDD to the view finder part 130 and microphone part 131.

Although not detailed in FIG. 6, the power switch 125 may be set to any one of four positions: all power off (i.e., both switches 125a and 125b off), power on to the view finder part 122 alone (only switch 125a on), power on to the microphone part 131 alone (only switch 125b on), and power on to the view finder part 122 and microphone part 131 (switches 125a and 125b on).

Alternatively, two power switches 125a and 125b each switchable between two settings may be furnished. That is, the view finder part 122 and the microphone part 131 may be provided with a dedicated switch each such as the power switch 125 in FIG. 6.

The view finder part 122 is designed to present the camera user with a display-ready video signal sent from the video camera 10. The view finder part 122 comprises a receiver 132, a video signal decoder 133, a display controller 134 and a display part 135.

The receiver 132 receives a display-ready video signal sent from the transmitter 52 of the video camera 10, and forwards the received signal to the video signal decoder 133. The video signal decoder 133 decodes the received signal to obtain the display-ready video signal.

The decoded display-ready video signal is supplied to the display controller 134. The display controller 134 acts as a display driver attached to the display part 135 that may be implemented in the form of a liquid crystal display panel. As such, the display controller 134 causes the display part 135 to display the display-ready video signal supplied from the video signal decoder 133.

The display-ready video signal represents such screens as a monitor screen, a standby screen and an edit screen, to be described later in detail. The monitor screen is a screen which shows scenes being picked up in the field together with characters depicting the current recording status. The standby and edit screens are each a character-supplemented screen for implementing GUI (graphic user interface) features.

The display function allows the camera user wearing the headset 120 to monitor the currently recorded images along with their recording status as well as to edit the recordings in a sophisticated fashion through GUI-based manipulations.

The microphone 131 includes the microphone 124, a microphone amplifier 136, a modulator 137 and a transmitter 138. With the headset 120 worn by the camera user as depicted in FIG. 6, the microphone 124 positioned close to the user's mouth picks up the user's voice and converts the voice to an electrical signal for output. The electrical signal thus output is amplified by the microphone amplifier 136. The amplified signal is suitably modulated by the modulator 137 before being sent to the transmitter 138.

After the audio signal is modulated by the modulator 137 at a predetermined carrier frequency, the transmitter 138 outputs the modulated audio signal for transmission by radio. The audio signal from the transmitter 138 is received by the receiver 60 of the video camera 10 as described earlier. The received signal is decoded by the audio signal decoder 61 into a digitized audio signal. The signal is then supplied as digital-format audio data to the recording processor 47 for write operations to the disk 90.

As described above, the power supply assembly is arranged so that either the microphone part 131 or the view finder part 130 alone may be switched off. If it is desired not to record to the disk 90 the user's voice picked up by the microphone 124, the setup above permits the microphone part 131 alone to be switched off. If, on the other hand, the headset 120 is desired to be used only as a microphone, the view finder part 130 may be turned off. Besides its manifest convenience, the selective switchover action is also conducive to economizing on the service life of the batteries 140.

Furthermore, if the microphone part 131 is used for internal communication as described earlier, being able to switch on the microphone part 131 alone can be a very convenient feature.

The display part 135 is illustratively made of a liquid crystal display panel. The LCD panel is preferably switched between two display modes: a mode in which pictures are displayed, and a mode in which external light is allowed to transmit with no picture displayed, i.e., with the panel remaining transparent or translucent. When the headset 120 is worn by the camera user, such a display panel allows the user to see through the display part 135 when pictures need not be viewed, so that the user may concentrate on maneuvering the camera with the otherwise occupied eye now unobstructed. If the display part 135 stays transparent or translucent while the headset 120 or the view finder part 122 is switched off (i.e., with no power supplied), the camera user's ease of maneuver is enhanced with one eye unobstructed.

While the above embodiment has been shown having the headset 120 turned on and off by the power switch 125, this is not limitative of the invention. Alternatively, the headset 120 may be switched on and off in keeping with the activation and deactivation of the video camera 10. Such interlocked action is made possible illustratively by having a power command included in signals sent from the transmitter 52 to the receiver 132.

As another alternative, the view finder part 122 and microphone part 131 may be so arranged as to be always turned on and off together. This arrangement may be preferred where internal communication capabilities are not needed or where a simplified circuit constitution involving a common power switch is given priority over sophisticated functions.

4. Operation Modes 4-1 Mode Transition

The above image pickup system of the invention has been shown-incorporating the parts and components described above. In operation, this system provides diverse functions when placed in a plurality of modes that are switched as shown in FIG. 16.

Mode switching operations are carried out by use of the mode switch 24 shown in FIG. 3. Operating the mode switch 24 causes the video camera 10 to enter and leave any one of an image pickup mode and an edit mode, as depicted in FIG. 16.

The image pickup mode is a mode in which picture images are picked up and video signals (together with audio signals) representing the captured images are recorded to the disk 90.

The image pickup mode further divides into a standby mode and a recording mode. One of these two modes is selected by operation of the ST/ST key 21 or 86. The standby mode represents a state in which the camera is on standby and ready to roll. The recording mode is a mode in which pictures being picked up are currently recorded (to the disk).

Initially, the image pickup mode is selected by operating the mode switch 24. The switch operation places the video camera 10 in the standby state in preparation for image pickup. When the camera user operates the ST/ST switch 21 or 86 to start picking up images, the video camera 10 enters the recording mode. In this mode, signals representing images of the object and the accompanying sounds gathered by the microphones 82 and 124 are recorded to the disk 90.

At the end of the image pickup activity, the camera user again operates the ST/ST key 21 or 86 to place the video camera 10 back into the standby mode.

The edit mode is selected by operation of the mode switch 24 distinct from the image pickup mode (standby mode or recording mode). The edit mode allows video/audio recordings on the disk 90 to be reproduced therefrom, and permits video and audio data to be edited as needed. In this mode, sophisticated editing functions supported by GUI (graphic user interface) features are made available, as will be described later in more detail.

Each of the operation modes, i.e., standby mode, recording mode and edit mode, will be described below successively. In different modes, the video camera 10 responds variably to the information sent from the microphone commander 80 and headset 120, as summarized in FIG. 17. In FIG. 17, circles stand for an accepted input each and crosses for an ignored input each.

The audio signal sent from the microphone commander 80 or headset 120 is accepted only in the recording mode. It is only in the recoding mode that the received audio signal is processed as a signal to be recorded. In any other mode, the audio signal is not processed upon receipt. Alternatively, if the headset 120 is supplemented with audio output features such as earphones, the transmitter 52 may transmit the audio signal received by the receiver 60 regardless of the current mode so that the user may monitor the sounds picked up by the microphone commander 80.

An operation of the ST/ST key 86 (as well as the ST/ST key 21 of the video camera 10) is interpreted by the controller 40 as an instruction to start picking up images (i.e., start recording) if the standby mode is in effect, or as an instruction to end the image pickup activity if the recording mode is being selected. The video camera 10 is thus instructed to start or terminate the image pickup action depending on whether the standby mode or recording mode is currently in effect.

Upon receipt of command information coming from an operation of the mark/click key 87 of the microphone commander 80, the controller 40 in the recording mode accepts the information as a marking operation. In the standby mode or edit mode, on the other hand, the controller 40 accepts the command information as representative of a click on a GUI screen. GUI-based operations are effective when the microphone commander 80 is used as an airmouse. Key operations denoting markings needed in the recording mode are also utilized as key operations representing mouse clicks when the microphone commander 80 acts as an air-mouse.

If command information coming from an operation of the pan/tilt key 83 or zoom key 84 (as well as the zoom key 23 on the video camera 10) is inputted, the controller 40 accepts the command only if the standby mode or recording mode is in effect. With the command accepted, the controller 40 causes the camera platform 1 to pan or tilt, or drives the zoom motor 59 for zoom action accordingly. In the edit mode, such command information is regarded as invalid.

X-Y displacement information allowing the microphone commander 80 to act as a mouse to move a pointer on a GUI screen represents air-mouse commands. This kind of information is accepted as effective information in the standby mode or edit mode in which the microphone commander 80 is employed as an air-mouse. Relevant processes such as the generation of a pointer picture in a display-ready image sent from the transmitter 52 and the management of the displayed pointer position are controlled on the basis of that X-Y displacement information.

As described, the image pickup system embodying the invention changes its functions as the video camera 10 is switched between three operation modes (standby mode, recording mode, edit mode). However, it is assumed for this embodiment that the contents of what is outputted or transmitted and the display-related controls remain unchanged regardless of the functional changes (i.e., mode transition of the video camera 10).

That is, the microphone commander 80 simply functions as a transmitter for transmitting information, i.e., for continuously outputting and transmitting audio signals, command information and X-Y displacement information. On the receiving side, the video camera 10 accepts selectively the incoming audio signal, command information or X-Y displacement information and determines the intended functions thereof in accordance with the operation mode currently in effect.

The headset 120 displays the transmitted display-ready image and transmits continuously the audio signal picked up by the microphone 124. Mode-specific changes in the display-ready image or in the transmitted audio signal are all carried out inside the video camera 10 (i.e., by the monitor picture generator 51 and audio signal decoder 61). The headset 120 offers only display and microphone functions.

As an obvious alternative, the microphone commander 80 may be allowed to select the information to be output in keeping with the current operation mode of the system, or the headset 120 may control the display screen or turn on and off audio signal transmission in a mode-specific fashion. In such cases, the microphone commander 80 and headset 120 need only be structured to detect the operation mode of the video camera 10. One practical method for such mode detection may involve attaching a mode information transmitter to the video camera 10 and furnishing the microphone commander 80 and headset 120 with a mode information receiver each. In operation, the microphone commander 80 and headset 120 using their receivers may detect the mode status of the video camera 10 and set up the corresponding mode automatically.

It is also possible to provide the microphone commander 80 and headset 120 with a mode switching member such as the mode switch 24 of the video camera 10. The mode switching member, if provided, will allow the user to switch between the edit mode and the image pickup mode.

Given the fact that the microphone 82 is an extendible-retractable type, the microphone commander 80 may be utilized as a mode switch. Illustratively, the image pickup mode (standby mode or recording mode) may be selected by extending the microphone 82, and the edit mode may be chosen by retracting the microphone 82.

4-2 Standby Mode

Figure 18A:
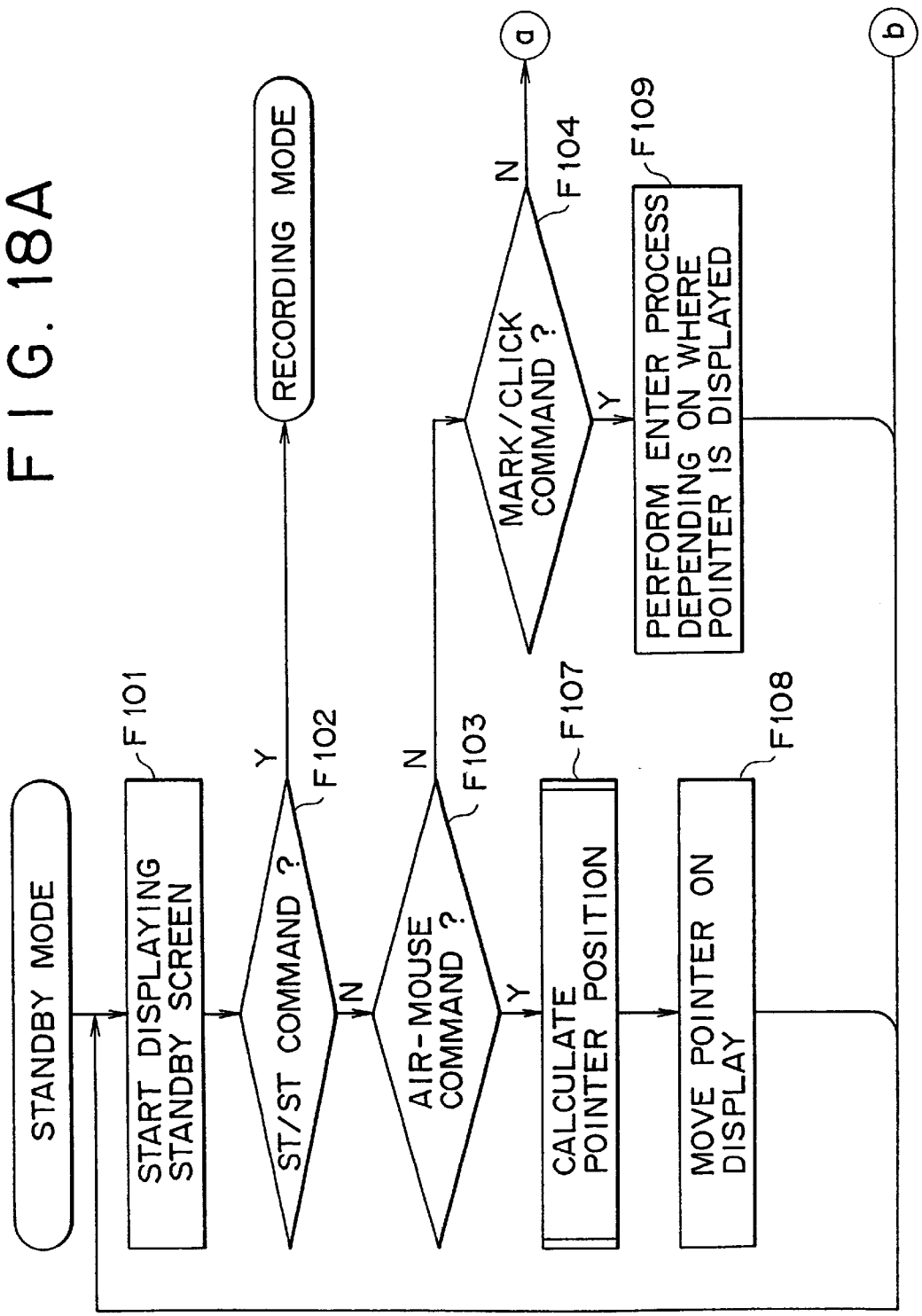
FIG. 18 is a flowchart of steps performed in a standby mode of the embodiment.
Figures 18, 18B:
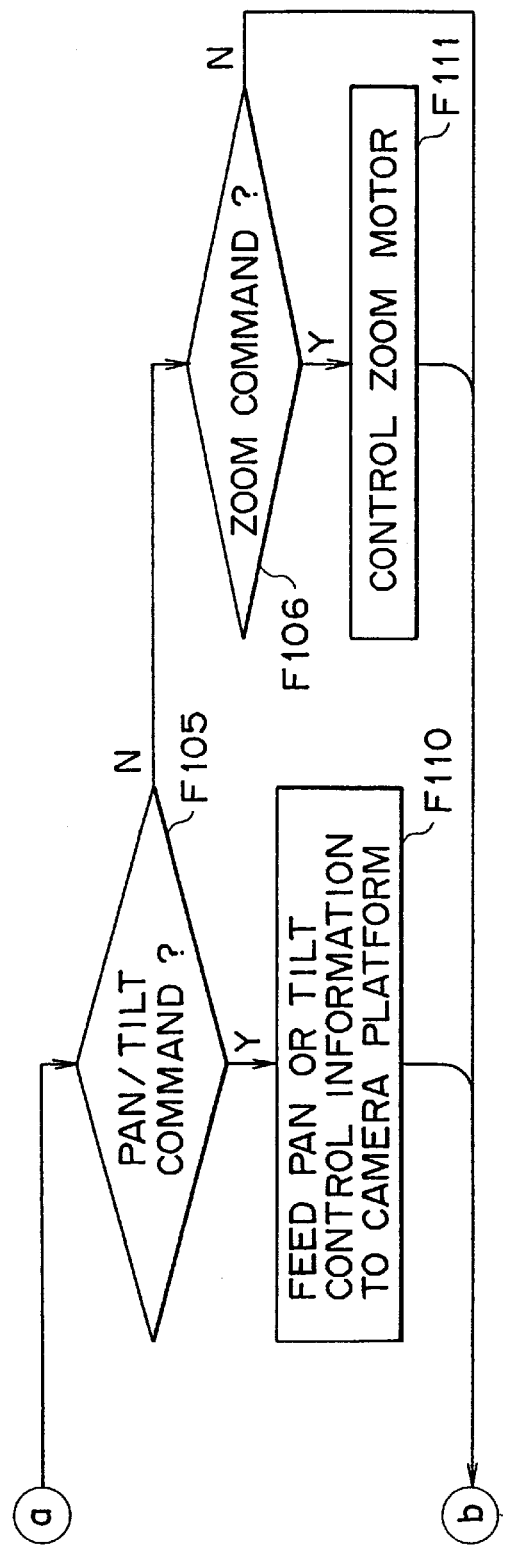

Below is a description of how the controller 40 operates to implement the functions specific to each of the different modes mentioned above. FIG. 18 is a flowchart of steps constituting the processing of the standby mode.

The standby mode is a preparatory stage before a transition to the recording mode. As such, the standby mode allows the user to select an object to be picked up, the desired direction of image pickup (i.e., pan/tilt), zoom status and other necessary settings. Once in the standby mode, the controller 40 reaches step F101 in which a standby screen starts to be displayed. Specifically, the controller 40 causes the monitor picture generator 51 to generate a display-ready video signal as a standby screen (see FIG. 30) using object images from the buffer memory 45 and a character image from the character generator 67. The object images in the buffer memory 45 were picked up by the image pickup device 41 and placed therein via the video signal processor 42. The display part 135 of the headset 120 is then made to start its display processing. Details of the standby screen such as one in FIG. 30 will be described later.

As indicated in FIG. 17, the controller 40 in the standby mode accepts operations of the ST/ST key 86 or 21, pan/tilt key 83, and zoom key 84 or 23.

If the ST/ST key 86 or 21 is operated, the controller 40 recognizes the operation as that for starting image pickup. The controller 40 then goes from step F102 to the processing of the recording mode, to be described later.

If command information coming from an operation of the pan/tilt key 83 is received, the controller 40 goes from step F105 to step F110. In step F110, the controller 40 feeds panning or tilting information to the camera platform 1. Given the information, the camera platform 1 drives the pan/tilt mechanism 5 to reach the image pickup direction (i.e., angle) desired by the user.

If the zoom key 84 or 23 is operated, the controller 40 goes from step F106 to step F111. In accordance with the command information thus supplied, the controller 40 controls the zoom motor 59 so as to shift the zoom status of the lens mechanism 12 toward the telephoto phase or wide-angle phase.

Figure 30:
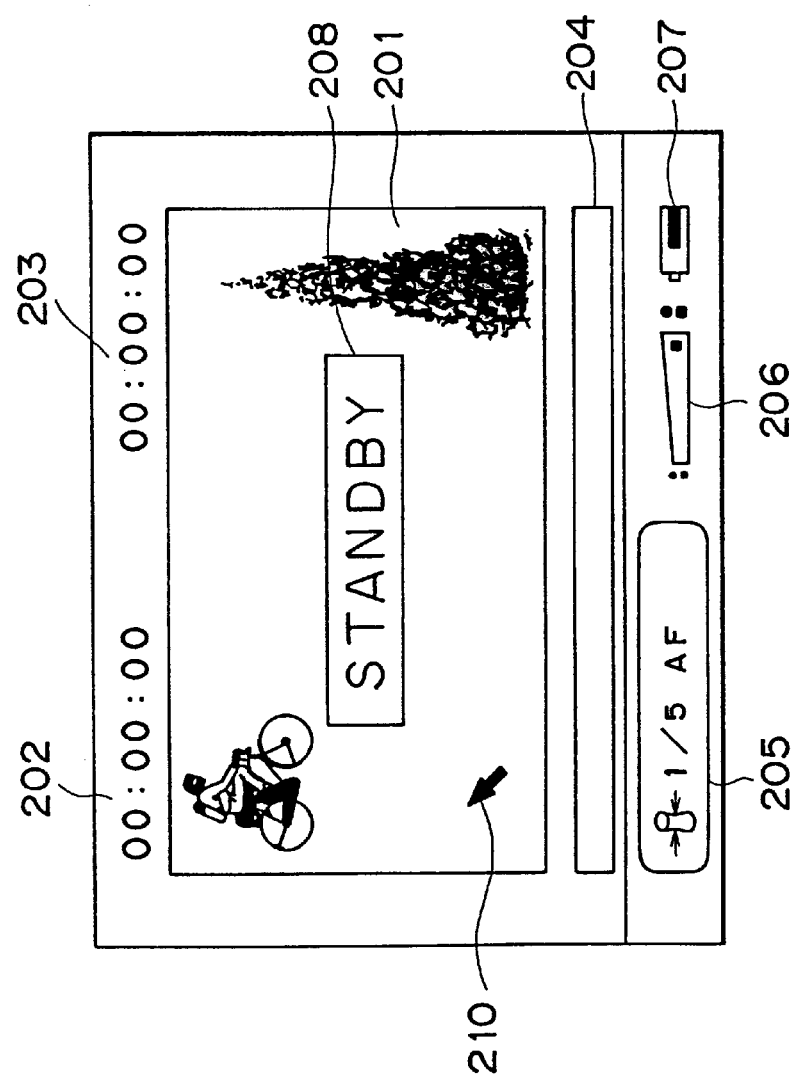
FIG. 30 is an explanatory view of a standby screen of the embodiment.

In the standby mode, GUI-based functions become effective with the microphone commander 80 used as an air-mouse. On the standby screen, a pointer 210 is displayed as shown in FIG. 30. The pointer 210 is moved on the screen by the user swinging the microphone commander 80 in his hand vertically or crosswise in the air.

The microphone commander 80 translates its own displacements into X-Y information and transmits the information to the video camera 10. On receiving the X-Y displacement information, the controller 40 goes from step F103 to step F107. In step F107, the controller 40 calculates a new display position of the pointer 210 based on the received X-Y displacement information. In step F108, the controller 40 causes the graphic controller 58 to control the monitor picture generator 51 so that the pointer 210 is placed in the newly calculated position. That is, the pointer 210 is moved into the new display position.

The mark/click key 87 functions as a click key. If command information coming from an operation of the mark/click key 87 is detected, the controller 40 goes from step F104 to step F109. In step F109, the controller 40 executes an enter process (i.e., selection of the operation to be performed) or the dragging of an icon in accordance with the position of the pointer 210 and according to the clicked state on the standby screen at that point in time.

How the microphone commander 80 is used as an air-mouse, how the pointer position is calculated in step F107, and how the enter process is performed in step F109 will be described later in more detail.

4-3 Recording Mode

Figure 19:
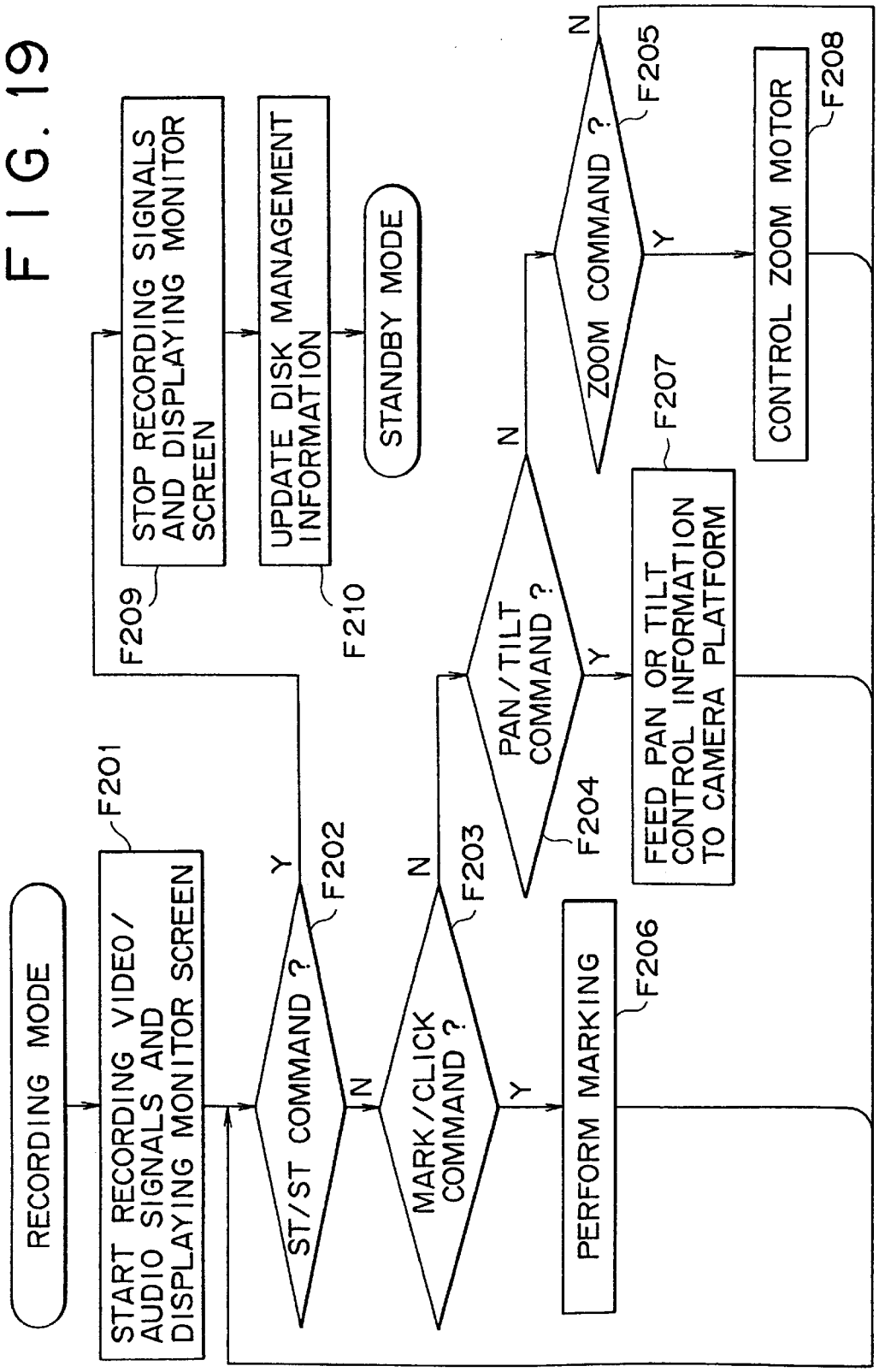
FIG. 19 is a flowchart of steps carried out in a recording mode of the embodiment.

When the standby mode is terminated and the recording mode is selected by operation of the ST/ST key 86 or 21, the controller 40 performs steps shown in FIG. 19.

The recording mode is a mode in which actual image pickup operations are carried out, i.e., recording of video/audio signals to the disk 90 takes place. Once in the recording mode, the controller 40 reaches step F201 in which video signals picked up by the image pickup device 41 and audio signals obtained by the audio signal decoder 61 are fed to the recording processor 47. The controller 40 then causes the read/write head 48, spindle servo/driver 56 and servo processor 54 to start recording the picked-up images and sounds to the disk 90.

At the same time, the controller 40 causes the monitor picture generator 51 to generate a display-ready video signal as a monitor screen (see FIG. 32) using object images (recorded images) from the buffer memory 45 and a character image from the character generator 67. The display part 135 of the headset 120 is then made to start its display processing. Details of the standby screen such as one in FIG. 32 will be described later.

As shown in FIG. 17, the microphone commander 80 in the recording mode does not function as an air-mouse. The controller 40 in this mode accepts operations of the ST/ST key 86 or 21, pan/tilt key 83, zoom key 84 or 23, and mark/click key 87 (and mark key 22).

If the ST/ST key 86 or 21 is operated, the controller 40 recognizes the operation as that for terminating image pickup. The controller 40 then goes from step F202 to step F209 to stop recording activities of the spindle servo/driver 56 and servo processor 54.

In step F210, the controller 40 updates management information held in a predetermined area on the disk 90 to reflect the recording status that has been effective so far. The updates permit managing a given visual and audio data portion from beginning to end illustratively as a cut, i.e., as a single image recording unit.

When the relevant processing related to recording is finished, the controller 40 reaches the standby mode shown in FIG. 18.

If command information coming from an operation of the pan/tilt key 83 is received in the recording mode, the controller 40 goes from step F204 to step F207. In step F207, the controller 40 feeds panning or tilting information to the camera platform 1. Given the information, the controller 40 causes the camera platform 1 to drive the pan/tilt mechanism 5 so as to reach the image pickup direction (i.e., angle) desired by the user.

If the zoom key 84 or 23 is operated, the controller 40 goes from step F205 to step F208. In accordance with the command information thus supplied, the controller 40 controls the zoom motor 59 so as to shift the zoom status of the lens mechanism 12 toward the telephoto phase or wide-angle phase.

In the recording mode, the microphone commander 80 is not used as an air-mouse. The mark/click key 87 is handled as a mark manipulation key.

Thus if command information coming from an operation of the mark/click key 87 is inputted, or if an operation of the mark key 22 on the video camera 10 is detected, the controller 40 goes from step F203 to step F206 for a marking process. The marking process illustratively involves preparing and retaining a time code given to recorded images at that point in time, i.e., information denoting recording points in a cut. Mark information such as the time code is written to a predetermined area on the disk 90 when management information is updated in step F210.

4-4 Edit Mode

Figure 20:
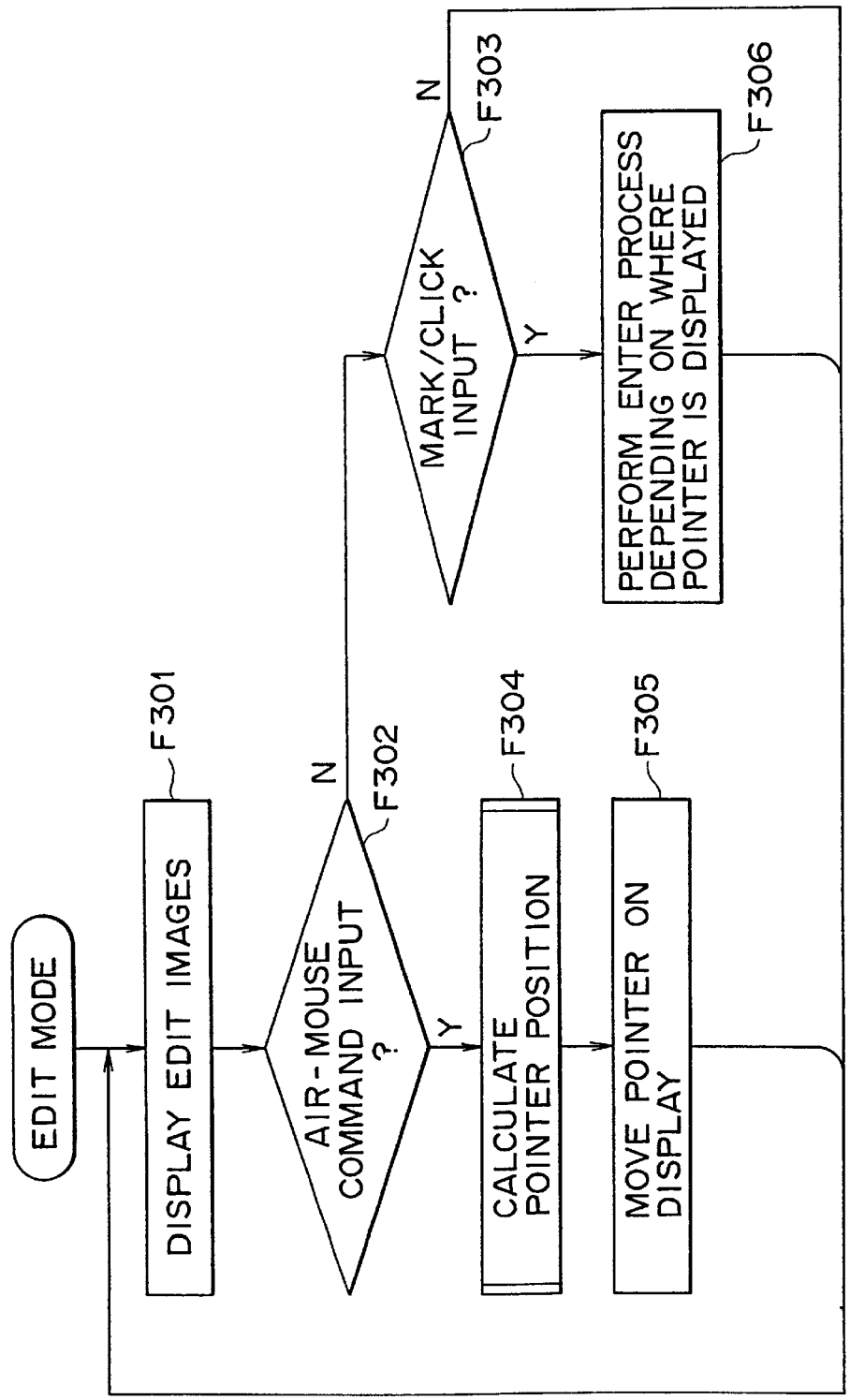
FIG. 20 is a flowchart of steps conducted in an edit mode of the embodiment.

When the edit mode is selected by operation of the mode switch 24, the controller 40 performs processing constituted by steps shown in FIG. 20.

The edit mode is a mode in which to reproduce images from the disk 90 and to edit the reproduced images. Once in the edit mode, the controller 40 reaches step F301 in which edit screens start to be displaced. Specifically, the controller 40 causes the monitor picture generator 51 to generate display-ready video signals representing such edit screens as a preview screen, a trim/edit screen and a clip/arrange screen (shown in FIG. 33 and subsequent figures) by use of disk-reproduced images from the frame memory 50 and pictures from the character generator 67. The display part 135 of the headset 120 is then made to start its display processing. Each of the edit screens will be described later in more detail.

As indicated in FIG. 17, the controller 40 in the edit mode accepts only air-mouse commands and the operation of the mark/click key 87. That is, the edit mode enables GUI functions with the microphone commander 80 used as an air-mouse.

Figure 33:
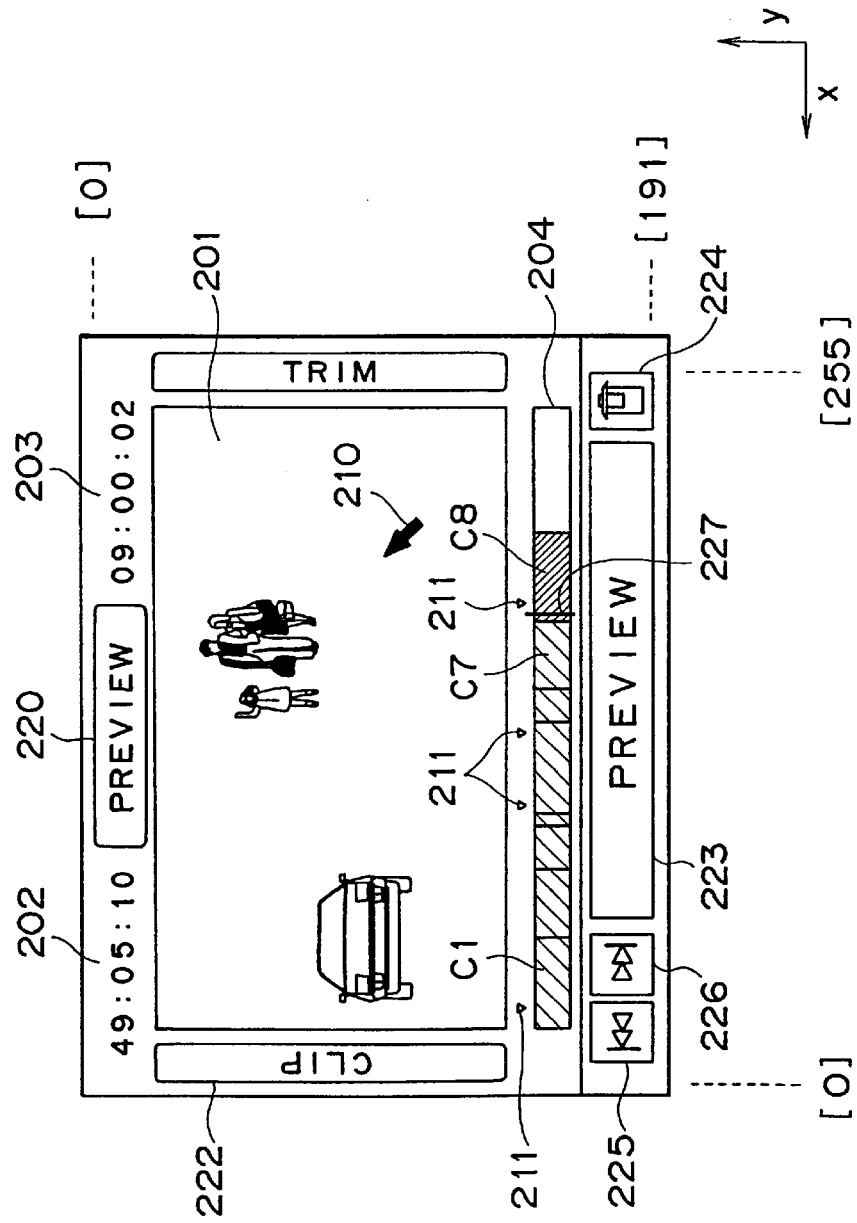
FIG. 33 is an explanatory view of a preview screen of the embodiment.

As shown in FIG. 33, the pointer 210 appears on an edit mode screen. The user swings the microphone commander 80 in his hand vertically or crosswise to move the pointer 210 as desired on the screen.

The microphone commander 80 translates its own displacements into X-Y information and transmits the information to the video camera 10. On receiving the X-Y displacement information, the controller 40 goes from step F302 to step F304. In step F304, the controller 40 calculates a new display position of the pointer 210 based on the received X-Y displacement information. In step F305, the controller 40 causes the graphic controller 58 to control the monitor picture generator 51 so that the pointer 210 is placed in the newly calculated position. That is, the pointer 210 is moved into the new display position.

The mark/click key 87 functions as a click key. If command information coming from an operation of the mark/click key 87 is detected, the controller 40 goes from step F303 to step F306. In step F306, the controller 40 executes designating or selecting processes (with click and double click) or drag and drop operations in accordance with the position of the pointer 210 and according to the clicked state on the edit screen at that point in time. The manipulation of the pointer 210 and click-triggered air-mouse operations permit illustratively image reproduction, screen mode switchover and other editing activities.

Arrangements needed to use the microphone commander 80 as an air-mouse, calculations to find the pointer position in step F304, and the enter process in step F306 will be described below under the heading of the air-mouse function.

5. Air-Mouse Function

As described above, the microphone commander 80 of this embodiment, by outputting X-Y information representative of its own displacements as well as command information denoting click actions, may be used as an air-mouse for GUI operations.

The command generator 88 of the microphone commander 80 incorporates the movement sensor part 91 having angular velocity sensors. Movements of the microphone commander 80 are detected by the sensors as X-Y displacement information that is outputted.

FIG. 21 illustrates an angular velocity sensor 105 containing piezoelectric ceramic elements 105b. The piezoelectric ceramic element operates on the principle that a Coriolis force is generated perpendicularly to the vibration of a vibrating body when the latter is subjected to a rotary angular velocity. The Coriolis force F is defined as $$F = 2mv\omega$$

where, m stands for mass, v for velocity and $\omega$ for angular velocity. That is, because the angular velocity $\omega$ is proportional to the Coriolis force F, the detection of the Coriolis force F permits acquiring a rotary angular velocity.

The piezoelectric ceramic elements 105b comprise a driving piezoelectric ceramic element 105c and a detecting piezoelectric ceramic element 105d. The driving piezoelectric ceramic element 105c is fed with an alternating signal, i.e., an oscillated output from an oscillator 105a. In the setup of FIG. 21, rotating the elements 105b in the direction of $\Omega 0$ applies a Coriolis force F to the detecting piezoelectric ceramic element 105d, which generates a voltage commensurate with the applied Coriolis force F.

A low voltage from the detecting piezoelectric ceramic element 105d is amplified by an amplifier 106. The amplified voltage is supplied to an A/D converter 107 which converts the received voltage into digital data (voltage value E).

The angular velocity $\omega$ applied to the piezoelectric ceramic elements 105b is proportional to the output voltage E, as shown in FIG. 22. If the voltage value E is compared illustratively with voltage values Va, Vb, Vc and Vd in FIG. 22, it is possible to detect the movement of the device carrying the piezoelectric ceramic elements 105b (e.g., crosswise swinging motion of the microphone commander 80).

Figure 23:
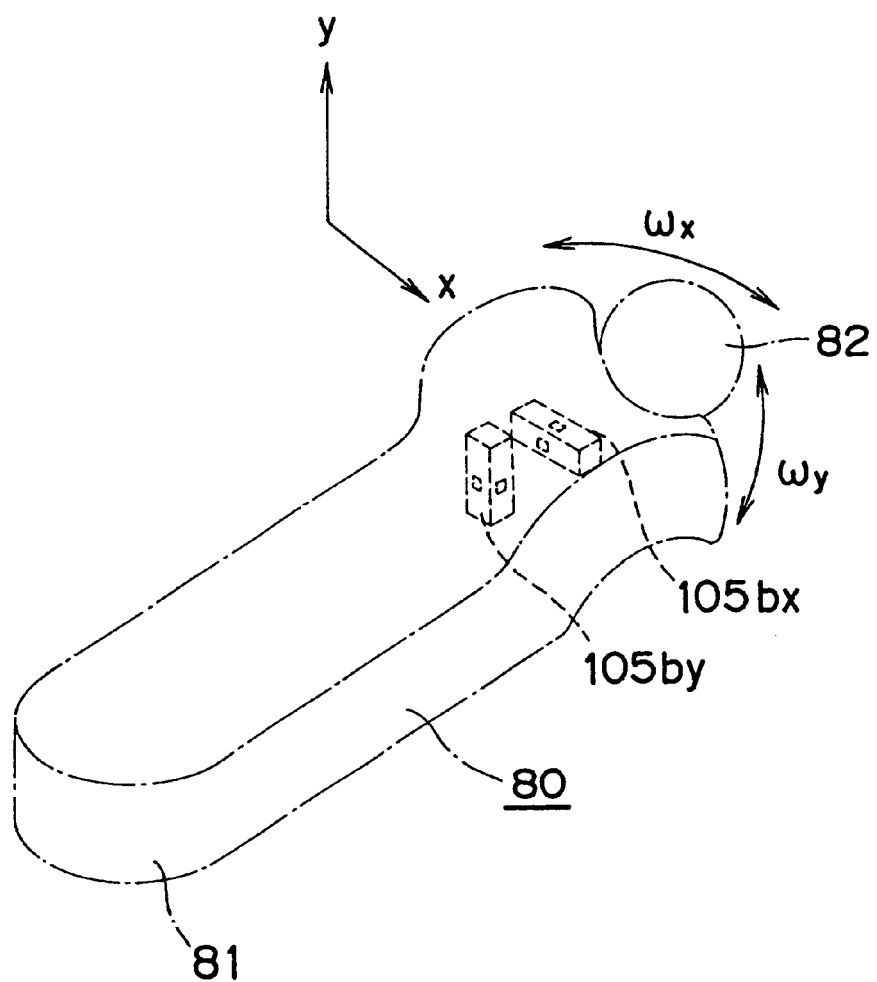
FIG. 23 is an explanatory view showing how angular velocity sensors of the embodiment are typically arranged.

If the piezoelectric ceramic elements 105b are arranged as shown in FIG. 23 (105bx and 105by) inside the microphone commander 80, the element 105by outputs a voltage E raised by the angular velocity ωy in effect when the microphone commander 80 is moved right, or outputs a voltage E lowered by the angular velocity ωy given when the microphone commander 80 is moved left. This makes it possible to detect movements of the microphone commander 80 in the crosswise direction.

More specifically, if the voltage E from the piezoelectric ceramic element 105by meets the condition of Vc<E<Vd, the microphone commander 80 is judged to be swung left; if the voltage E satisfies the condition of Va<E<Vb, the movement of the commander 80 is judged to be to the right.

The piezoelectric ceramic element 105bx, on the other hand, outputs a voltage E raised by the angular velocity ωx in effect when the microphone commander 80 is moved upward, or outputs a voltage E lowered by the angular velocity ωx given when the microphone commander 80 is moved downward. This permits detecting movements of the microphone commander 80 in the vertical direction.

More specifically, if the voltage E from the piezoelectric ceramic element 105bx meets the condition of Vc<E<Vd, the microphone commander 80 is judged to be swung upward; if the voltage E satisfies the condition of Va<E<Vb, the commander 80 is judged to be swung downward.

If the voltage value E falls within the range of Vb≦E≦Vc, any feeble movements of the microphone commander 80 will be interpreted as belonging to a dead zone, i.e., will not be detected as significant motions. This feature is provided so as not to destabilize pointer manipulations by the air-mouse that may on occasion be operated by the user's shaking hand in the air.

Figure 24:
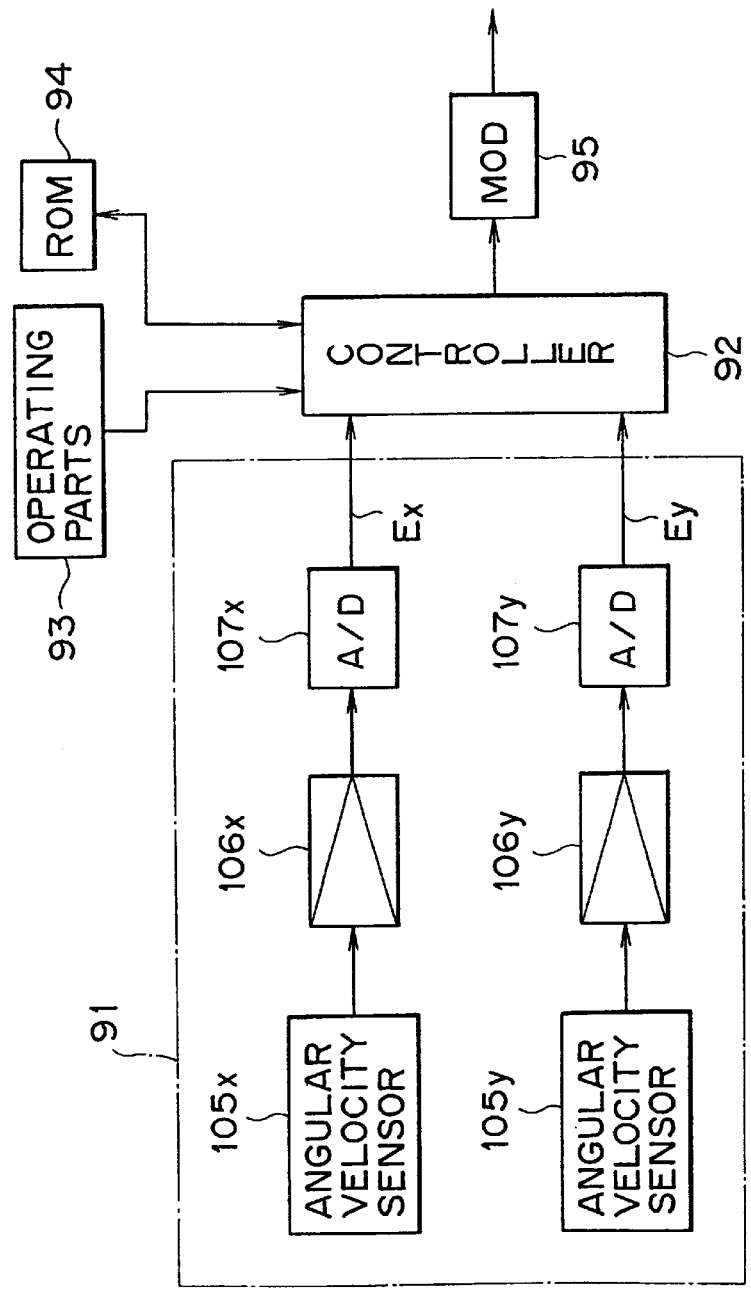
FIG. 24 is a block diagram of a command generator in the microphone commander of the embodiment.

FIG. 24 is a block diagram showing a typical structure of the movement sensor part 91 in the command generator 88 of FIG. 12, the structure including angular velocity sensors 105 (105X, 105Y) such as those described above. An output voltage from the angular velocity sensor 105X is fed to an amplifier 106X. The voltage is amplified up to an optimum level for input to an A/D converter 107X. The amplified voltage is digitized by the A/D converter 107X before being output as a voltage value Ex to the controller 92.

An output voltage from the angular velocity sensor 105Y is fed to an amplifier 106Y. The voltage is amplified up to an optimum level for input to an A/D converter 107Y. The amplified voltage is digitized by the A/D converter 107Y before being output as a voltage value Ey to the controller 92.

The voltage values Ex and Ey correspond to movements in effect when the microphone commander 80 is swung in the X and Y directions respectively. That is, the voltage values represent X-Y displacement information.

The controller 92 retrieves an X-direction command (i.e., rightward or leftward movement command) from the ROM 94 (or generates a suitable code value through calculations) in response to the input voltage value Ex. The controller 92 also retrieves a Y-direction command (upward or downward movement command) from the ROM 94 (or generates an appropriate code value through calculations) in response to the received voltage value Ey. The retrieved or generated commands are sent as X-Y displacement information to the modulator 95. The modulated information is outputted and transmitted from the transmission processor 90 shown in FIG. 12.

Figure 25:
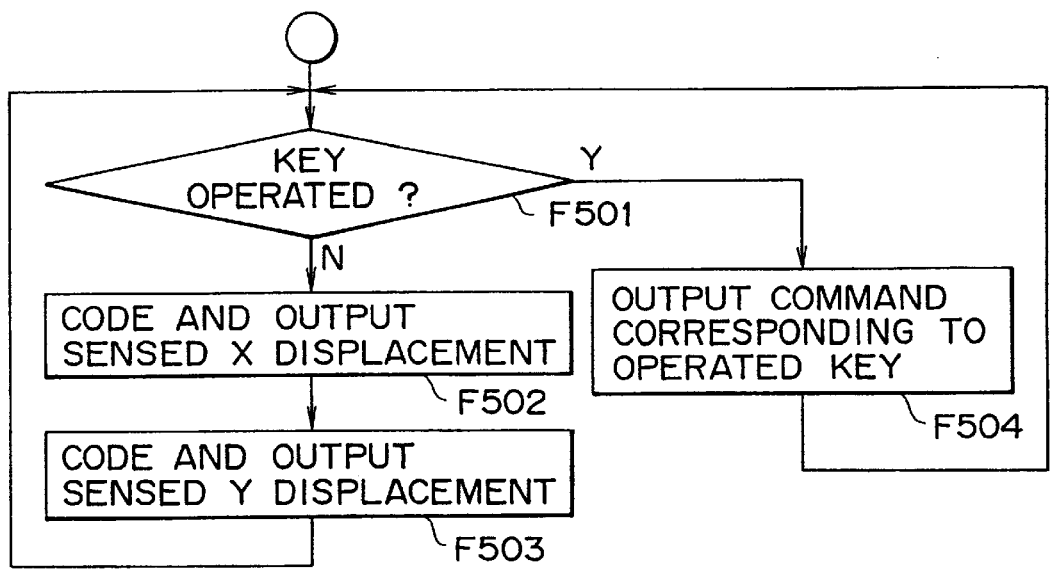
FIG. 25 is a flowchart of steps performed by the command generator of the embodiment in generating commands.

FIG. 25 is a flowchart of steps representing the generation by the controller 92 of commands involving X-Y displacement information. If any of the operating parts 93 is operated, i.e., if any of the operation keys of the microphone commander 80 (pan/tilt key 83, zoom key 84, mark/click key 87 or ST/ST key 86) is operated, the controller 92 goes from step F501 to step F504. In step F504, the command information corresponding to the operated key is retrieved from the ROM 94. The retrieved command information is sent from the modulator 95 to the transmission processor 90 for transmission to the video camera 10.

When any key is yet to be operated, steps F502 and F503 are carried out in which the input voltage values Ex and Ey are translated into the corresponding X-Y displacement information that is subsequently output.

On receiving the command information or the X-Y displacement information from the microphone commander 80, the video camera 10 carries out steps related to the air-mouse function. If the received command information is found to represent a click operation, the video camera 10 performs suitable processes (i.e., steps F109, F306) in accordance with the pointer position and the clicked state (click, double click, drag, etc.) in effect at that point in time. Given the X-Y displacement information, the video camera 10 moves the pointer on the screen accordingly (i.e, steps F108, F305).

When the X-Y displacement information is inputted to move the pointer 210 on the screen, a new pointer position needs to be calculated (steps F107, F304). With the pointer position thus computed, the graphic controller 58 is given the relevant data to get the pointer 210 displayed where designated on the screen.

Figure 26:
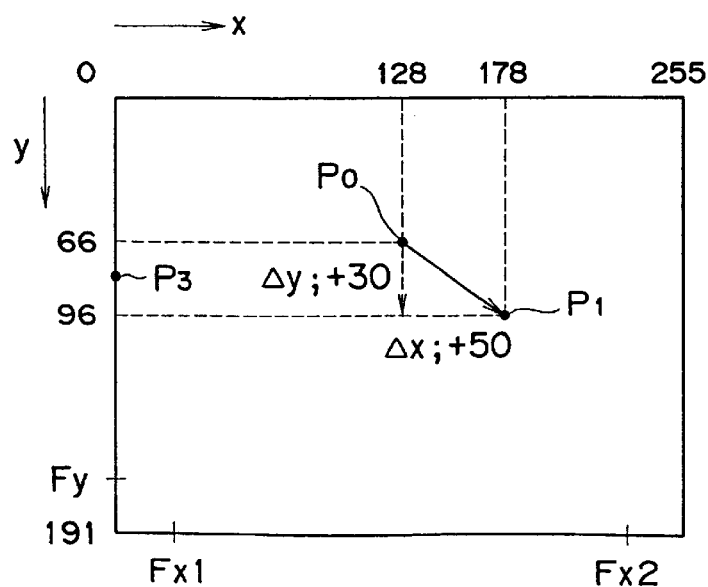
FIG. 26 is a graphic representation showing how displacement information is typically dealt with by the embodiment.

To implement pointer movements on display, the controller 40 of the video camera 10 has an X-Y coordinate system established corresponding to the screen of the display part 135 on the headset 120. The X-Y coordinate system is used to define the position and motion of the pointer 210 and such pictorial indications as icons displayed on the same screen. Illustratively, as shown in FIG. 26, a coordinate system of 256 dots (0–255) in the X direction and 192 dots (0–191) in the Y direction is established. It is in this coordinate system that the pointer position P0 has its coordinates defined.

When X-Y displacement information is inputted, the information is added to the coordinate values of the current pointer position P0. Adding up the input information and the current coordinate values calculates new pointer coordinates.

If a click is made, the corresponding process is carried out on what is displayed (icon, etc.) in the currently defined pointer position coordinates of the X-Y coordinate system in question.

The coordinate system of 192×256 dots is cited here only for illustration purposes. Any other appropriate coordinate system may be set up and used instead.

Figure 27:
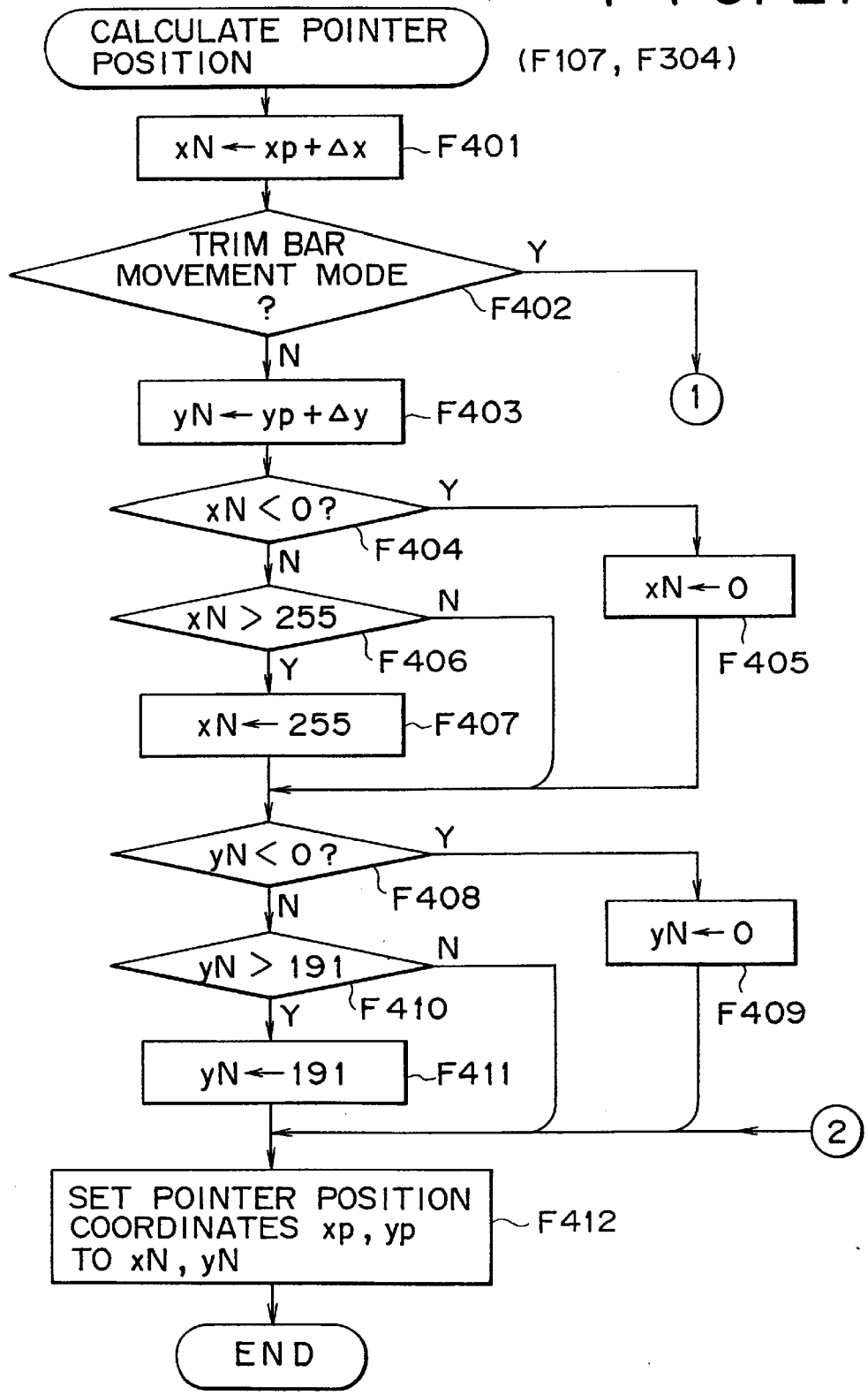
FIG. 27 is a flowchart of steps carried out by the embodiment in calculating a pointer position.

FIG. 27 is a flowchart of steps detailing the above-mentioned steps F107 and F304 for calculating the pointer position. In step F401, the controller 40 adds a value Δx of the detected X displacement information to the X coordinate value xp of the preceding pointer position, thus obtaining an added value xN. In step F402, a check is made to determine if a trim bar movement mode is currently in effect. If that mode is found to be in effect, control is passed to the processing of FIG. 28 ((1) in FIG. 27), to be described later.

If the trim bar movement mode is not selected, step F401 is succeeded by step F403. In step F403, the controller 40 adds a value Δx of the detected Y displacement information to the Y coordinate value yp of the preceding pointer position, thereby acquiring an added value yN.

In step F404, a check is made to see if the added value xN is less than 0. If xN<0, step F405 is reached in which the added value xN is set forcibly to 0. Step F405 is followed by step F408.

If the added value xN is not smaller than 0, step F406 is reached in which a check is made to see if the added value xN is greater than 255. If xN>255, step F407 is reached in which the added value xN is set forcibly to 255. Step F407 is followed by step F408.

If the added value xN is not smaller than 0 and is not greater than 255, step F408 is reached immediately.

In step F408, a check is made to see if the added value yN is less than 0. If yN<0, step F409 is reached in which the added value yN is set forcibly to 0. Step F409 is followed by step F412.

If the added value yN is not smaller than 0, step F410 is reached in which a check is made to see if the added value yN is greater than 191. If yN>191, step F411 is reached in which the added value yN is set forcibly to 191. Step F411 is followed by step F412.

If the added value yN is not smaller than 0 and is not greater than 191, step F412 is reached immediately.

In step F412, the added value xN effective at that point in time is regarded as the X coordinate value xp of the new pointer position; the added value yN in effect at that point is regarded as the Y coordinate value yp of the new pointer position. The new pointer position is now established.

Suppose now that the current pointer position P0 has X and Y coordinates (x, y)=(128, 66) in the coordinate system of FIG. 26 and that the microphone commander 80 has transmitted values of +50 and +30 as X and Y displacement information Δx and Δy respectively. In that case, the new pointer position P1 is calculated by following the above-described steps so that now coordinates (x, y)=(178, 96) are eventually obtained. The data are sent to the graphic controller 58 whereby the pointer on the screen is moved to the position P1.

In steps F404 through F411 above, it should be noted that the added value xN derived from the X displacement information is set to 0 if xN<0 and brought to 255 if xN>255, and that the added value yN based on the Y displacement information is set to 0 if yN<0 and brought to 191 if yN>192. That is, there is no possibility of the pointer position being outside the coordinate system of 192×256 dots. Illustratively, even if the microphone commander 80 is swung all the way to the left, the pointer 210 will not move beyond the leftmost edge on the screen.

It follows that swinging the microphone commander 80 in a fairly large motion readily moves the pointer 210 to edges of the display screen. That is, the left-hand, right-hand, top or bottom edge of the screen is easy to reach with the pointer 210 by swinging the microphone commander 80.

Needless to say, different dot sizes that may be adopted for the coordinate system will replace the values 192 and 256 in the steps in FIG. 27.

As described, the microphone commander 80 may be used as an air-mouse when its movements are translated into the pointer position and when clicks are executed as needed on the display in effect. Where so-called GUI screens are established, diverse and sophisticated operations may be carried out using the air-mouse.

Although this embodiment has been shown using angular velocity sensors to implement the air-mouse function, this is not limitative of the invention. Alternatively, acceleration sensors, inclination sensors, geomagnetic sensors or any other appropriate sensors may be used instead.

The microphone commander 80 may alternatively be equipped with a shuttle ball, a track ball or like device that outputs information representing rotations given to its rotary element; a joystick that outputs information representative of the direction in which the device is operated; or a four-way or an eight-way direction key designating movements in any of the four or eight directions when operated. Any of these and other alternative devices may be furnished to output X-Y displacement information reflecting operations performed thereon.

Although the embodiment has been shown having the pointer moved two-dimensionally (in X and Y directions), the pointer may be moved instead in either the X or the Y direction alone depending on the GUI screen settings. In such cases, the microphone commander 80 may be arranged to output displacement information only in one direction.

6. GUI Functions 6-1 Screen Modes

Figure 29:
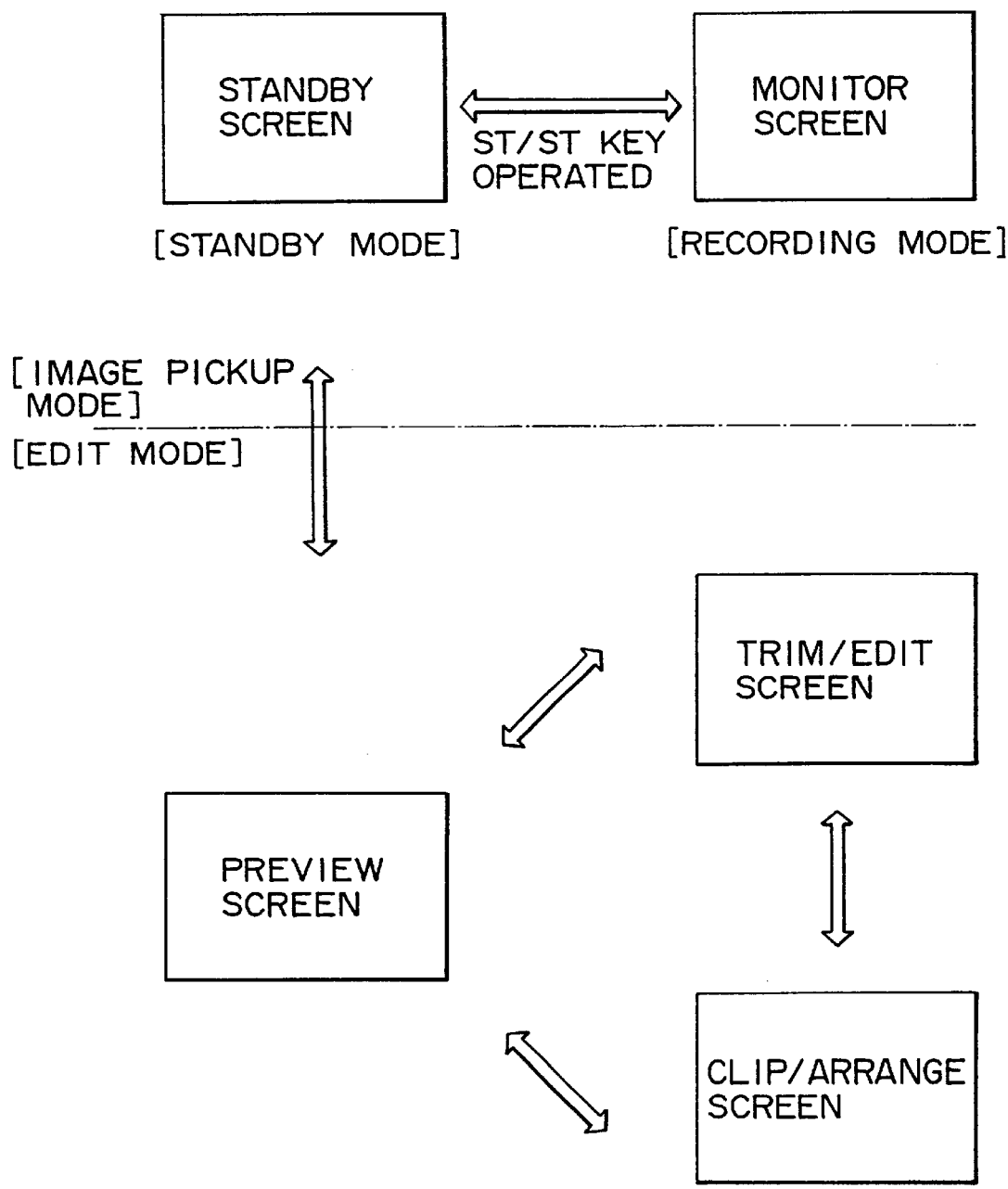
FIG. 29 is an explanatory view showing screen mode transitions of the embodiment.

What follows is a description of screens displayed in different modes and of GUI functions implemented by operation of the air-mouse. FIG. 29 is an explanatory view showing the transition of screen modes.

In the image pickup mode, the monitor picture generator 51 generates a display-ready video signal constituting a standby screen if the standby mode is selected or a monitor screen if the recording mode is selected.

In the edit mode, there are three screen modes to choose from: a preview screen, a trim/edit screen, and a clip/arrange screen. When the edit mode is initially selected by operation of the mode switch 24, a preview screen appears first. Thereafter, any of the three screen modes may be selected by the user performing GUI operations for screen mode switchover.

At the start of the edit mode, a screen mode other than the preview screen may be arranged to be established. The edit screens may include diverse screen modes other than those mentioned above.

Each of the screen modes will now be described. It should be understood that these screens are only for illustration and that many other display settings, display types and GUI operations may be devised as desired.

In the screens displayed, a bar graph display 204, a trim bar display 230 and a story line display 250 may include hatched, cross-hatched, dotted, blank, or striped portions. These parts stand for different colors that appear on the actual screens.

In the description that follows, the wording "click operation" will refer to an operation of the mark/click key 87 of the microphone commander 80; "drag operation," to a vertical or crosswise swing of the microphone command 80 with its mark/click key 87 held depressed; and "drop operation," to a release of the mark/click key 87 during a drag operation.

Each of the screens to be discussed below is displayed on the display part 135 of the headset 120 in accordance with the display-ready video signal that is generated by the monitor picture generator 51 in steps F101, F201 and F301 of FIGS. 18 through 20. The GUI operations on the standby and edit screens and the manipulations that accompany such operations are those performed in steps F107, F108 and F109 of FIG. 18, and in steps F304, F305 and F306 of FIG. 20.

6-2 Standby Screen

Figure 31:
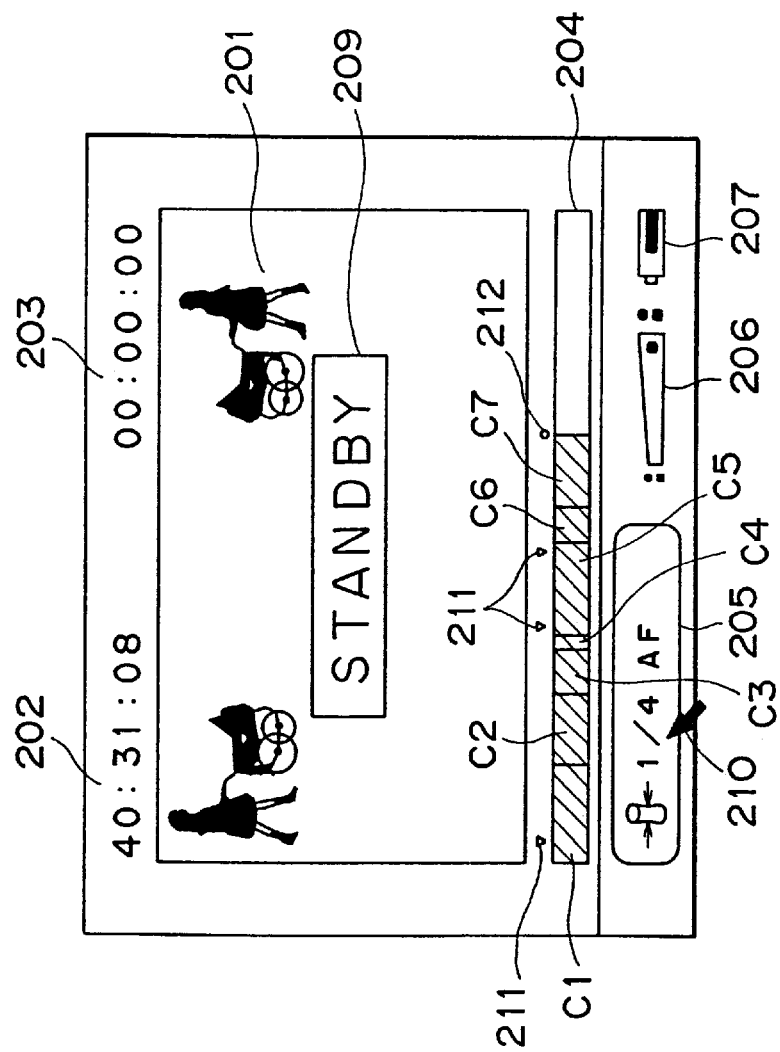
FIG. 31 is another explanatory view of the standby screen of the embodiment.

Details of the standby screen will now be described with reference to FIGS. 30 and 31. FIG. 30 shows a standby screen in effect when the standby mode is initially selected for a new disk 90, i.e., a disk to which images are yet to be recorded. FIG. 31 depicts a standby screen that appears illustratively in the standby mode selected after recording has been carried out seven times with seven cuts recorded.

In the standby mode, a standby display 208 such as a "STANDBY" indication in the illustration appears on an image display 201 of the object being picked up by the image pickup device 41. The display informs the user that the standby mode is now in effect (i.e., that no image recording is made to the disk 90).

The standby screen includes time displays 202 and 203, a bar graph display 204, a setting display 205, a zoom display 206 and a battery display 207. Also displayed is the pointer 210 representing the air-mouse function.

The time display 202 shows a total time of the cuts taken so far, and the time display 203 indicates a total time of a currently recorded cut. It follows that in the standby mode where recording does not take place, the time display 203 shows zero digits only.

Where recording ("recording" will hereunder refer to the pick-up of images and recording of the picked-up images in the recording mode) has been done a plurality of times, the time display 202 shows the total time of all cuts recorded so far, as illustrated in FIG. 31.

The bar graph display 204 shows recording status of the disk 90. When recording is yet to be done on the disk 90, as in the case of FIG. 30, the bar graph display 204 is a blank bar. As cuts are taken one after another, they are represented by bar-segment indications of proportional lengths inside the bar display. If seven cuts C1 through C7 have been taken as in the example of FIG. 31, the corresponding bar segments (shown hatched) appear in a color different from the blank inside the bar graph display 204, each segment having a length proportional to its recording time.

A cut is a collection of recordings obtained in a single stretch of recording action. Specifically, operations of the ST/ST key 21 or 86 provide delimiters of the recorded cuts.

The bar graph display 204 permits a visual confirmation of cut recording status for the disk 90. The status may include the length of each of cuts taken, the number of cuts, and the remaining storage capacity of the disk 90.

Above the bar graph display 204, a current point display 212 is given to indicate the progress of ongoing recording. Mark point displays 211 appear as signs indicating where marking was made during recording. The mark points provide a guide for subsequent editing.

A setting display 205 shows various settings of the video camera 10, such as the current image compression ratio and use status of an auto focus mode.

A zoom display 206 indicates the current zoom status, i.e., where imaging is situated between the telephoto phase and the wide-angle phase. The illustration of FIG. 31 shows that the zoom status is set to the maximum wide-angle position. A battery display 207 shows how much power is left of the batteries 64 housed in the battery pack 17.

In the standby mode, as described, the microphone commander 80 may be used as an air-mouse. The air-mouse function is utilized in altering various settings by use of the microphone commander 80 in the standby mode.

Illustratively, as shown in FIG. 31, the pointer 210 may be positioned onto the indication of the image compression ratio in the setting display 205. With the pointer 210 thus set, executing a click operation changes the compression ratio setting. other settings may be changed likewise. Changeable settings include the activation and deactivation of the auto focus mode (i.e., switchover between auto focus and manual control), and the selection and termination of the blurring compensation mode. Furthermore, simply dragging the zoom position indication inside the zoom display 206 changes the zoom status. That drag operation is equivalent to operating the zoom key 84.

6-3 Monitor Screen

Figure 32:
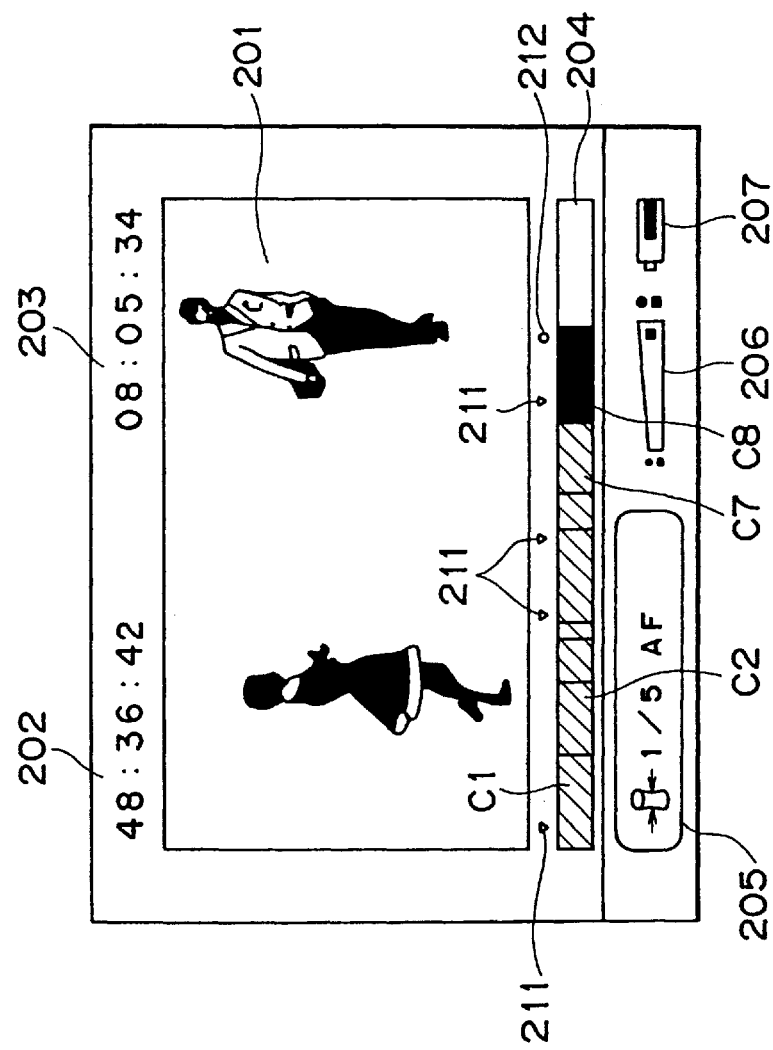
FIG. 32 is an explanatory view of a monitor screen of the embodiment.

A monitor screen for the recording mode is shown in FIG. 32. FIG. 32 is a typical monitor screen in effect when the standby mode of FIG. 31 is terminated and the recording mode is selected by operation of the ST/ST key.

In the recording mode in which image pickup is in progress, images of the object being picked up by the image pickup device 41 and recorded to the disk 90 are shown as an image display 201. This is a monitored image display.

The time display 202 in the recording mode shows a sum of the total time of the already recorded cuts C1 through C7 and an elapsed total time of the ongoing cut (cut C8). The time display 203 indicates the elapsed time of the currently recorded cut C8. That is, the time displays 202 and 203 change as recording progresses.

In the bar graph display 204, the currently recorded cut C8 appears in a color different from the already recorded cuts C1 through C7. The current point display 212 moves rightward on the bar graph as recording advances. That is, the current point display 212 indicates the most recent point of the cut C8.

If marking is performed during recording of the cut C8, mark point displays 211 are added to indicate time points of the marking in the cut C8, as illustrated. As with the standby screen, the monitor screen also provides the setting display 205, zoom display 206 and battery display 207.

It should be noted that in the recording mode, the microphone commander 80 cannot be used as an air-mouse and that no settings can be changed by GUI operations. When the recording mode is in effect, any setting change must be effected by operation of keys on the microphone commandeer 80 or on the video camera 20.

6-4 Preview Screen

Figure 34:
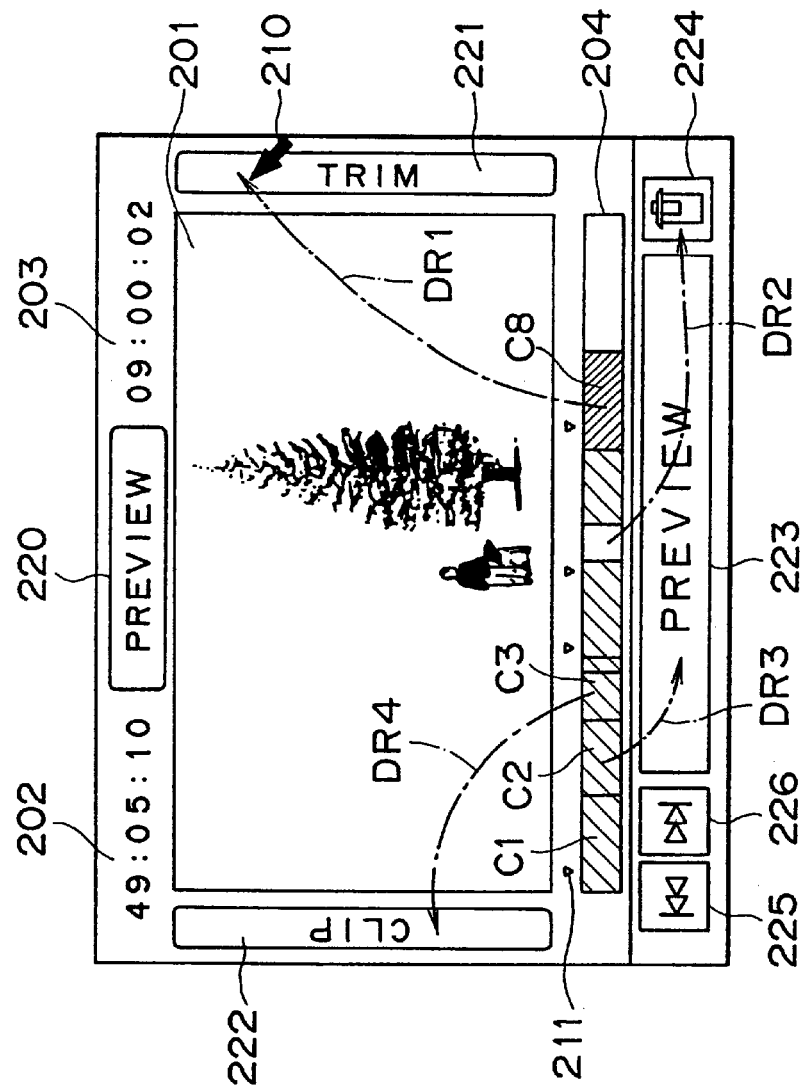
FIG. 34 is another explanatory view of the preview screen of the embodiment.
Figure 35:
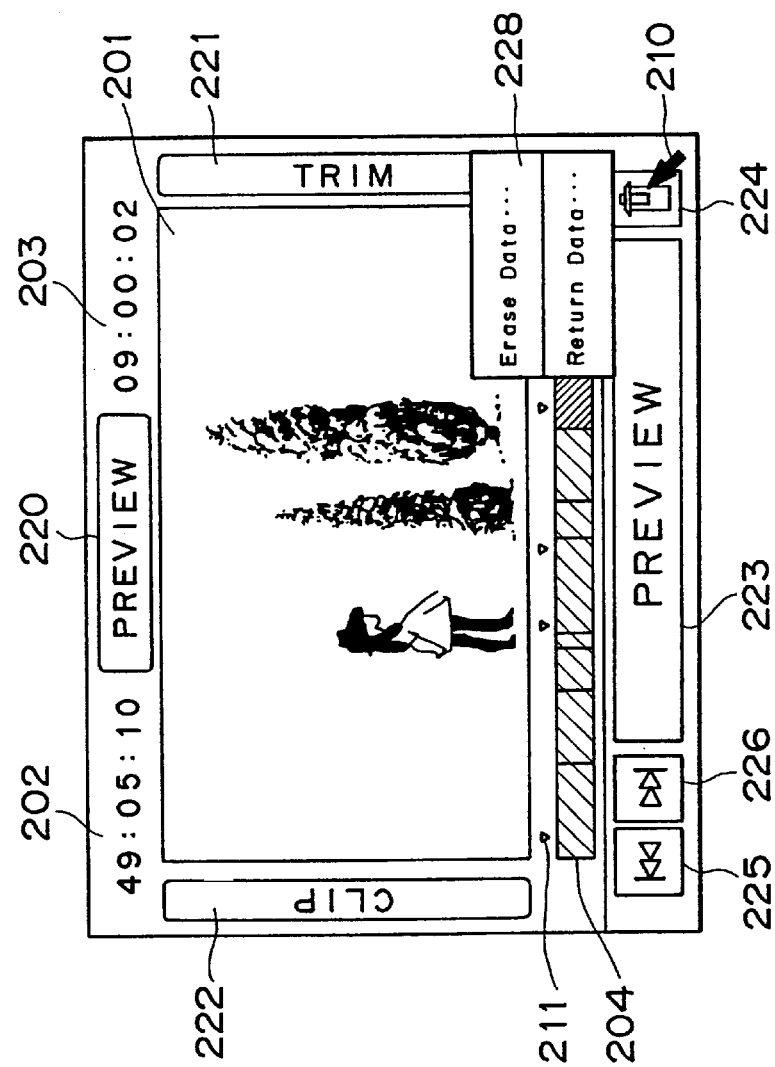
FIG. 35 is an explanatory view of an erase check screen of the embodiment.

When the video camera 10 of this embodiment is first placed in the edit mode, a preview screen initially appears as the edit screen. Examples of the preview screen are shown in FIGS. 33 through 35. The preview screen provides a-screen mode whose primary objective is to reproduce previously recorded cuts from the disk 90.

Initially, a preview area display 220, a trim area display 221 and a clip area display 222 appear at the top, right-hand and left-hand edges of the screen. These displays allow the user to choose any one of the respectively named screens for editing purposes. As with the standby screen and monitor screen, the preview screen includes the bar graph display 204 and the time displays 202 and 203. At the bottom edge of the screen are a preview key display 223, a trash can display 224, and search key displays 225 and 226.

In the preview screen, it is possible to select and reproduce desired cuts. For example, clicking on the segment of the cut C8 in the bar graph display 204 selects the cut C8. The selected cut C8 has its color changed on display. The time display 202 shows the total time of all cuts taken. The time display 203 indicates the total time of the cut currently selected.

With the desired cut C8 thus selected, clicking on the preview key display 223 starts reproducing the cut C8. Specifically, the controller 40 instructs relevant components to reproduce the cut C8 from the disk 90. Under control of the controller 40, the graphic controller 58 causes the monitor picture generator 51 to generate a preview image reflecting the reproduced image that is inputted via the frame memory 50. These operations start reproducing the cut C8 illustratively from its top in the form of an image display 201.

A preview cursor 227 appears on the bar graph display 204, indicating which part of the recordings is being reproduced at present. Specifically, the preview cursor 217 travels along the bar graph as reproduction progresses.

Any target part to be reproduced (i.e., a cut or a point within a cut) is reached by clicking on the search key displays 225 and 226. Illustratively, a click on the search key 226 causes the cut next to the currently reproduced cut to start being reproduced from its top.

Arrangements many be made so that when the preview screen is reached, the most recent cut is selected automatically. This makes it possible, upon transition to the preview screen, for the user to reproduce and verify the most recent cut by simply clicking on the preview key display 223.

The preview area display 220 comprises the Y coordinate value of 0 constituting part of a movable coordinate system of the pointer 210 representing the air-mouse. That is, the preview area display 220 is established as a region containing the topmost portion of the X-Y coordinate system.

The preview key display 223, trash can display 224, and search key displays 225 and 226 each include the Y coordinate value of 191 in the movable coordinate system of the pointer 210 representing the air-mouse. That is, each of these displays is established as a region containing the bottommost portion of the X-Y coordinate system.

The clip area display 222 comprises the X coordinate value of 0 in the movable coordinate system of the pointer 210. This means that the clip area display 222 is established as a region containing the leftmost portion of the X-Y coordinate system.

The trim area display 221 includes the X coordinate value of 255 in the movable coordinate system of the pointer 210. That is, the trim area display 221 is established as a region containing the rightmost portion of the X-Y coordinate system.

The fact that the above displays subject to clicks outside the bar graphic display 204 are located at the edges of the X-Y coordinate system enhances the operability of the air-mouse. More specifically, where the pointer 210 is positioned approximately in the middle of the screen, simply swinging the microphone commander 80 upward places the pointer 210 readily into the preview area display 220; there is no overshoot of the pointer 210 beyond the upper screen edge.

Likewise, a fairly large leftward swing of the microphone commander 80 puts the pointer 210 easily into the clip area display 222. A substantially large rightward swing of the commander 80 positions the pointer 210 into the trim area display 221 with ease.

In like manner, the pointer position is easily controlled for height with respect to the preview key display 223, trash can display 224, and search key displays 225 and 226. When brought to the proper height of these displays, the pointer 210 may be readily moved crosswise and positioned to any one of them.

The point is that most of the display regions subject to click operations are located at the edges of the coordinate system. This helps to improve the ease of pointer manipulations by the air-mouse whose operability is more or less unstable because of the need to maneuver it in the air.

Each of the cuts shown in the bar graph display 204 is reproduced in the manner described above. These cuts may also be processed in other ways.

Illustratively, a drag operation DR1 in FIG. 34 may be performed to drag a cut (e.g., cut C8) to the trim area display 221 and drop it there. The operation moves the cut into the trip/edit screen in which the cut is subject to trimming.

Another drag operation DR4 in FIG. 34 involves dragging a cut (e.g., cut C3) to the clip area display 222 and dropping it there. This operation saves the cut as a clip and moves the cut into the clip/arrange screen for necessary processing. In this particular case, the selected cut is saved as a clip without undergoing trimming.

If a certain cut is yet to be selected, a drag operation DR3 in FIG. 34 may still be carried out to drag the desired cut (e.g., C2) to the preview key display 223 and drop the cut there. The cut thus dragged and dropped is reproduced then and there.

Furthermore, if a given cut (e.g., cut C6) is judged to be unnecessary, a drag operation DR2 in FIG. 34 may be conducted to drag the cut in question to the trash can display 224 and drop it there. The operation erases the cut.

The segment representing the erased cut illustratively turns into the same color as that of the blank outside the remaining cuts. The color change indicates that the cut has been erased.

It should be noted, however, that simply dragging and dropping a cut into the trash can display 224 does not actually delete the cut in question. Clicking on the trash can display 224 brings about a menu display 228 shown in FIG. 35. The menu offers alternatives of erasing or returning data. Selecting the "Erase Data" option (on an erase check screen) deletes definitely the cut in the trash can; choosing the "Return Data" alternative returns the cut from the trash can.

The controller 40 retains as an edit file a collection of data denoting the status of images that have been edited in the edit mode using the above-described preview screen and/or the trim/edit screen, to be described later. Such an edit file provides the basis for the controller 40 to designate reproduction of data from the disk and to issue other instructions to obtain the images edited in a desired manner.

Erasure and updating of the data from the disk 90 are carried out by the controller 40 updating the management information of the disk 90 in accordance with the edit file. That is, the controller 40, while preparing the edit file, updates the management information of the disk 90 at-predetermined intervals. Alternatively, the controller 40 may be arranged to continue preparing only the edit file and not to update the management information until edited results are finalized. In that case, the controller 40 will update the management information of the disk 90 only after the user has issued instructions to finalize the edited results. According to the alternative scheme, the user may easily go back to the original images whenever it is desired to reedit the recordings.

6-5 Trim/Edit Screen

The screen mode shifts to the trim/edit screen illustratively when a cut is dragged and dropped into the trim area display 221 by the drag operation DR1 in FIG. 34 or when the trim area display 221 is clicked on. The trim/edit screen is an edit screen in which necessary parts are trimmed from cuts.

Figure 36:
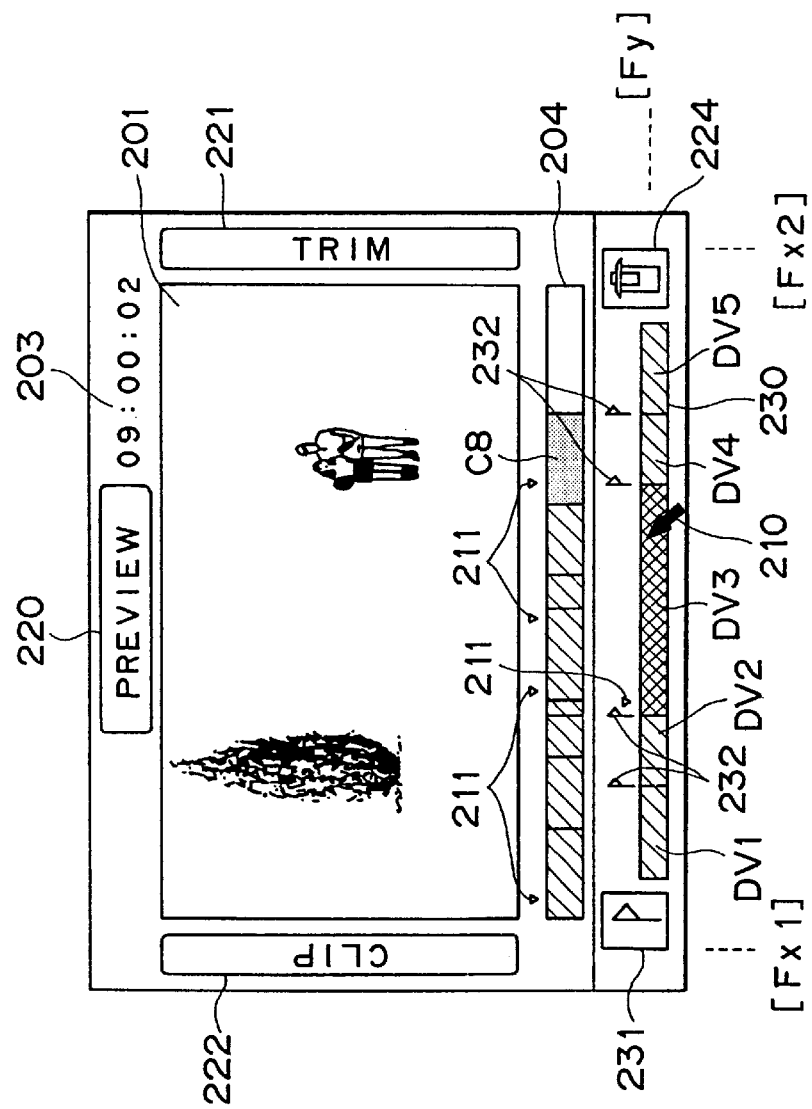
FIG. 36 is an explanatory view of a trim/edit screen of the embodiment.

FIG. 36 shows a typical trim/edit screen brought about when the cut C8 is selected by the drag operation DR1 in FIG. 34. As with the preview screen, the trim/edit screen has the preview area display 220, trim area display 221 and clip area display 222 provided for transition to any one of these named screens in response to a click or a drag.

In the bar graph display 204, the cut to be trimmed (e.g., cut C8) appears highlighted in a color different from that of the other cuts. The colored emphasis prompts the user to verify the cut currently targeted for editing. The time display 203 shows the total time of the cut being edited.

At the bottom of the trim/edit screen (the portion covering the bottom edge of the X-Y coordinate system) are the trim bar display 230, a flag display 231 and the trash can display 224. The trim bar display 230 dedicates its entire length to representing the currently selected cut (e.g., cut C8). That is, the cut selected in the bar graph display 204 is shown enlarged in the trim bar display 230. The mark point displays 211 indicated above the bar graph display 204 are also reflected on the trim bar display 230.

Figure 37:
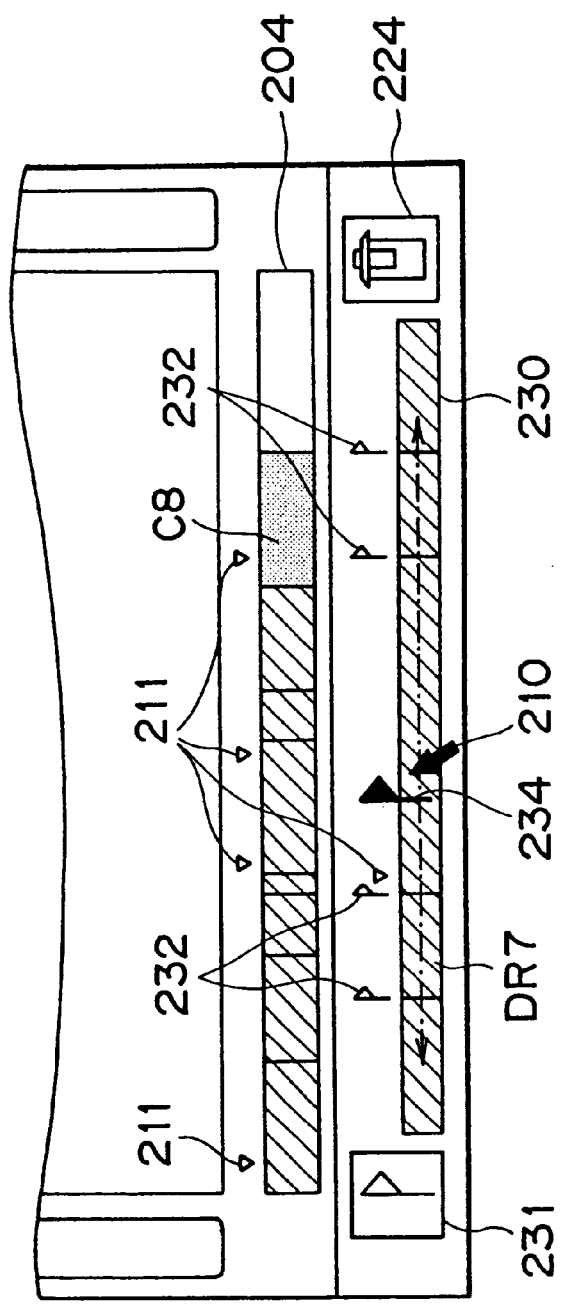
FIG. 37 is another explanatory view of the trim/edit screen of the embodiment.

On the trim bar display 230, the user may divide the currently selected cut into parts as desired. Specifically, moving the pointer 210 onto the flag display 231 and starting a drag thereof brings about a trim bar movement mode. In this mode, as shown in FIG. 37, a moving flag display 234 is moved crosswise along the trim bar display 230 accompanying the pointer 210.

When the drag operation is released (i.e., dropped) at desired locations on the trim bar display 230, flag set displays 232 appear at these locations. That is, the bar of the trim bar display 230 is divided into parts delimited by these flag set displays.

FIG. 36 shows that the target cut C8 in the trim bar display 230 is divided into parts DV1 through DV5 by flag setting operations and that a click on the part DV3 has selected that part. The selected part in the trim bar display 230 appears highlighted in a color different from that of the other parts.

Flag setting operations for dividing a cut into a plurality of parts are made easier by the controller 40 calculating the pointer position based on air-mouse manipulations. The calculations are performed primarily using the steps shown in FIG. 28.

When the trim/edit screen is initially selected, the processing in FIG. 27 of calculating the pointer position proceeds from step F402 to step F403. The pointer is moved and displayed in the usual way. On this screen, the edge portions subject to clicks are thus arranged in the same manner as on the preview screen in order to implement higher levels of operability.

If a drag operation is started from the flag display 231, the controller 40 recognizes the selection of the trim bar movement mode. In that case, step F402 is followed bay step F413 in FIG. 28 in which the input of X-Y displacement information is processed.

Where a new pointer position is to be calculated on the basis of the recently input X-Y displacement information, the controller 40 first reaches step F401 in FIG. 27. In step F401, the controller 40 adds the detected X displacement value Δx to the X coordinate value xp of the preceding pointer position, thereby obtaining an added value xN. Step F401 is followed by step F402 which in turn leads to step F413 in FIG. 28. In step F413, the controller 40 establishes forcibly a predetermined Y coordinate value Fy as an added value yN regardless of the actually detected Y displacement value Δy.

In step F414, a check is made to see if the added value xN is smaller than a predetermined X coordinate value Fx1. If xN<Fx1, then step F415 is reached in which the added value xN is forcibly set to Fx1. Step F415 is followed by step F412 in FIG. 27 (through (2) in FIG. 28).

If the added value xN is not smaller than the predetermined X coordinate value Fx1, a check is made in step F416 to see if the added value xN is larger than a predetermined X coordinate value Fx2. If xN>Fx2, then step F417 is reached in which the added value xN is forcibly set to Fx2. Step F417 is followed by step F412 in FIG. 27.

If the added value xN is not less than Fx1 and is smaller than Fx2, then step F412 is reached immediately. In step F412, the added value xN effective at this point is set as the X coordinate value xp of the new pointer position; the added value yN in effect at this point is set as the Y coordinate value yp of the new pointer position.

The Y coordinate value Fy covers the trim bar display 210, as shown in FIG. 36. It is assumed that the X coordinate value Fx1 is the leftmost X coordinate value of the flag display 231 and that the X coordinate value Fx2 is the rightmost X coordinate value of the trash can display 224.

Figure 28:
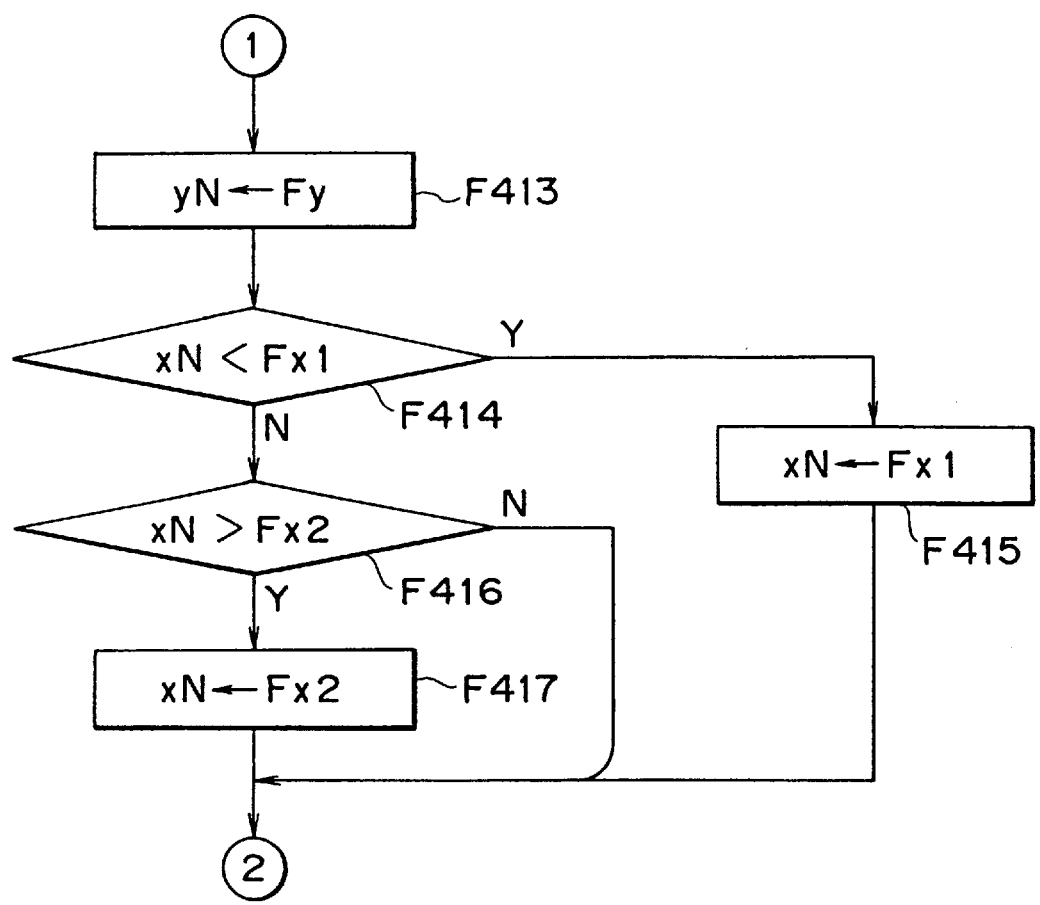
FIG. 28 is another flowchart of steps conducted by the embodiment in calculating the pointer position.

Under the above settings, the processing of FIG. 28 allows the pointer 210 (moving flag display 234), while a flag is being dragged, to travel only horizontally across the flag display 231, trim bar display 234 and trash can display 224. Swinging the microphone commander 80 vertically has no corresponding effect on the pointer movement in this case.

While the flag is being dragged, the pointer 210 need only be moved crosswise on the trim bar display 234. This is because the drag is an operation for seeking a location primarily along the trim bar display 230 to drop the flag in. In other words, keeping the pointer 210 from moving vertically makes it quite easy for the user to select positions on the trim bar display 230 even in an essentially unstable operating environment (i.e., in the air) of the microphone commander 80.

The example above was shown having the trash can display 224 included within the moving range of the pointer 210. Alternatively, the pointer 210 may be prevented from reaching the trash can display 224 by setting the coordinate value Fx2 to the rightmost position of the trim bar display 230.

As another alternative, the coordinate value Fx1 may be set to the leftmost position of the trim bar display 230. This prevents the pointer 210, placed onto the trim bar display 230 at the start of a drag, from reaching the flag display 231 during the drag operation.

The trim bar movement mode, in which pointer movements are restricted as described, is canceled by a flag drop operation. Thereafter, the pointer 210 may be moved as desired vertically and horizontally within the screen.

After the flag has started to be dragged, it may nevertheless be desired to cancel the trim bar movement mode without dropping the flag. Such a situation can happen illustratively when the user starts dividing a cut into parts but decides against it halfway.

In that case, arrangements may be made illustratively so that the trim bar movement mode is canceled by dropping the flag in the flag display 231. This obviously presupposes that the flag display 231 is included within the allowable range of drag operations.

Any of the flags that divide a cut into parts may be canceled by dragging the flag set display 232 in question on the trim bar display 230 and dropping the display 232 in the trash can display 224 or in the flag display 231. Any flag that divides a cut into parts on the trim bar display 230 may be relocated by dragging the flag set display 232 in question along the trim bar and dropping the display 232 in a desired location on the bar. In such cases, the processing of FIG. 28 may be carried out when the trim bar movement mode is in effect. This will keep the pointer from moving upward or downward.

Any of the parts divided by flag drop operations on the trim bar display 230 may be erased by dragging the part in question to the trash can display 224 and dropping it there. For example, the part DV4 may be dragged by a drag operation DR6 in FIG. 38 to the trash can display 224 and dropped there. This erases the part DV4 as an unnecessary part from the cut C8.

The cuts symbolized in the bar graph display 204 on the trim/edit screen (FIG. 38) and the parts shown in the trim bar display 230 may each be saved as a clip.

Figure 38:
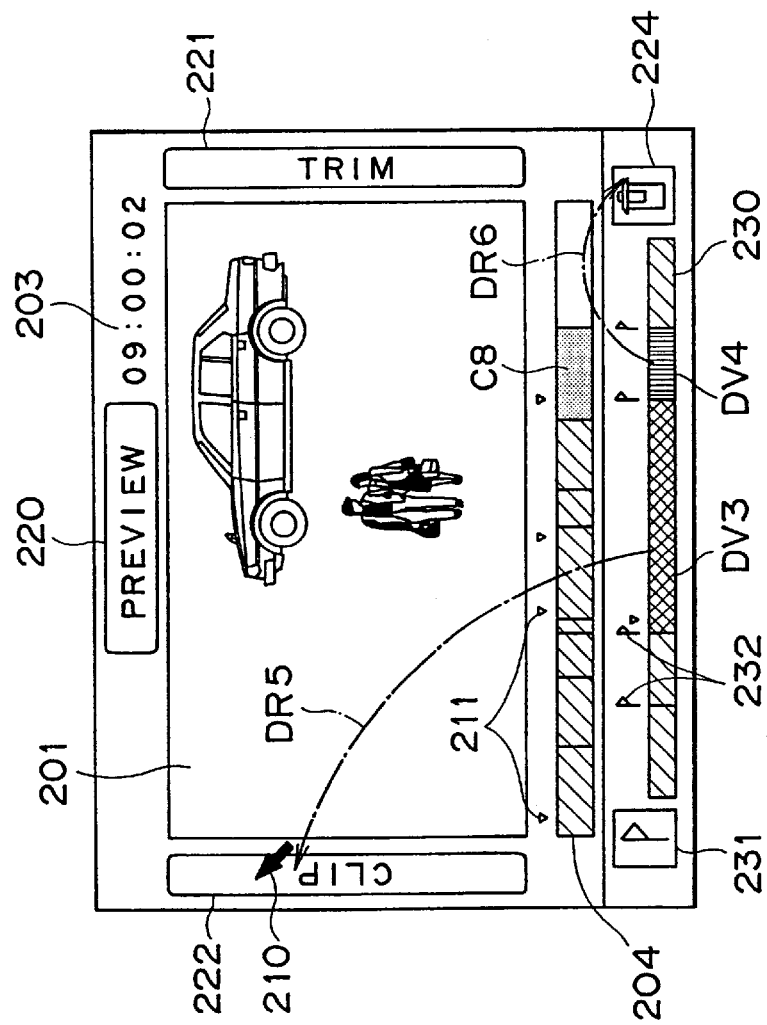
FIG. 38 is another explanatory view of the trim/edit screen of the embodiment.

Illustratively, the part DV3 may be dragged by a drag operation DR5 in FIG. 38 to the clip area display 222 and dropped there. This causes the part DV3 to be saved as a clip.

In addition, with the part DV4 erased by the drag operation DR6, the cut C8 may be dragged to the clip area display 222 and dropped there. This causes the cut C8, minus the part DV4, to be saved as a clip.

6-6 Clip/Arrange Screen

Recorded cuts, cuts with their unnecessary parts removed on the trim/edit screen, or parts extracted from cuts may each be saved as a clip from the preview screen as described earlier or from the trim/edit screen. A clip refers to a selected portion of original images. Cuts or parts thereof are saved as a clip each on the clip/arrange screen such as one shown in FIG. 39.

Figure 39:
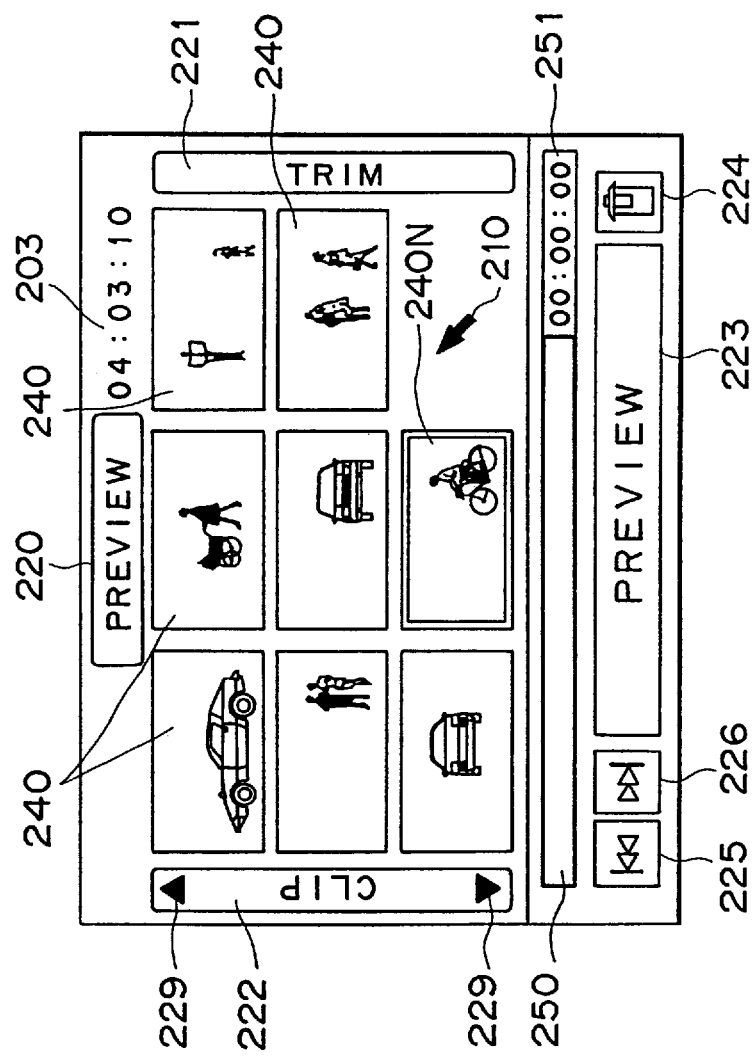
FIG. 39 is an explanatory view of a clip/arrange screen of the embodiment.

On the clip/arrange screen, saved clips are listed as clip image displays. In the example of FIG. 39, up to nine clip image displays 240 may be shown at a time. If ten or more clips have been saved, the scroll keys 229 shown at the top and bottom of the clip area display 222 are clicked on to scroll the clip image displays 240. Clicks on the scroll key displays 229 allow all clips to be checked.

As an obvious alternative, the image size of each clip image display 240 may be changed depending on the number of clips saved. This will allow the largest number of clips to be checked at one time.

Saving a cut or a part thereof on the trim/edit screen or preview screen calls up the clip/arrange screen. The clip saved at that point is shown as the most recent clip image display 240N, made distinct from the other clips illustratively by a white frame around it. When a first clip is saved, there is obviously no particular need for distinguishing it as, say, the clip image display 240N.

The time display 203 shows the total time of the most recently saved clip (i.e., clip image display 240N). On the display screen, each of the clip image displays 240 (and 240N) is represented illustratively by a start-point image of the part or cut saved as the clip.

The clip/arrange screen, as with the preview screen and trim/edit screen, comprises the preview area display 220, trim area display 221 and clip area display 222. A click or drag operation involving any of these displays triggers transition to the correspondingly named screen mode.

As with the preview screen, the bottom portion of the clip/arrange screen comprises the preview key display 223, trash can display 224, and search key displays 225 and 226. These specific displays are located where it is easy to position the pointer 210, as in the case of the other screens (i.e., at the screen edges).

The clip/arrange screen further comprises a story line display 250 and a story time display 251. The story line display 250 represents clips that constitute a story. If no clip has been selected, the story line display 250 is simply a bar indication with nothing shown therein, as in FIG. 39. The story time display 251 indicates the total time of clips selected to make up a story. In the example of FIG. 39, the story time simply shows zero digits.

Figure 40:
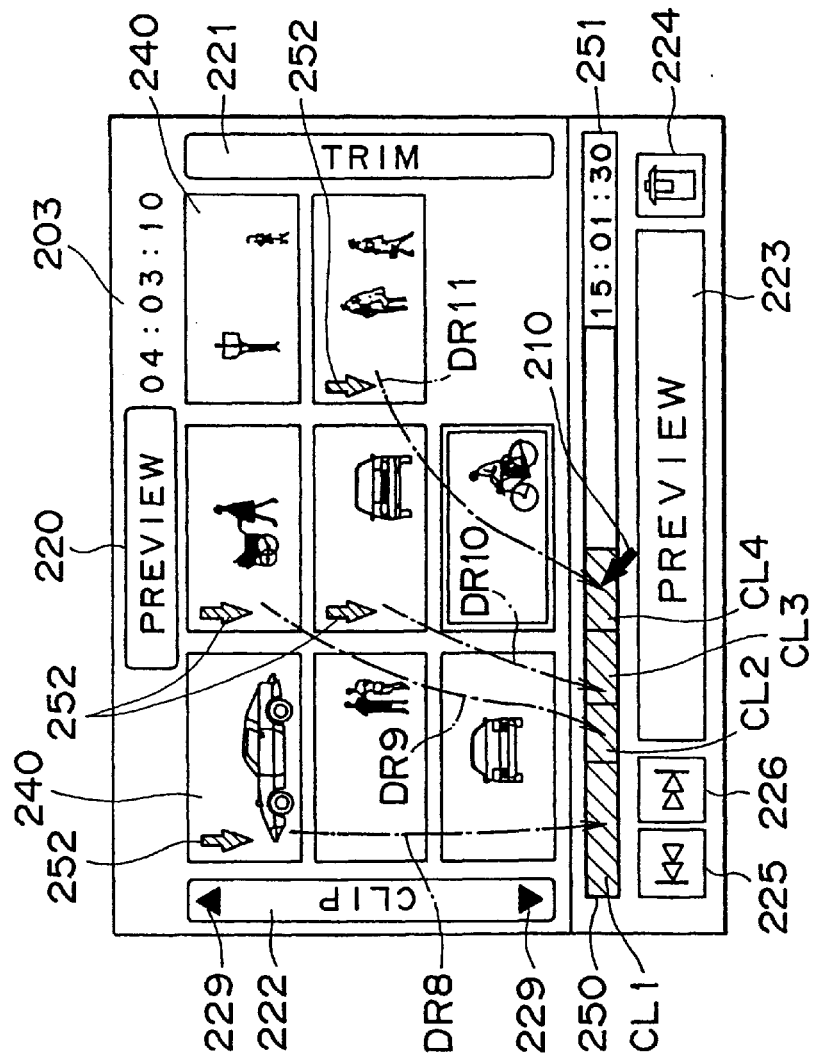
FIG. 40 is another explanatory view of the clip/arrange screen of the embodiment.

Desired clip image displays 240 are dragged to the story line display 250 and dropped there. The drag-and-drop operations make up a story. For example, some of the clip image displays 240 in FIG. 40 may be dragged by drag operations DR8, DR9, DR10 and DR11 to the story line display 250 and dropped there. This causes the selected clips CL1 through CL4 to fill up the story line display 250 Lea in the order in which the corresponding clip images were Ad dragged and dropped. The story line display 250 is divided into segments each proportionally representative of the length of the corresponding clip. The selected clips CL1 through CL4 are shown in a predetermined color.

The story time display 251 shows the total time of the selected clips represented in the story line display 250. The clips filling the story line display 250 are each identified by a selection-complete display 252 that appears on each clip image display 240 that has been selected.

Figure 41:
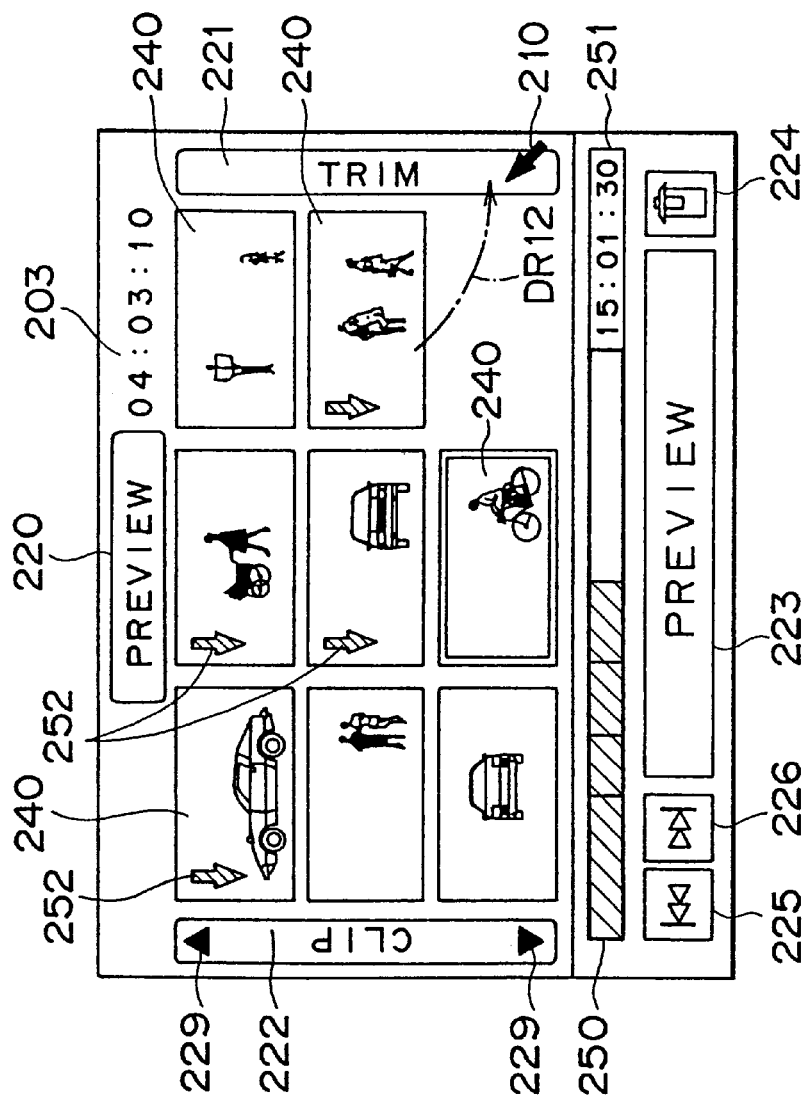
FIG. 41 is another explanatory view of the clip/arrange screen of the embodiment.

Any of the clips selected and put into the story line display 250 may again be called up for trimming. Illustratively, an already selected clip image display 240 may be dragged by a drop operation DR12 in FIG. 41 to the trim area 221 and dropped there. The operation will trigger transition to the trim/edit screen in which necessary trimming is made on the clip in question. The same holds for other clips that are yet to be selected into the story line display 250.

If judged unnecessary, any of the clips selected and displayed as clip image displays 240 on the clip/arrange screen, or any of the selected clips filling the story line display 250 may be dragged to the trash can display 224 and dropped there. This will erase the clip in question.

Different levels of erasure may be devised. That is, whereas the unnecessary data are erased at one level, only the saved status of a clip may be canceled at another level so as to return the clip in question to the status of a cut or a part. On yet another level, the selected status of a given clip may be canceled and replaced by the saved status for the clip in question. In such a case, the processing symbolized by the trash can display 224 may have a menu detailing diverse alternatives of erasure. Each of the erasing alternatives may be represented by a dedicated display part (an icon for erasing saved clip status, an icon for erasing selected clip status, etc.).

The clips selected in the story line display 250 eventually constitute a story when reproduced in the order in which they were selected. The user illustratively edits a program as a story by filling the story line display 250 with clips selected from the cuts recorded on the disk 90.

Figure 42:
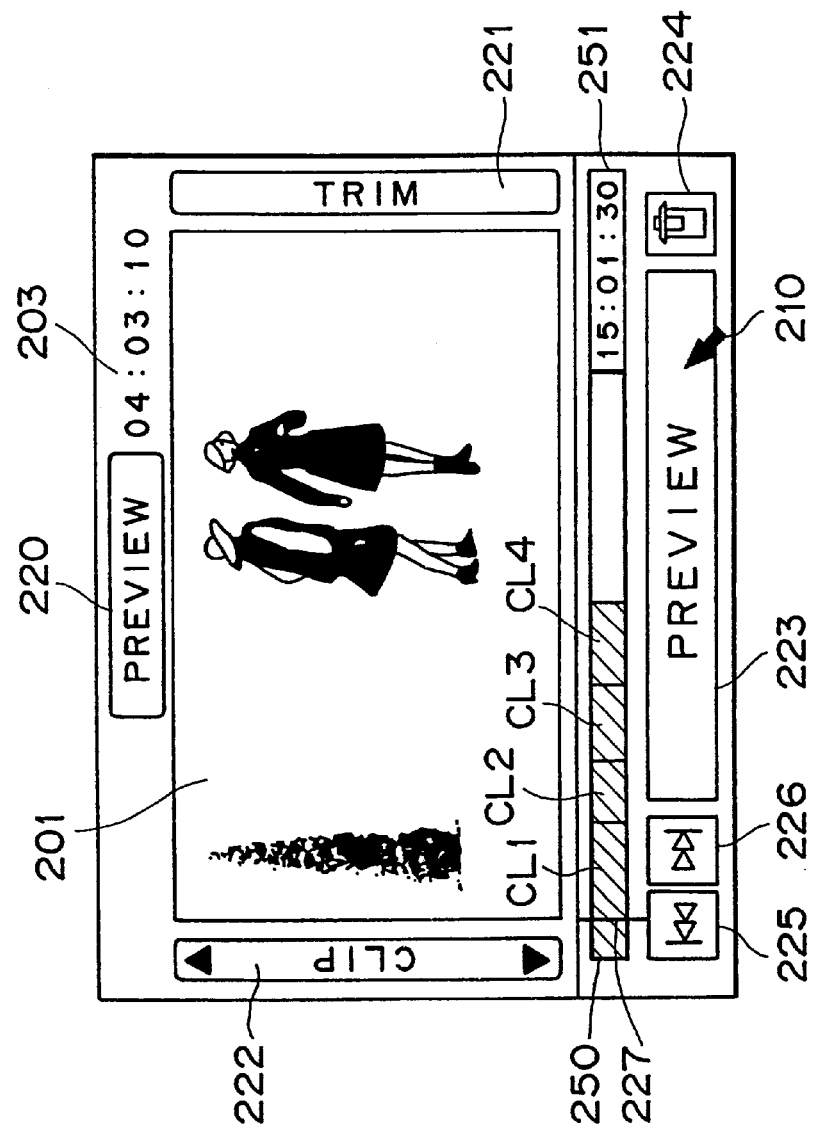
FIG. 42 is another explanatory view of the clip/arrange screen of the embodiment.
Figure 43:
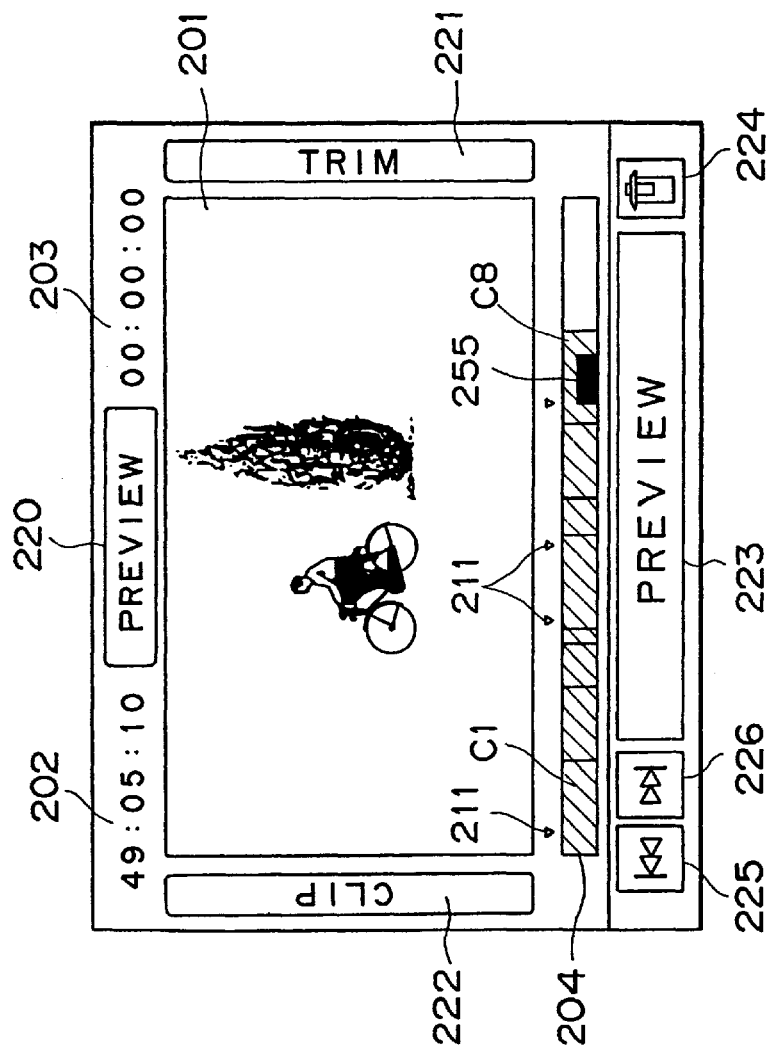
FIG. 43 is an explanatory view of a preview screen that appears after clips have been prepared by the embodiment.

Clips are selected and placed into the story line display 250 until a story (a group of clips) having a desired length of time is prepared through verification on the story time display 251. With one story thus prepared, a click on the preview key display 223 starts reproducing the story consecutively, i.e., playing back the selected clips in the story line display 250 in succession. With the reproduction started, one or a plurality of clip image displays 240 disappear from the clip/arrange screen (FIG. 41) and are replaced by, say, the top of the story given as an image display 201, as shown in FIG. 42.

More specifically, the controller 40 causes the relevant circuits to reproduce successively from the disk 90 the data corresponding to the selected clips CL1, CL2, CL3 and CL4. Under control of the controller 40, the graphic controller 58 causes the monitor picture generator 51 to generate preview images based on the data reproduced and input through the frame memory 50.

A preview cursor 227 appears on the story line display 250, indicating which part of the story is currently reproduced. That is, the preview cursor 227 travels along the story line display 250 as reproduction of the story progresses.

The part to be reproduced (i.e., selected clip) may be moved to a desired position by clicking on the search key displays 225 and 226. Illustratively, clicking on the search key 226 starts reproducing the selected clip next to the one currently reproduced, starting from the top.

After the images of the story have been reproduced, checked and approved, the editing session is terminated. If there are parts to be edited further, clips may be selected or canceled on the clip/arrange screen, or trimmed or saved on the trim/edit screen.

Arrangements may also be made so as to alter the sequence of the selected clips in the story line display 250. Once the necessary arrangements are in place, a change in clip sequence is accomplished by dragging about the clips on the story line display 250 as desired.

If a preview screen is restored after at least one clip was saved on the preceding preview screen or on the trim/edit screen, the part saved as a clip is shown on the bar graph display 204 in a color different from that of the remaining portion of the bar graph. The highlighted indication allows the user to confirm the saved status of the clip on the preview screen.

Various screen modes together with their specific editing operations and manipulations have been described. These screens effective in the image pickup mode allow recorded images to be monitored and the relevant settings to be altered as needed. This enhances the availability of the image pickup system for more efficient imaging operations. Furthermore, various screens in the edit mode permit sophisticated editing work on recorded images. Such features provide capabilities of an editing studio on the move.

Needless to say, more variations of the above-described GUI operations for editing work and more versions of the contents to be edited are conceivable.

As described and according to the invention, the commander is used not only as a remote commander for operating the video camera for image pickup, but also as a microphone. Using the microphone, the user may conduct an interview with his interlocutor while operating the video camera at the same time. That is, the user as one person may play the traditional roles of two people, i.e., a camera operator and an interviewer.

Wearing the headset on the head, the user looks at images that appear on the monitor screen of the headset. That is, the user may monitor recorded images without utilizing the view finder fixed to the video camera. This eliminates positional constraints on the user with respect to the video camera. Using the video camera, commander and headset of the inventive image pickup system, the user is freed from the limits on his position or posture relative to the position and imaging angle of the video camera in operation. Away from the video camera, the user is still able to verify camera operations and check monitored images. These features allow the user to act simultaneously as a camera operator, an interviewer and a monitor operator.

The availability of the monitor on the headset and the GUI operations made possible by the commander acting as an air-mouse permit sophisticated editing work. The image pickup system of the invention may thus be employed as advanced editing equipment.

The capabilities of the inventive system allow the smallest possible number of personnel to pick up images and sounds in the field. Being small in scale gives the inventive system a high degree of maneuverability that is taken advance of in image pickup activities and in editing sessions.

Various operation modes of the invention allow diverse kinds of processing to be carried out. In the recording mode, the video camera accepts and processes audio information and part or all of command information sent from the commander as effective information. The video camera records to a recording medium the video and audio signals sent from the commander. Using the video signals representing picked-up images and a predetermined character image, the video camera further generates a video picture signal that constitutes a monitor screen that is displayed on the headset. The proceedings above provide an optimum state of system operation for the user during image pickup. Specifically, with the system activated, the commander gathers sounds and offers itself as a remote commander; the video camera performs image pickup; and the headset permits monitoring of recorded images.

In the standby mode, part or all of the command information and displacement information sent from the commander is established as effective information. The monitor gives displays and performs related processes in accordance with the received displacement information and according to specific commands. Such proceedings in the standby mode allow various settings of the video camera to be established at a distance from the video camera by use of the commander and headset. This feature is optimally exploited illustratively when, with the video camera set up fixedly in a given location, the user conducts an interview away from the camera.

In the edit mode, the displacement information and specific command information sent from the commander are established as effective information. Reproduced video signals and a suitable character image are used as the basis for generating display-ready video signals constituting edit screens. At the same time, the monitor gives displays and performs related processes in accordance with the received displacement information and according to the entered information, whereby GUI-based sophisticated editing operations are carried out. Such editing functions of the highly maneuverable image pickup system of the invention make it possible to edit the recordings immediately after the coverage in the field. That is, the inventive image pickup system may serve as a traveling studio.

Where the recording mode is in effect, command information generated in response to a specific operating part is interpreted either as a marking command regarding a video picture signal recorded by the video camera onto the recording medium when the recording mode is in effect, or as a specific command (click command) when the standby mode or edit mode is selected. That is, the same operating part provides different commands in different operation modes. This feature reduces the number of necessary operation keys on the commander, whereby the commander is made smaller and easier to operate than before.

Where a specific operation is performed on the basis of a displayed image derived from displacement information and a specific command, the range of displayed pointer picture movements according to subsequently received displacement information may be limited to a necessary-range for the action to be executed next. This feature improves the operability of the commander used as an air-mouse. Because the pointer is prevented from straying into unnecessary locations, the pointer is moved smoothly to the target position (icon, etc.) on the display screen.

Where the commander is used as an air-mouse for operations on the display screen with the edit mode or standby mode in effect, the edges of the pointer-movable range within the screen are provided with screen switchover operation regions. These regions are used to execute pointer movements smoothly upon screen mode switchover.

The headset transmits audio signals gathered by the microphone to the video camera through an audio signal transmitter. The video camera receives the transmitted audio signals through its information receiver. In this manner, the user's voice may also be recorded to the recoding medium.

For example, the sounds gathered by the microphone of the commander and the voice picked up by the microphone of the headset, i.e., conversations between the user and his interlocutor, may be recorded in conjunction with the accompanying images.

As many apparently different embodiments of this invention may be made without departing from the spirit and scope thereof, it is to be understood that the invention is not limited to the specific embodiments thereof except as defined in the appended claims.

What is claimed is:

1. A controller using a graphic user interface, comprising:

pointer displaying means for displaying a pointer on a screen;

movement command receiving means for receiving a movement command for moving said pointer, said movement command including first and second movement designating information, said first movement designating information designating a movement in a first direction, said second movement designating information designating a movement in a second direction perpendicular to said first direction;

operation area displaying means for displaying a first and a second operation area, said first operation area being positioned close to one edge of said screen, said second operation area being located elsewhere on said screen and arranged to transfer control between a first and a second state regarding said first operation area;

enter command receiving means for receiving an enter command;

enter controlling means for providing controls corresponding to the position in which said pointer is displayed when said enter command is received by said enter command receiving means; and pointer movement controlling means for moving said pointer in said first state on the basis of said first and said second movement designating information, said pointer movement controlling means further moving said pointer in said second state on the basis of only one of said first or said second movement designating information.

2. A controller according to claim 1, wherein said movement command receiving means receives said movement command transmitted over a wireless transmission line.

3. A controller according to claim 1, further comprising intra-area controlling means for providing different controls in a plurality of sub-areas inside said first operation area when said pointer is moved in said first area in said second state.

4. A method of operating a graphic user interface, comprising the steps of:

displaying a pointer on a screen receiving a movement command for moving said pointer, said movement command including first and second movement designating information, said first movement designating information designating a movement in a first direction, said second movement designating information designating a movement in a second direction perpendicular to said first direction;

displaying a first and a second operation area, said first operation area being positioned close to one edge of said screen, said second operation area being located elsewhere on said screen and arranged to transfer control between a first and a second state regarding said first operation area;

receiving an enter command;

providing controls corresponding to the position in which said pointer is displayed when said enter command is received by said enter command receiving means; and moving said pointer in said first state on the basis of said first and said second movement designating information and moving said pointer in said second state on the basis of only one of said first or said second movement designating information.

5. The method of claim 4 wherein the movement command is received over a wireless transmission line.

6. The method of claim 4 further comprising the step of providing different controls in a plurality of sub-areas inside said first operation area when said pointer is moved in said first area in said second state.

* * * * *